United States Patent [19]

Beaman et al.

[11] Patent Number: 4,866,630

[45] Date of Patent: Sep. 12, 1989

[54] PROGRAMMABLE BAND SAW AND METHOD OF SAWING

[75] Inventors: David R. Beaman; James M. Grossman, both of Chesterfield, Mo.; Alfonso Bello, Park Ridge, Ill.

[73] Assignee: Armstrong Blum Mfg., Chicago, Ill.

[21] Appl. No.: 851,962

[22] Filed: Apr. 14, 1986

[51] Int. Cl.⁴ .......................... G06F 15/46; B26D 5/30
[52] U.S. Cl. ................................ 364/474.02; 83/789; 83/76.1; 364/474.09
[58] Field of Search ................... 364/474, 475, 474.01, 364/474.02, 474.09; 83/788, 789, 71, 72, 367, 498, 500, 471.3; 318/601, 603

[56] References Cited

U.S. PATENT DOCUMENTS

| | | | |
|---|---|---|---|
| 3,427,518 | 2/1969 | Cloup | 364/475 X |
| 3,910,142 | 10/1975 | Jureit et al. | 83/71 |
| 3,992,614 | 11/1976 | Buss | 364/475 |
| 4,091,315 | 5/1978 | Hayashi et al. | 318/603 |
| 4,478,120 | 10/1984 | Sugimoto | 83/71 |
| 4,579,026 | 4/1986 | Tsune | 83/72 X |
| 4,641,557 | 2/1987 | Steiner et al. | 364/475 X |

Primary Examiner—Joseph Ruggiero
Attorney, Agent, or Firm—Baker & McKenzie

[57] ABSTRACT

A method of automatic sawing employs an automatic sawing machine having an automatic workpiece shuttle, shuttle and stationary vises, an automatic saw blade feed, one or more incremental motion encoders and a programmable microcomputer. The microcomputer is capable of storing a series of sawing jobs. Each job has a number of sawing steps. Each step in turn defines a sawed workpiece length and (in an embodiment employing a saw blade tilting mechanism) a sawing angle, both of which parameters may be different from those of other steps. The microcomputer receives signals from the motion encoders to determine shuttle and (in a tilt embodiment) tilt position and uses these positions to control shuttle, (in the tilt embodiment) tilt, and vise operation. The microcomputer also corrects each workpiece length with a saw kerf and pivot point correction factor, both modified for sawing angle. The microprocessor receives motion increment signals from the motion encoders which are decoded to determine the direction in which the increment was travelled, and which are decoded in a manner which increases conventional accuracy by four. An operator may simultaneously program one saw job while executing another.

24 Claims, 14 Drawing Sheets

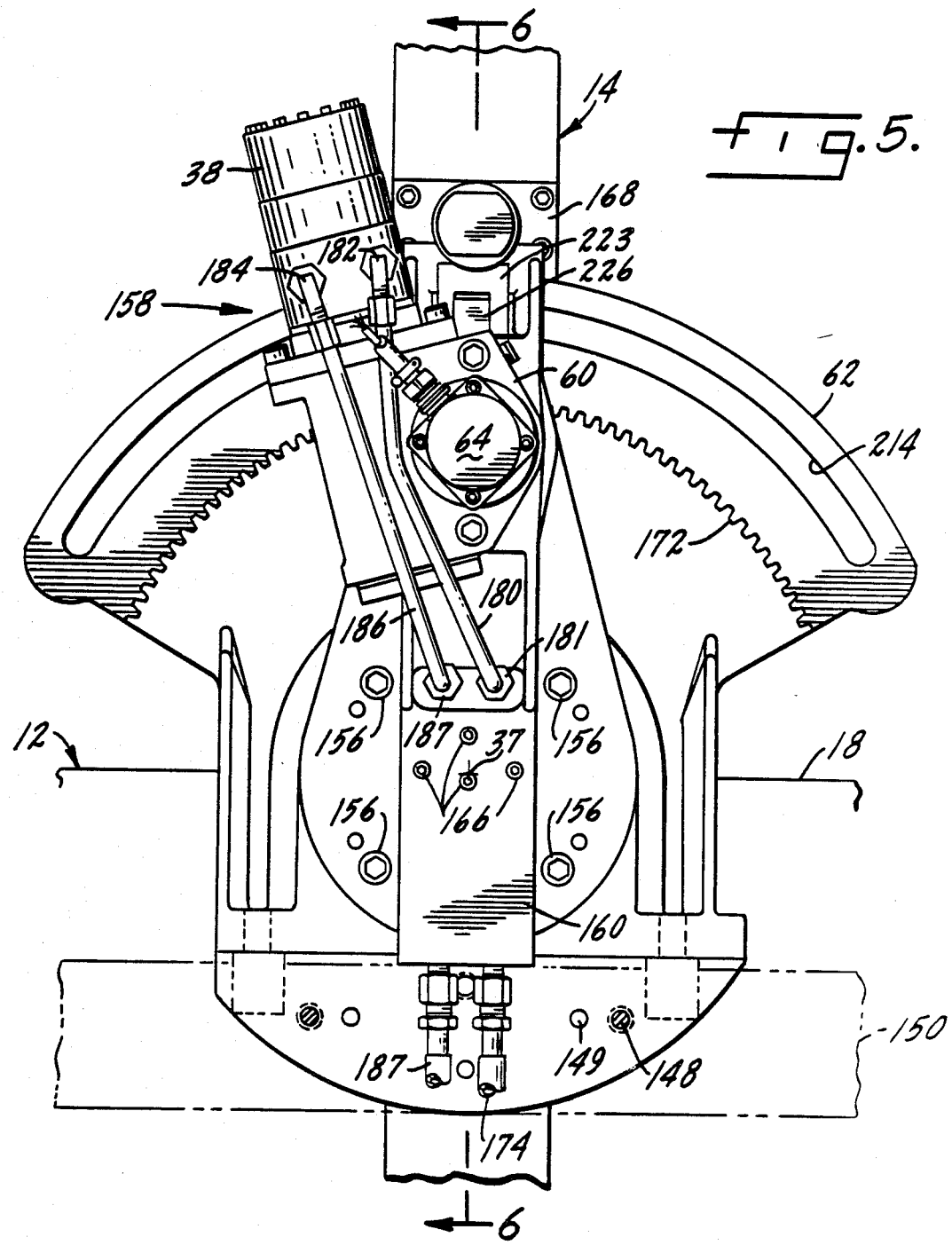
fig.5.
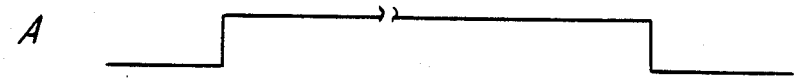
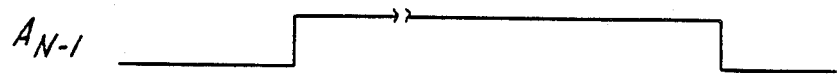
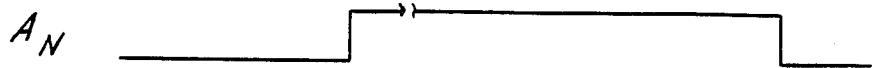
fig.18.

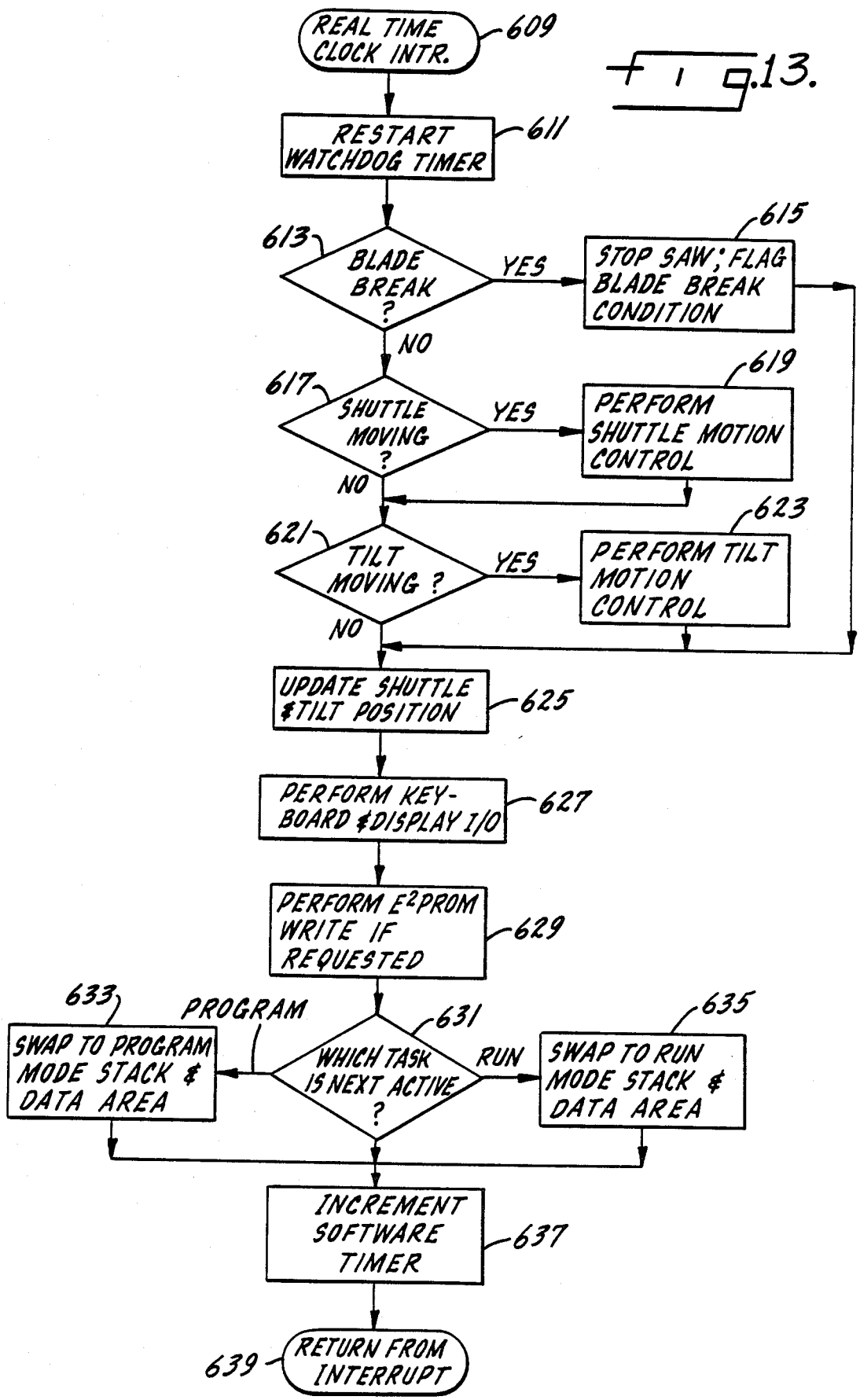

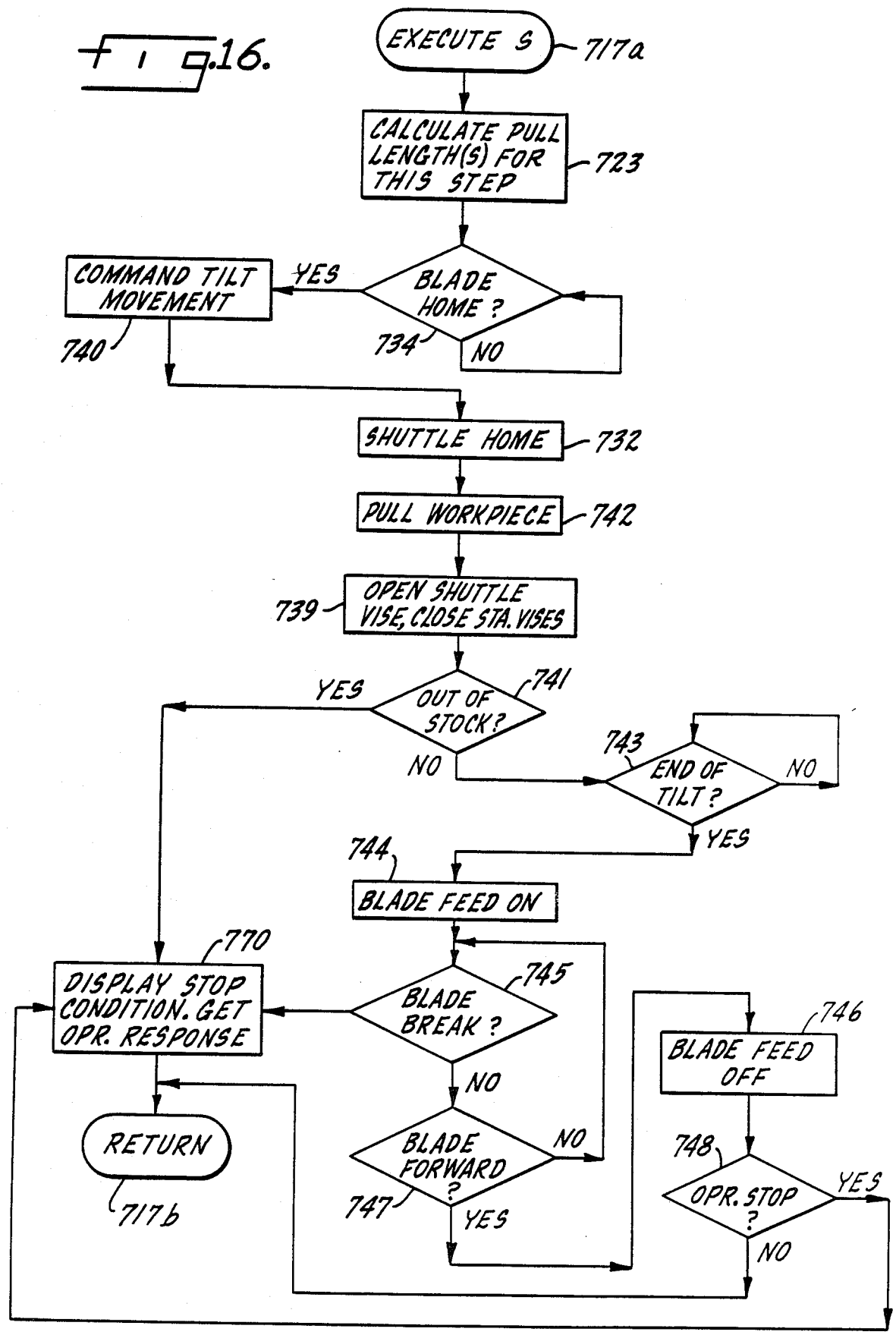

PROGRAMMABLE BAND SAW AND METHOD OF SAWING

BACKGROUND AND SUMMARY

This invention relates generally to the field of industrial sawing, and more specifically to automatic sawing machines.

Automatic sawing machines are known in the art to possess several automatic or semi-automatic features. Typically, these include (a) automatic advancement of a blade into a workpiece and subsequent retraction of the blade to a home position, (b) automatic actuation of a workpiece shuttle to "pull" a workpiece in the direction of work flow to a sawing position by an indexed length, (c) the automatic opening and closing of stationary and shuttle vises, and (d) a means to cut several pieces to the same length and angle of cut.

Certain saws in the art, notably Armstrong-Blum Manufacturing Company's MARVEL Series 81A, Model 10 and Series 15A, Model 8 metal cutting band saw machines, have in addition a provision to add to each "pull" length a value for saw kerf. This accounts for material lost during the sawing process when calculating what workpiece length should be pulled forward by the workpiece shuttle.

As illustrations of the background state of the art, the reader is directed to Catalog 8103, *MARVEL Series 81 & 81A Band Saw Machines,* and Publication 81877, *MARVEL Series 81 and 81A Parts Catalog,* both published by Armstrong-Blum Manufacturing Co. of Chicago, Ill., both incorporated herein by reference.

Many deficiencies have evidenced themselves when employing these prior art methods of sawing. Some deficiencies go to a lack of versatility, others to a lack of precision.

Usually the quantity of pieces to be sawed is set on a mechanical counter. Each time the saw blade rolls forward to perform a cut, a limit switch or other simple means signals the counter to decrement by one count.

The length to be cut is conventionally determined by setting physical stops on the travel of the workpiece shuttle. One of the disadvantages of this procedure is that in the prior art, no more than two fixed length have been settable. A shuttle pull sequence containing more than two different lengths cannot be specified with known prior art saws. In order to effect a cutting plan using variable lengths to minimize waste of a possibly expensive piece of stock, the machine must be stopped and the mechanical stop manually adjusted.

Often it is necessary to cut more than one large piece of stock into relatively small lengths. If the pieces of stock to be cut are separated on a feeding table by a larger distance than the table has been set to move, the table will be unable to "get" the next piece of stock even when the machine is manually operated, without changing the feed length setting. The operator must first remove the previously set inch stop and then manually operate the shuttle to retrieve the next piece.

In the case of known prior art saws having a blade tilt feature, it is conventionally possible to set up such saws to make a series of cuts at up to two angles only. Sawing steps at more than two different angles have not been settable with prior art saws. Partially due to this, known prior art saws typically cannot be set up to automatically perform a sequence requiring more than two cuts at different angles at one place on the workpiece.

Further time is lost in the conventional "automatic" sawing method because, as known in the prior art, the manually set shuttle travel stops and blade tilt offer no opportunity to set up the machine for the next job while the current job is running.

In addition to limitations on time and adaptability, the conventional semi-automatic sawing method has problems obtaining accuracy and precision of saw results. In an industrial environment where increasingly close tolerances are specified and expensive materials are often employed, a lack of accuracy and repeatability can reduce the usefulness of the machine.

Because the shuttle conventionally "bangs" to a stop to index the workpiece pull length, the pull length may change from one repetition to the next. Frequent readjustment may be required, limiting the number of precise repetitions possible.

Repeatability is also affected when the operator chooses to cut a length x, a length y, and a length x again. Because the shuttle travel stop has to be reset before a different length is cut, two cuts of a similar length separated by a different cut will rarely be the same.

As noted above, certain machines are capable of compensating for saw kerf by adding this value to the length of workpiece to be pulled. This method will overcompensate for saw kerf when the saw is set up to bring forward a length of workpiece longer than the maximum shuttle stroke. This is because the saw kerf will be added to each of several shuttle strokes, resulting in the pulling forward of too much material. While this problem can be compensated for by dividing the value used for saw kerf by the number of needed shuttle strokes, an additional manual operation is thereby introduced.

Additional accuracy problems exist when a conventional saw machine has a blade tilt feature. When the blade is tilted from normal for a saw cut, the horizontal component of the saw kerf is a function of the secant of the tilt angle. Where the blade is tilted, therefore, the addition of a unmodified saw kerf value to the shuttle pull length undercompensates for the amount of material lost as measured horizontally.

It has also been found that sawed workpiece length accuracy is adversely affected in saws with a blade tilt feature whenever the axis of blade tilt it not exactly coplanar with the top of the machine table.

It is therefore a general object of the invention to provide a method and apparatus of automatic sawing which is faster, more accurate, more precise and more versatile than conventional methods and apparatus.

A principal object of the invention is to provide a sawing method and apparatus by which a saw program may be specified. The specified program can include a plurality of different sawing lengths and sawing angles. Such a provision obviates the necessity of manually operating the saw when a length or angle is changed.

Another principal object of the invention is to provide a method and apparatus which will saw workpieces with uniform accuracy and precision, regardless of changes in tilt angle, presence of multiple pulls per saw step, number of repetitions, or lack of coplanarity of the pivot axis and the saw table.

A further object of the invention is to provide an automatic saw machine which may be programmed by an operator either before or during machine operation.

Another object of the invention is to provide an automatic sawing method which can be programmed into a sawing machine in a series of saw steps, the user being able to add, change or delete steps after the initial programming.

Another object of the invention is to provide for accurate and precise measurement and control of shuttle movement.

A further object of the invention is to accurately apply a pivot point correction factor to each saw step length in machines having a blade tilt feature.

A still further object of the invention is to allow for the correction of saw kerf in machines having a blade tilt feature.

Another object of the invention is to encode tilt or shuttle incremental motion into signals and provide a method whereby a direction sense is obtained from the signals.

Another object of the invention is to sense and count the beginning and ending of such signals and thereby increase measurement accuracy.

Another object of the invention is to provide an automatic sawing method whereby successive cuts can be made to a workpiece without pulling a further length.

A further object of the invention is to provide a means of stopping an automatic sawing machine during execution of a saw step, the stopping point occurring after the sawing step is completed.

Yet another object of the invention is to provide means to automatically resume a sawing job sequence after such is interrupted.

A still further object of the invention is to accurately sense shuttle position.

Further objects of the invention will be made apparent from the detailed description of an illustrated embodiment which will follow.

In accordance with the invention, an automatic sawing machine is provided. The sawing machine has a programmable controller, an automatic workpiece shuttle with a motion encoder, and in one embodiment a blade tilt mechanism with a motion encoder. The programmable controller is operably connected to the motion encoders, other sensing means and various controlling means as hereinafter described.

The programmable controller is preferably built around an 8-bit microprocessor with bus connections to a keyboard/display, random access memory (RAM), electronically programmable read-only memory (EPROM), electronically programmable and erasable read-only memory (E$^2$PROM), memory and input/output selects, counter-timers for receipt of encoder data and interfaces to sensing and enabling peripherals such as limit switches and solid state relays. An optional connection to an external data communications link which would connect the programmable controller to an external source of control, such as a mainframe computer, can also be provided.

Among the solid state relays are those which control operation of the shuttle and machine vises, shuttle motion, tilt motion (where a tilt feature exists), blade motion and the hydraulic pumps.

A buffer interfaces the microprocessor with several mechanical limit switches that provide status and location information on various machine components. In the illustrated embodiment, limit switches detect the presence of the saw blade carriage at either its fully extended or retracted positions, and a limit switch likewise detects the presence of the workpiece shuttle at an extended end of its stroke. Further limit switches react to "out of stock" and "broken blade" conditions.

The tilt and shuttle encoders encode travelled angular and distance increments preferably through use of optical sensors. In the illustrated embodiment, the tilt motion encoder has its detection axis coaxial with and operably connected to the pinion gear affixed to its detection axis, which in turn engages an arcuate rack affixed to the machine table. The shuttle motion encoder is affixed to the shuttle, and has a pinion gear engaging a straight rack affixed to the shuttle table. In both cases, the pinion gear could conceivably be on the stationary element rather than the moving element, but the preferred arrangement is the opposite way.

Each encoder senses movement increments in either direction along their respected gear racks. Upon sensing an incremental displacement, either encoder will send out two signals, both preferably in the form of a quadrature square wave. The first signal or wave will partly precede the second signal or wave if movement is sensed in one direction, and the second signal will partly precede the first if movement is in the other direction.

These signals are received by a clocked register which in turn sends them on to a series of programmable array logic (PAL) chips. The PAL chips are able to distinguish up-count signals from down-count signals according to the order in which they are received by the clocked register. Further, the PAL and clocked register are able to discern the beginning of a signal from the ending of a signal as separately countable events, thereby providing twice the number of events to count.

Up-counts and down-counts are sent from the PAL to a set of counter-timers, which sum the negative counts and separately sum the positive counts. The microprocessor periodically retrieves these sums and subtracts one sum from the other. In this way, the shuttle and tilt positions are correctly monitored. Down-counts result when the shuttle or tilt mechanism temporarily moves backward due to vibration, and their inclusion in determining the position of the shuttle and tilt mechanism results in accuracies of 0.002 inches and 0.6 minutes of arc.

The E$^2$PROM is designed to contain several saw machine setup parameters, most of which are configured at the factory. These include:
saw blade kerf
pivot point correction factor
shuttle creep distance
shuttle stop-look-ahead distance
shuttle signal deadband
tilt creep distance
tilt stop-look-ahead distance
tilt signal deadband The saw blade kerf may be changed by the machine operator. It is used to calculate the amount of the workpiece needed to be pulled forward to compensate for material lost in the sawing process.

The pivot point correction factor is specified at the factory for machines with a blade tilt feature. It is the perpendicular distance between the plane of the table top and the tilt axis.

The shuttle creep distance represents that distance through which the shuttle will move at a reduced rate of travel toward the end of its stroke.

The shuttle stop-look-ahead distance represents that distance through which the shuttle will coast at the end of its pull stroke under no power.

The column tilt mechanism creep distance, stop-look-ahead distance and signal deadband are specified for similar purposes in those machines having a blade tilt feature. When moving to a new tilt angle, the tilt mechanism will move most of the distance at a normal rate. Toward the end of the movement, the tilt mechanism will creep at a reduced rate.

After initial configuration, the saw is ready to be programmed with one or more sawing jobs. Each job has one or more sawing steps, each step defining a machine operation cycle. A pull-up length, saw angle (in the case of tilt saws) and number of repetitions are the data entered for each saw step. A length of zero can be specified, in which case no further length of stock will be pulled up. These data are entered either by an operator through the programmable controller keyboard or from a main frame through the serial data communications link.

The programmable controller allows step data to be deleted, changed or added at any time in which the affected step is not being run. Other jobs may be programmed, changed or deleted at the same time that the saw is running a previously programmed job. A number of job repetitions is an additional piece of data which can be entered or changed.

One feature of the invention allows the running job to be stopped after the current saw step is completed. This allows the operator to change the job program and perform any necessary manual tasks, after which the job program can be reactivated where it left off.

The operator can program the programmable controller to interpret entered data as being in either English (inches) or metric (millimeters) units. Further, he can tell the controller that all data being entered is metric (or English), except when indicated to the contrary for an indicated job.

The controller will display the current job step being run unless asked to program, change or delete another job or step.

After the operator has programmed one or more jobs, he is ready to run a job. Starting the program will at an appropriate time, cause the blade to begin running. The shuttle vise is caused to open and is commanded to move forward to the saw position, which is declared to be zero. The blade tilt mechanism is commanded to tilt the blade column to the angle for the first step, going through regular tilt rate, creep, stop-look-ahead and deadband phases.

The shuttle is then commanded to retract. The shuttle motion encoder monitors the shuttle motion and communicates signals to the programmable controller for each distance increment moved. The programmable controller calculates a pull length $l_1$ as either equal to the shuttle stroke (where the desired step pull length is longer than the shuttle stroke, requiring successive shuttle strokes) or a length actually pulled $Len_p$ where:

$$Len_p = Len_s + h(\tan \phi_1 - \tan \phi_s) + \frac{k}{2}\left(\frac{1}{\cos \phi_1} + \frac{1}{\cos \phi_2}\right).$$

where
k is the kerf value,
$Len_s$ is the desired workpiece length,
h is the table offset (vertical point correction),
$\phi_1$ is the angle of the first saw cut,
$\phi_2$ is the angle of the second saw cut.

The microprocessor decrements corrected pull length $l_1$ as the shuttle retracts down the table.

When decremented $l_1 \leq c$, a shuttle creep length, the programmable controller actuates a shuttle slow down relay to reduce the shuttle's rate of movement. When decremented $l_1 \leq h$, the shuttle stop-look-ahead-length, the programmable controller turns off the shuttle drive means, allowing the shuttle to coast.

While the shuttle is being retracted or the workpiece is being pulled forward, the controller is also directing the tilting mechanism (in an embodiment which has such) to tilt the blade to the desired saw-angle $\phi_s$. Tilt movement is monitored and controlled in a manner similar to shuttle movement.

Once the workpiece has been pulled forward in one or more strokes, the controller commands the blade to advance and cut the workpiece. Upon sensing that the cut is complete, the controller commands the saw to retract to home. The shuttle is then rezeroed, and the machine is then ready to perform the next saw step. Execution of the steps continue until the end of the job or until the occurrence of an abnormal condition such as a broken saw blade, in which case operation ceases immediately and an appropriate error message appears on the display.

Attention is now directed to the drawings, wherein:

FIG. 5 is a rear elevational detail of the tilt mechanism and motion encoder of the automatic saw machine of FIG. 1;

FIG. 11 is a detail of FIG. 2 showing the keyboard/display panel of the programmable controller;

FIG. 13 is a controller flowchart diagramming the real time executive program;

FIG. 16 is a diagrammatic detail of job execution step 717 of FIG. 14;

FIG. 17 is a graph illustrating the relationship between encoder output signals as the shaft of the encoder is rotated.

FIG. 18 is a graph illustrating the relationship between various samples off of one encoder output line.

DETAILED DESCRIPTION OF THE ILLUSTRATED EMBODIMENT

Figure 1:
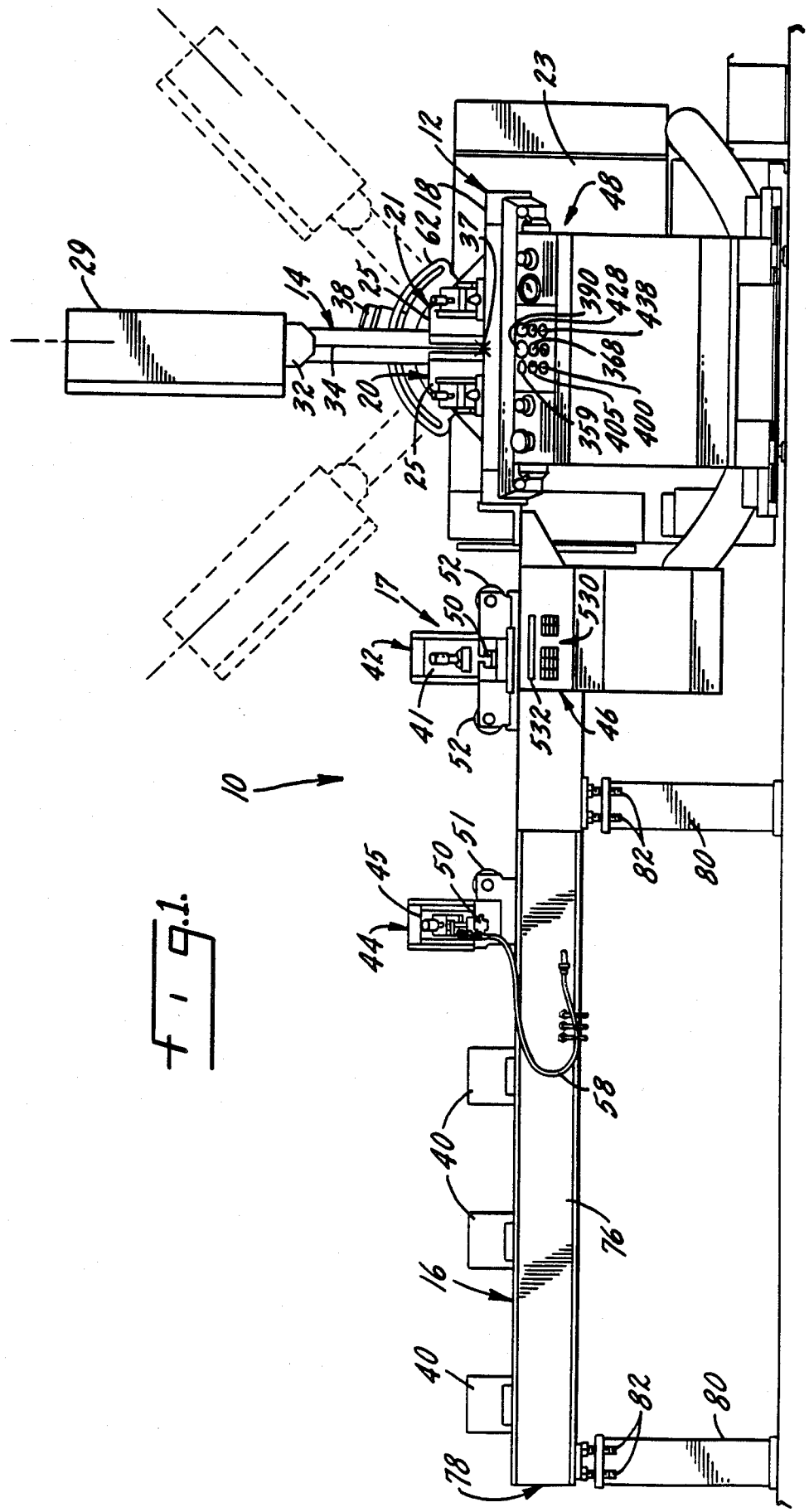
FIG. 1 is a frontal elevation of the automatic saw machine described, showing alternate positions of the saw column in phantom.

FIG. 1 shows an embodiment of the invention in the form of a programmable automatic band saw machine having a blade tilt feature. The invention is not however limited to the illustrated embodiment. It may be employed in automatic saws of a hack saw or other non-band saw variety, and may be used in automatic sawing machines which do not have a tilting blade feature. Certain aspects of the invention may be advantageously employed in any automaticaly controlled mechanism with components having a repetitive linear or arcuate motion.

Saw machine 10 comprises a machine table 12, a saw column 14 and a shuttle table 16. The invention is not limited to saws having vertical saw columns, but may also be employed on saws having horizontal or oblique columns.

Machine table 12 has a table surface 18 on which a workpiece W (FIG. 2) rests while being sawed. It also has a pair of machine vises 20,21 (one alone may alternately be employed) which are actuated by hydraulics. The vises 20, 21 could also be activated by pneumatics. Although most or all saw machine functions could be accomplished by strictly electromechanical linkages including electric motors or geared transmissions, the illustrated embodiment uses hydraulic fluid pressurized by pumps housed inside cabinet 23. Each machine vise 20,21 has a rear jaw 24 (FIG. 2) set by a stop finger (not shown) and a front jaw 25 which ratchets in a T-slot 27 according to the presence or absence of hydraulic pressure.

Figure 7:
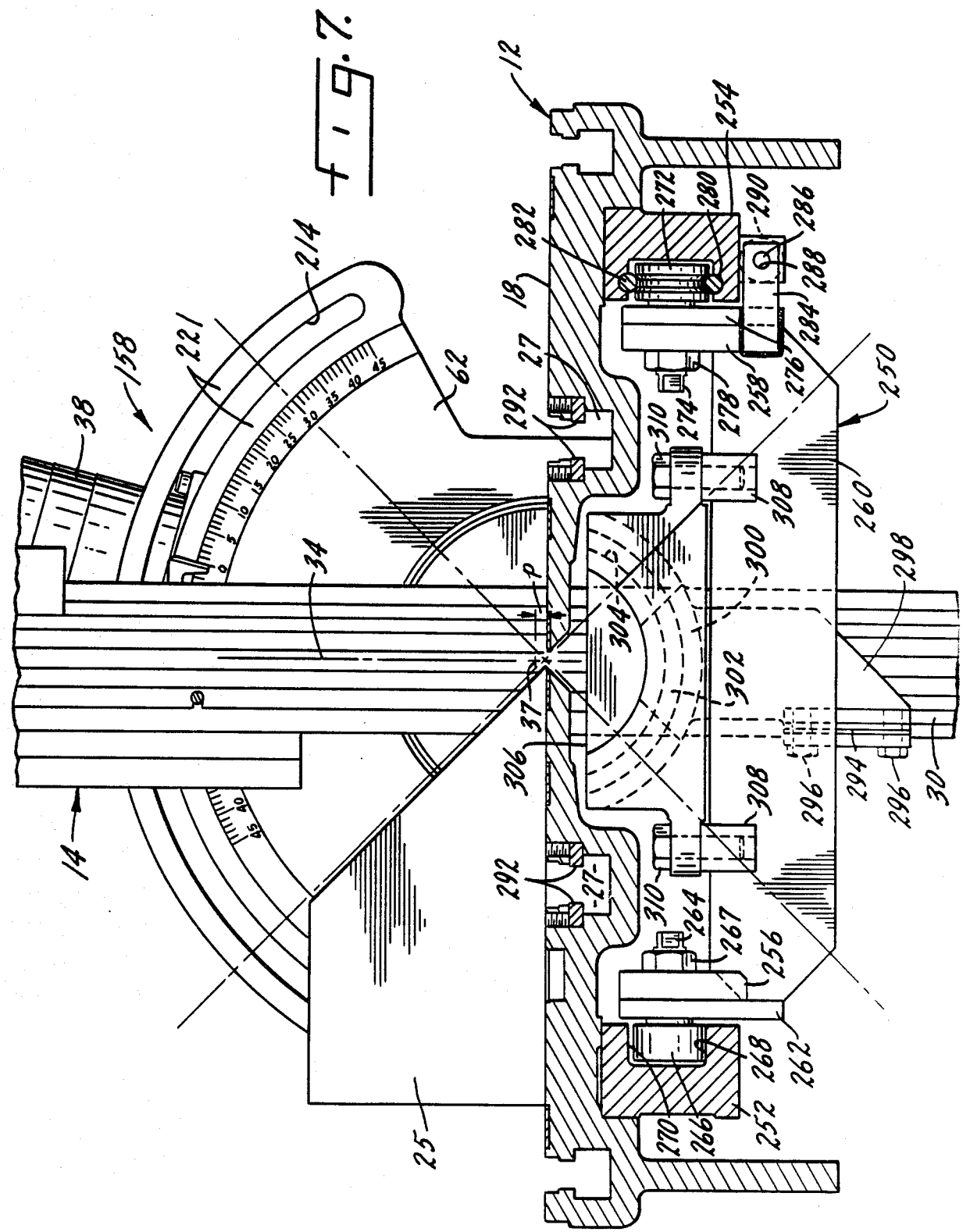
FIG. 7 is a sectional detail of FIG. 2 showing the relation of the saw column to the machine table and saw carriage.

Column 14 supports an upper band wheel contained in band wheel cover 29 and a lower band wheel enclosed in lower band wheel cover 30 (only partly shown in FIG. 7). Blade guide arm 32 (FIG. 1) positions band saw blade 34 at right angles to workpiece W (FIG. 2) as it passes to cut the workpiece. In this embodiment, column 14 pivots around axis 37 which motion is actuated by pivot fluid motor 38.

Figure 2:
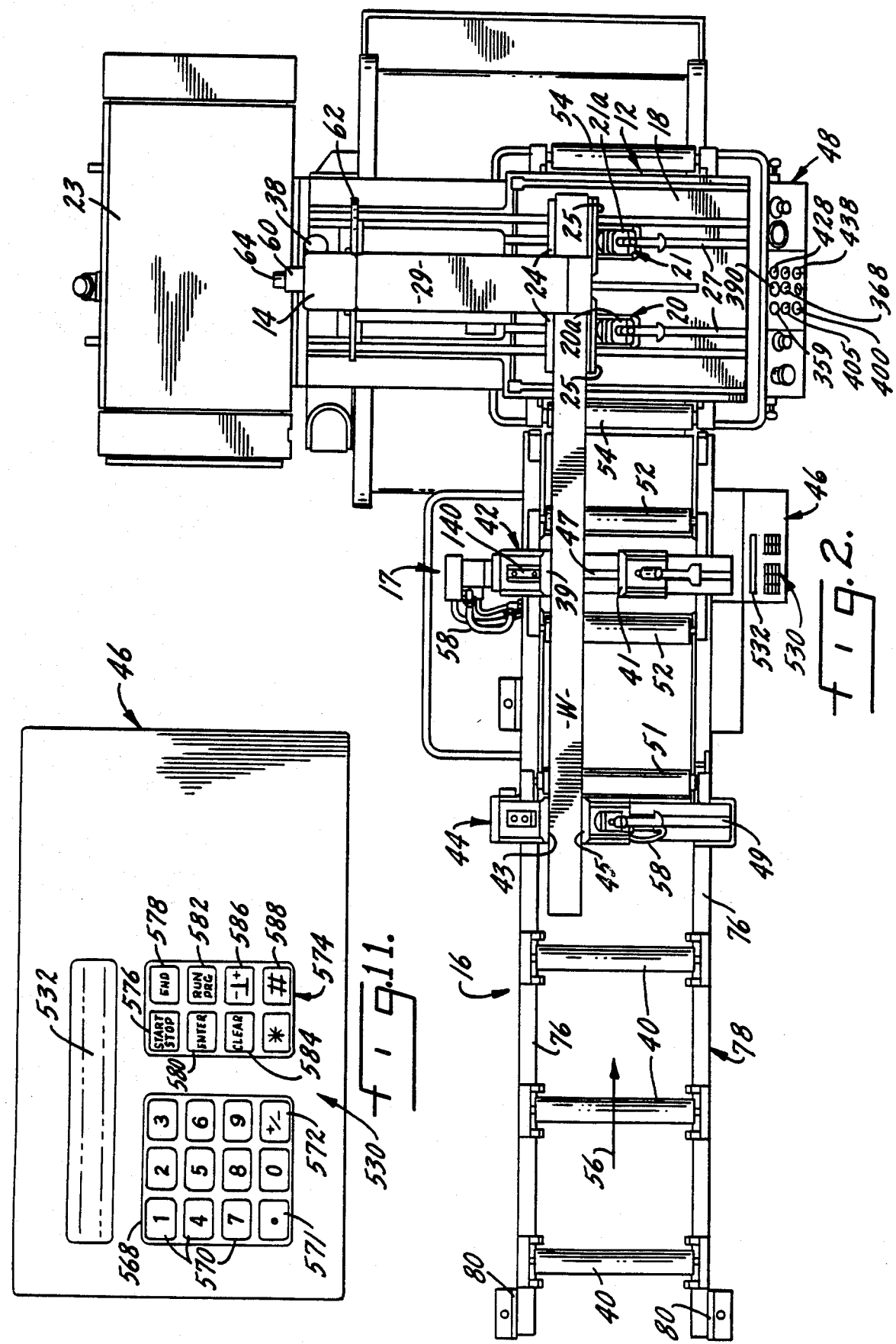
FIG. 2 is a top plan view of the automatic saw machine shown in FIG. 1, as operating on a workpiece.

Shuttle table 16 has a plurality of dead or power rollers 40, a shuttle vise 42 and an outboard vise 44. Each of the shuttle table vises has a stopped back jaw (39,43; FIG. 2) and a movable front jaw (41,45). Front jaws 41,45 are actuated by hydraulic automatic ratchets and hydraulic cylinders to slide back and forward in T-slots 50, in a manner similar to machine vises 20,21. At the front of the saw machine is a programmable controller 46 and manual console 48.

Two tilted positions of column 14 are shown in phantom in FIG. 1. Column 14 in this embodiment tilts up to 45 degrees in either direction around tilt axis 37.

Referring to FIG. 2, a workpiece W is shown ready to be cut. Front jaw 45 of outboard vise 44 and front jaw 25 of machine vises 20,21 have advanced in T-slots 49,27 to grip workpiece W, while front jaw 41 of shuttle vise 42 is open. Workpiece W then rolls on shuttle table dead rollers 40, outboard vise roller 51, shuttle vise rollers 52 and machine table rollers 54, and advances in a left-to-right direction of work flow as noted by arrow 56. Of course, in another embodiment of the invention the direction of work flow could be reversed (i.e. right to left in FIG. 2). In this case, shuttle table 16 would be to the right of machine table 12, in mirror image to the shown embodiment.

Flexible hydraulic lines 58 transmit power to moving parts of outboard vise 44 and shuttle vise 42. Hydraulic power is provided by any suitable means, such as a motor driven pump (not shown); alternately, power may be mechanically rather than hydraulically transmitted, as by gears and/or belts, or by electromechanical means.

At the rear of column 14 is shown a portion of reductor housing 60, which contains means to translate the motion from the axis of fluid motor 38 to a pinion gear axis that mates with curved rack 172 (FIG. 5) of the arcuate gear rack and pivot bearing plate 62. Affixed to the rear of reductor housing 60 is tilt motion encoder 64.

Figure 3:
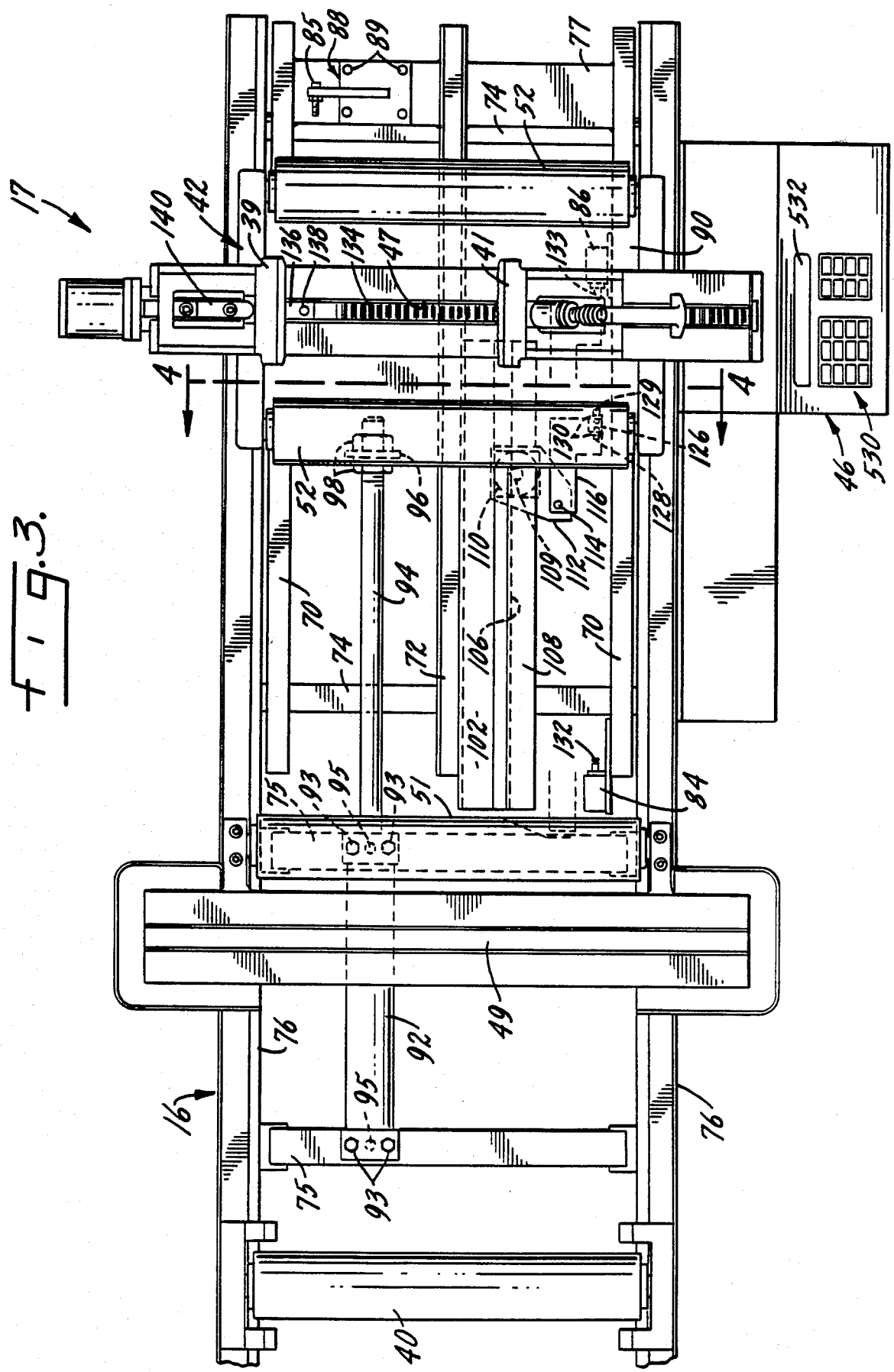
FIG. 3 is a plan of the shuttle table incorporated into the automatic saw machine of FIGS. 1 and 2, with parts omitted for clarity.
Figure 4:
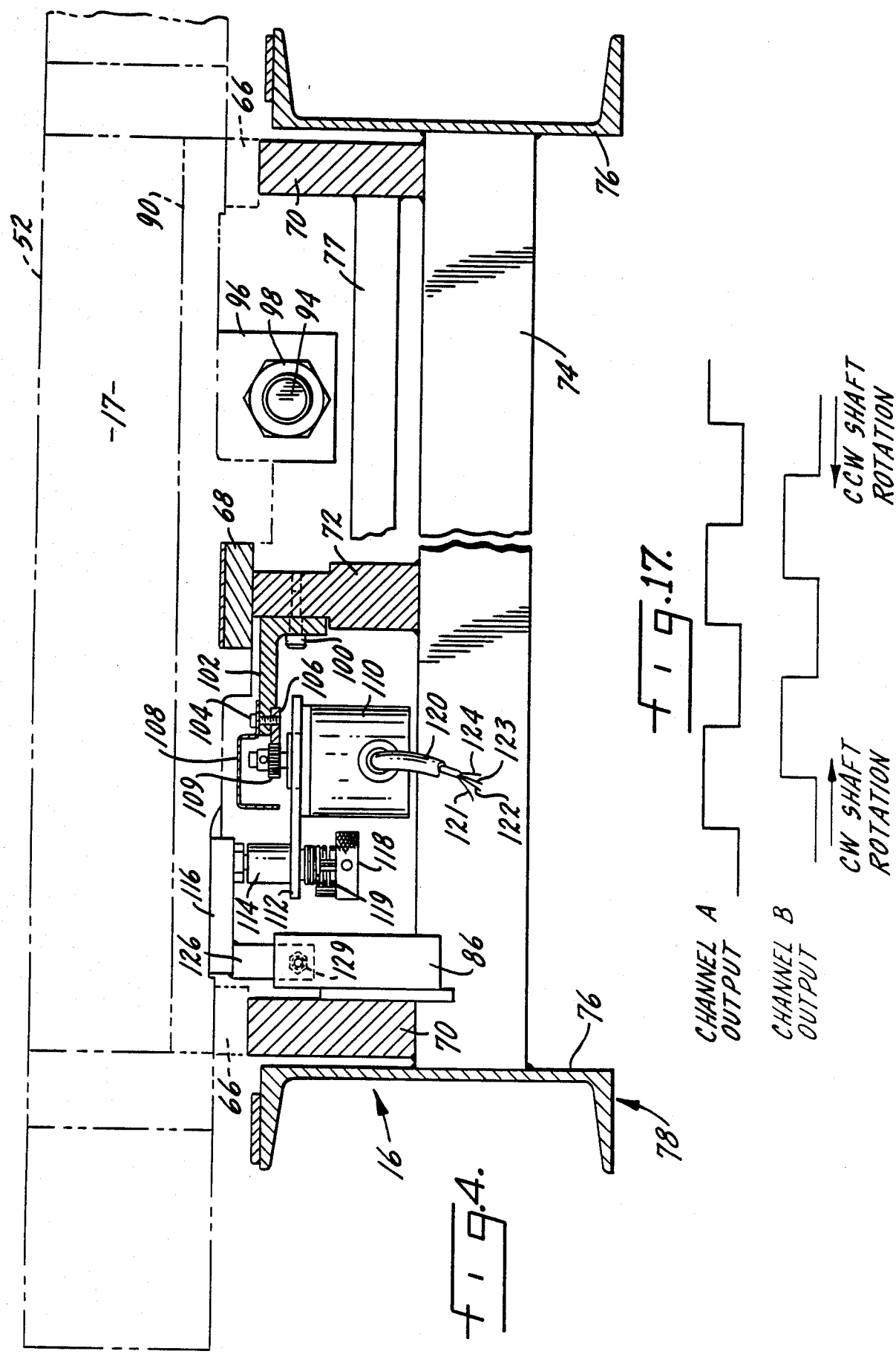
FIG. 4 is a transverse section taken substantially along Line 4—4 of FIG. 3.

FIGS. 3 and 4 more particularly show a preferred construction of shuttle table 16. Shuttle 17 here is shown as having support ways 66 (FIG. 4) and a center guide way 68, which make sliding contact with lubricated side slide surface 70 and center slide rail 72. These in turn are affixed as by welding to a plurality of transverse table frame members 74. Transverse members 74,75,77 are affixed as by welding to side structural members 76 to comprise shuttle track frame 78. Shuttle 17 could alternately be provided with rollers engaging suitable rails. Frame 78 is supported on legs 80 (FIG. 1) by means of levelling screws 82.

Shuttle 17 slides through a maximum stroke roughly defined by first shuttle limit switch 84 (FIG. 3) and second shuttle limit switch 86. Shuttle movement toward second limit switch 86 is limited by the end of the stroke of a cylinder 92 that moves the shuttle 17. The end of screw 85 comes into contact with transverse shuttle member 90 (FIG. 4). Stop bracket 88 may be affixed in any suitable manner as by screws 89 to member 77 as shown.

Powering the sliding movement of shuttle 17 in this embodiment is the hydraulic cylinder 92 (FIG. 3), connected by suitable valved hydraulic lines at ports 95, to a hydraulic pump (not shown). Cylinder 92 is affixed as by machine screws 93 to members 75. Cylinder rod 94 is affixed to shuttle bracket 96 as by nuts 98 in order to impart motion to the shuttle.

Attached as by screws 100 (FIG. 4) to center slide rail 72 is rack bracket 102, to which in turn is affixed as by screws 104 a linear gear rack 106 and a pinion gear shield 108. Mating with gear rack 106 is pinion gear 109 mounted on the axis of shuttle motion encoder 110. Motion encoder 110 is affixed by bracket 112 and shock-absorbing connector 114 to bracket 116. The bracket 116 is attached to the shuttle 17. Thumbscrew 118 and spring 11 allow for adjustment of the tension of shock-absorbing connector 114.

Shuttle motion encoder 110 is preferably an optical encoder of a type which can be purchased from Renco Company of Goleta, Calif. Renco is a division of a company known as Electrocraft. Alternatively, other types of transducers such as potentiometers or resolvers could be used.

Encoder 110 is electrically connected by cable 120, containing power conductor 121, ground 122, "A" communications channel 123 and "B" communications channel 124. Cable 120 is flexible and has sufficient slack to allow shuttle 17 to slide through its full stroke without restriction.

Also attached to shuttle bracket 116 is limit switch stop bracket 126, into which are threaded first and second limit switch stop screws 128, 129 and nuts 130. These mate coaxially with first and second limit switch screws 132, 133 and can be adjusted.

Front jaw 41 of shuttle vise 42 (FIG. 3) is opened and closed by a combination of a spring-tensioned ratchet key in the vise jaw (not shown) and a ratchet 134 keyed and affixed to hydraulic cylinder rod 136 as by machine screw 138. Ratchet 136 reciprocates within T-slot 47. Cylinder rod 136 reciprocates into cylinder 140 (only partially visable in FIG. 3 below rear shuttle vise jaw 39). Cylinder rod 140 has appropriate valved feed lines 58 (FIG. 2) to a hydraulic pressure source such as a pump (not shown). Outboard vise 44 and machine vises 20,21 also have ratchet/hydraulic methods of operation. All hydraulic vise lines are valved to selectively apply hydraulic pressure according to signals received by associated solid-state or solenoid relays.

Although the ratchet/hydraulic method of vise actuation has proven effective, the invention is not limited thereto but may instead include any means which will selectively open and close the vise in response to a signal, as by rack-and-pinion gearing, worm screws, or other mechanical, electric, hydraulic or pneumatic means.

Figure 6:
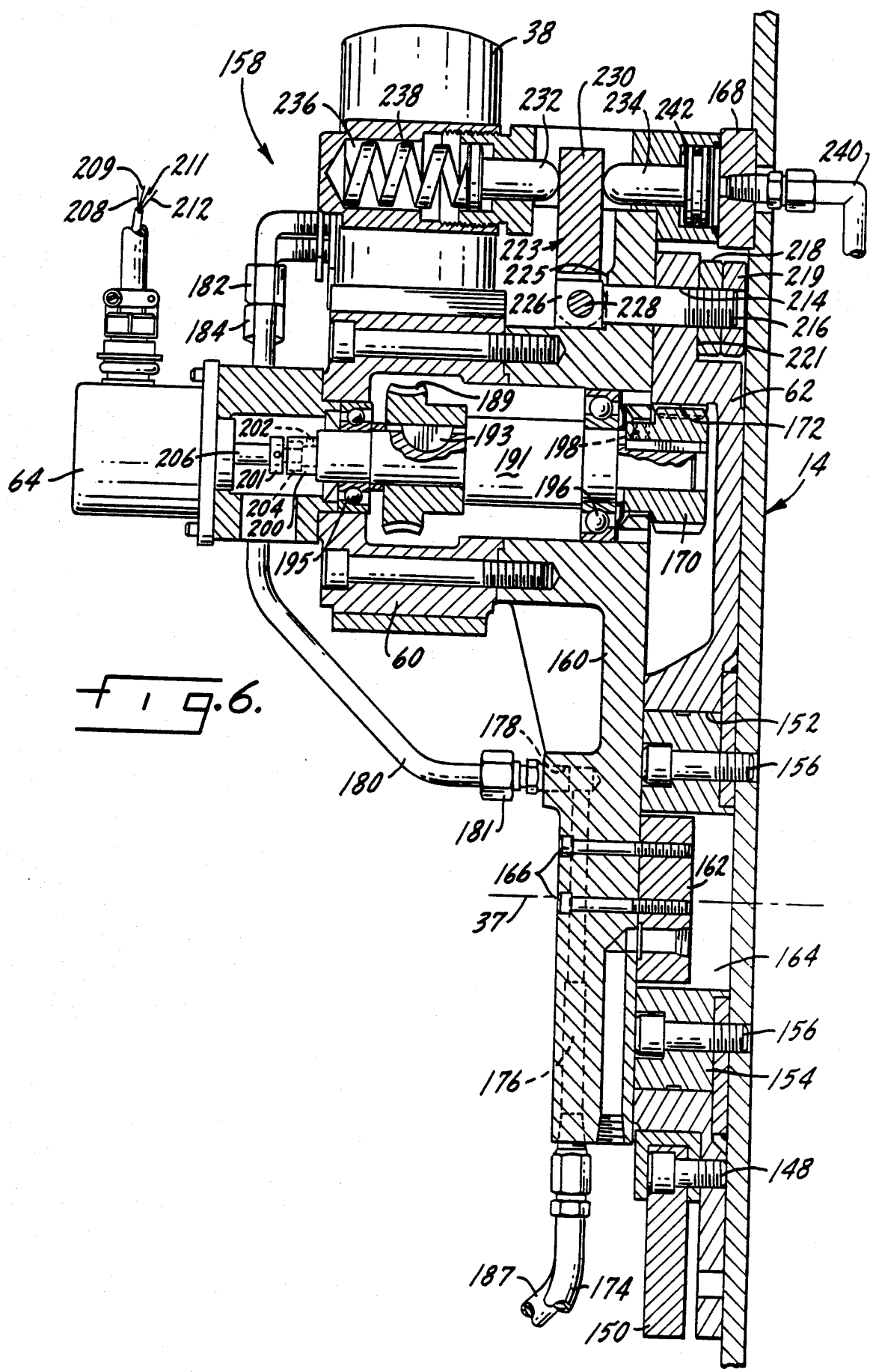
FIG. 6 is a section taken substantially along Line 6—6 of FIG. 5.

Turning now to FIGS. 5 and 6, arcuate gear rack and pivot bearing plate 62 is mounted as by screws 148 and roll pins 149 to rear saw carriage number 150. Plate 62 includes a cylindrical bearing surface 152 engaged by saw column pivot ring 154. Pivot ring 154 is affixed as by machine screws 156 to saw column 14.

Plate 62, which remains perpendicular, is on this embodiment situated to the rear of column 14 but in front of the tilt motion actuating and sensing means indicated generally at 158. These means, whose main structural support is cover plate 160, tilt in union with column 14. Connecting block 164 connects cover plate 160 to column 14 through cylindrical space 164 by means of machine screws 156+ or the like. Tilt means 158 is further supported and affixed to column 14 via support plate 168 at its upper end.

Column 14 is tilted from normal via the action of pinion gear 170 on arcuate rack 172. In a preferred embodiment, rack 172 allows column 14 to tilt to 45° away from normal in either direction.

In this embodiment, rotational force is provided to pinion gear 170 by a hydraulic-mechanical linkage. Other conventional means of providing power to gear 170 may be easily thought of, including electromechanical means. In the illustrated embodiment, hydraulic fluid is fed from a pressurized source such as a hydraulic pump (not shown) via either lines 174 or 187 to bores 176 in cover plate 160. Either line 174 is the pressure line with line 187 functioning as the return line or vice-versa depending on the desired direction of movement. Bores 176 communicate with horizontal bores 178. The bores 178 are coupled to conduits 180 and 186 via connectors 181 and 187. Conduits 180 and 186 supply hydraulic fluid to fluid motor 38 via connectors 182 and 184 depending on the desired direction of movement. After driving a turbine (not shown) inside fluid motor 38, hydraulic fluid exits via the opposite connector 184, 182 conduit 185, 186, 180 connector 187 or 181 and line 187 or 174.

The fluid motor 38 drives a worm (not shown) which in turn engages worm gear 189. Worm gear 189 is affixed to pinion shaft 191 as by woodruff key 193. Shaft 191 is supported on either end by bearing units 195, 196, and is axially affixed to pinion gear 170 as by key screw 198. At the other end, shaft 191 is axially affixed to and aligned with tilt motion encoder shaft connector 201 by means of connector 200. Connector 200 is affixed to the end of shaft 191 as by means of key screw 202, and employs shock absorbing element 204 to protect encoder 64 against sudden rotational shocks. Element 204 is made of rotationally flexing and elastic material which accommodates slight misalignments of the coaxial shaft 191 and the encoder shaft 206.

Connector 201 is axially affixed to encoder 206. Upon an incremental rotation of shaft 206, encoder 64 will send out a pair of square wave signals on lines 208, 209, in an order according to which direction shaft 206 is rotating. +5 V line 211 and ground line 212 complete the electrical connections to encoder 64. Encoder 64, like shuttle motion encoder 110, is an optical type in this embodiment. Alternately, an electromagnetic resolver could be used, or any other conventional means capable of transforming a rotational displacement into an electrical signal.

Above rack 172 in plate 62 is arcuate slot 214. Slot 214 receives stud 216, onto which are threaded locknuts 218, 219. Locknut 218 normally frictionally grips front surface 221 of plate 62 because of pulling tension exerted by stud 216. This tension in turn is caused by the force exerted by cam 223 on rear cover plate surface 225. Cam 223 is articulably affixed to head 226 of stud 216 by dowel pin 228. Region 230 of cam 223 is situated between plunger 232 and piston 234. Plunger 232 reciprocates inside chamber 236, but normally urges region 230 forward through the action of spring 238. This force is translated by the means above described to the frictional gripping force between rear locknut 218 and surface 221, and members 60 and 62. This force in turn prevents column 14 from moving in relation to plate 62.

When it is desired that column 14 change angular position, a signal is sent to a control valve (not shown) on line 240, opening it to allow hydraulic fluid to exert pressure on piston 234 inside of chamber 242. This causes piston 234 to urge region 230 rearward, allowing stud 216 to go forward thereby easing frictional contact of rear nut 218 on surface 221 and on members 60 and 62. This allows the fluid motor to move column 214 to swing to a new position in slot 214. This new position is fixed by reexerted friction between rear nut 218 and surface 221 as well as the members 60, 62 when line 240 is closed.

FIG. 7 more clearly shows the relationship of saw column 14, machine table 12, tilt mechanism 158 and saw carriage 250. Table 12 has affixed to its underside as by machine screws (not shown) left carriage rail 252 and right carriage rail 254. Saw carriage 250 is constructed of rear member 150 (see FIG. 6), left member 256, right member 258 and forward member 260, all secured together as by welding.

Attached as by welding to left member 256 is left front bearing block 262. Shown mounted through block 262 and left member 256 is stud 264 of bearing 266, as secured by nut 267. Bearing 266 mates with bottom race 268 of left rail 252. Mounted just behind bearing 266 is a further left front bearing (not shown) which mates with top race 270. Adjustment to a perfect match is made by rotating stud 264, which is off center from the axis of bearing 266.

The left rear of saw carriage 250 similarly has two bearings, one eccentric and one coaxial, which in a similar manner mate with left top race 270 and left bottom race 268, respectively.

Right member 258 is likewise supported by four bearings, two of which are eccentric. Right front eccentric bearing 272 has eccentric stud 274 threaded through right front bearing block 276 and secured by nut 278. Bearing 272 mates with lower cylindrical race 280. A normal right front bearing (not shown), mounted immediately behind bearing 272, engages upper cylindrical race 282. The right rear of carriage 250 has two similar bearings.

Also affixed to right member 258 as by welding is cylinder rod attachment bracket 284. Cylinder rod 286 is mounted to bracket 284 through bore 288 and is secured by a nut (not shown). Rod 286 reciprocates within carriage cylinder 290, itself affixed at a suitable point to table 12. By suitable hydraulic valving, cylinder 290 selectively causes carriage 250 to roll forward, feeding blade 34 into the workpiece. A change or reversal of hydraulic pressure returns carriage 250 back to its fully retracted position, as delimited by a mechanical stop (not shown), when cylinder 290 is not pressurized.

T-slots 27 are provided with ratchet inserts 292 for interaction with front jaws 25 of machine vises 20,21. Actuation of machine vises 20, 21 is accomplished hydraulically by means of a pair of external hydraulic cylinders 20a and 21a.

Lower band wheel cover member 30 has preferably welded to its upper end a bracket support block 294. Attached to cover member 30 and block 294 as by machine screws 296 is front pivot arm 298. Front pivot arm 298 has an arcuate member 300 from which protrudes forward an arcuate nose 302. Arcuate member 300 fits to a grooved arcuate recess 304 on the rear of front pivot bearing 306. Front pivot bearing 306 is itself affixed to U-shaped mounting blocks 308 and front carriage member 260 by screws 310.

Ideally, tilt axis 37 lies exactly in the plane of machine table to 18. More usually, the axis is offset from the table plane by a perpendicular distance p, here shown greatly exaggerated.

Figure 9:
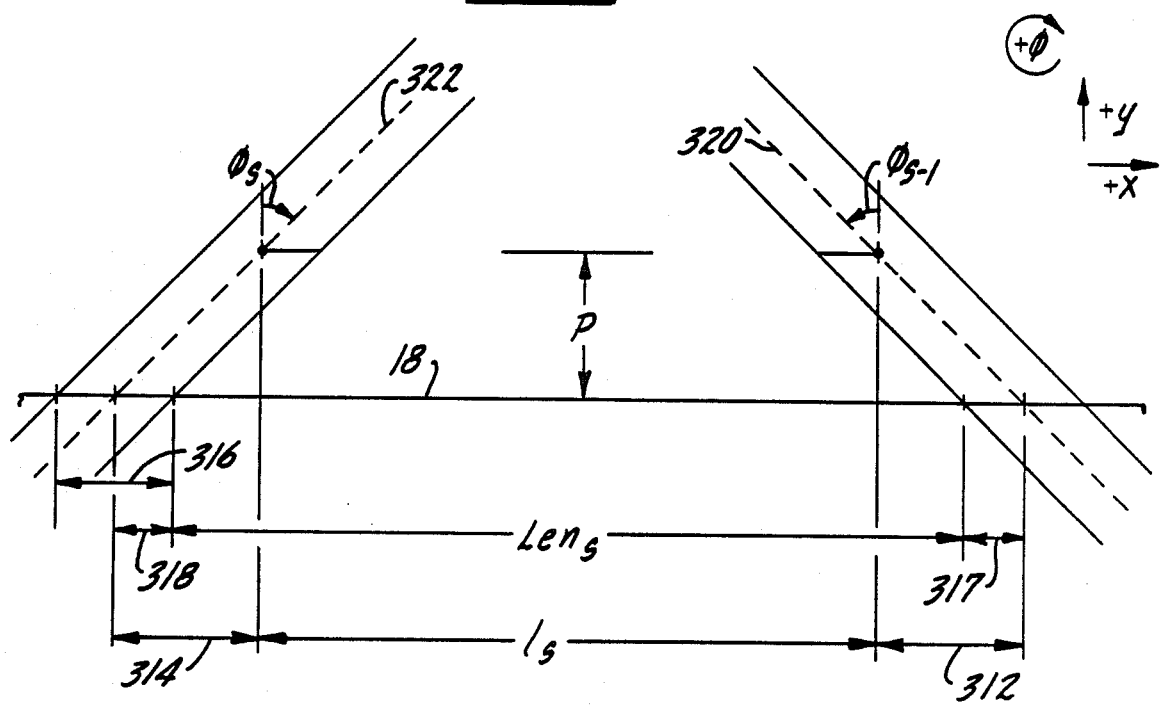
FIG. 9 is a diagram showing certain mathematical relationships of the machine table surface, saw blade and tilt axis.

The distance p, also known as the pivot point correction factor, is more clearly shown in FIG. 9. For a saw step s in a program of multiple steps, there will be a saw angle $\phi_s$ away from normal and a desired length $Len_s$ of cut workpiece $W_s$.

The value p will cause the sawed length $Len_s$ to vary away from the desired length according to the quantity:

$$Len_s + p(\tan \phi_{s-1} - \tan (100_s)).$$

In FIG. 9, distance (p tan $\phi_{s-1}$) is shown at 312 as an offset due to angle $\phi_{s-1}$ cut before workpiece $W_s$'s corrected length $l_s$ was pulled, and distance (p tan $\phi_s$) is shown at 314 as an offset which occurs due to the current cutting angle $\phi_s$. Therefore, one task of programmable controller 46 is to calculate a corrected pull length $l_s$ based on a desired finished workpiece length $Len_s$ for each saw step s:

$$l_s = Len_s + p(\tan \phi_{s-1} - \tan \phi_s)$$

FIG. 9 also illustrates the effect of $\phi_s$ and $\phi_{s-1}$ *on the horizontal projection of saw kerf k. As measured along any plane parallel to plane* 18, *saw cut s at angle* $\phi_s$ causes a linear quantity of material loss equal to k sec $\phi_s$ as shown at 316. The blade tilt pivot point is on the center line of the blade shown at 322 and 320 for cuts S and S−1, respectively. The quantity of material lost due to the blade kerf for cut S is half that lost for each cut S and S−1 taken individually and is shown at 318 and 317 for cut S and cut S−1, respectively. The length of 318 is k/2 sec $\phi_s$ and the length of 317 is sec k/2 sec $\phi_{s-1}$. As viewed in isolation, desired length $Len_s$ for workpiece $W_s$ should be modified to pull length $l_s$ according to the following quantity:

$$l_s = Len_s + \frac{k}{2}(\sec \phi_s + \sec \phi_{s-1}).$$

When the pivot point correction factor p and the saw kerf k are both considered, desired length $Len_s$ should be modified by programmable controller 46 to pull length $l_s$ according to the following equation:

$$l_s = Len_s + \frac{k}{2}(\sec \phi_s + \sec \phi_{s-1}) + p(\tan \phi_{s-1} - \tan \phi_s).$$

Note that the first saw steps should always be a trim cut. In this instance $\phi_o$ is not necessarily known. The controller 48 arbitrarily sets the value of $\phi_o$ to zero in the equation for $l_s$ when s=1. Since this first cut should be a trim cut, any error caused by assuming that $\phi_o=0$ will be of no consequence.

Figure 8:
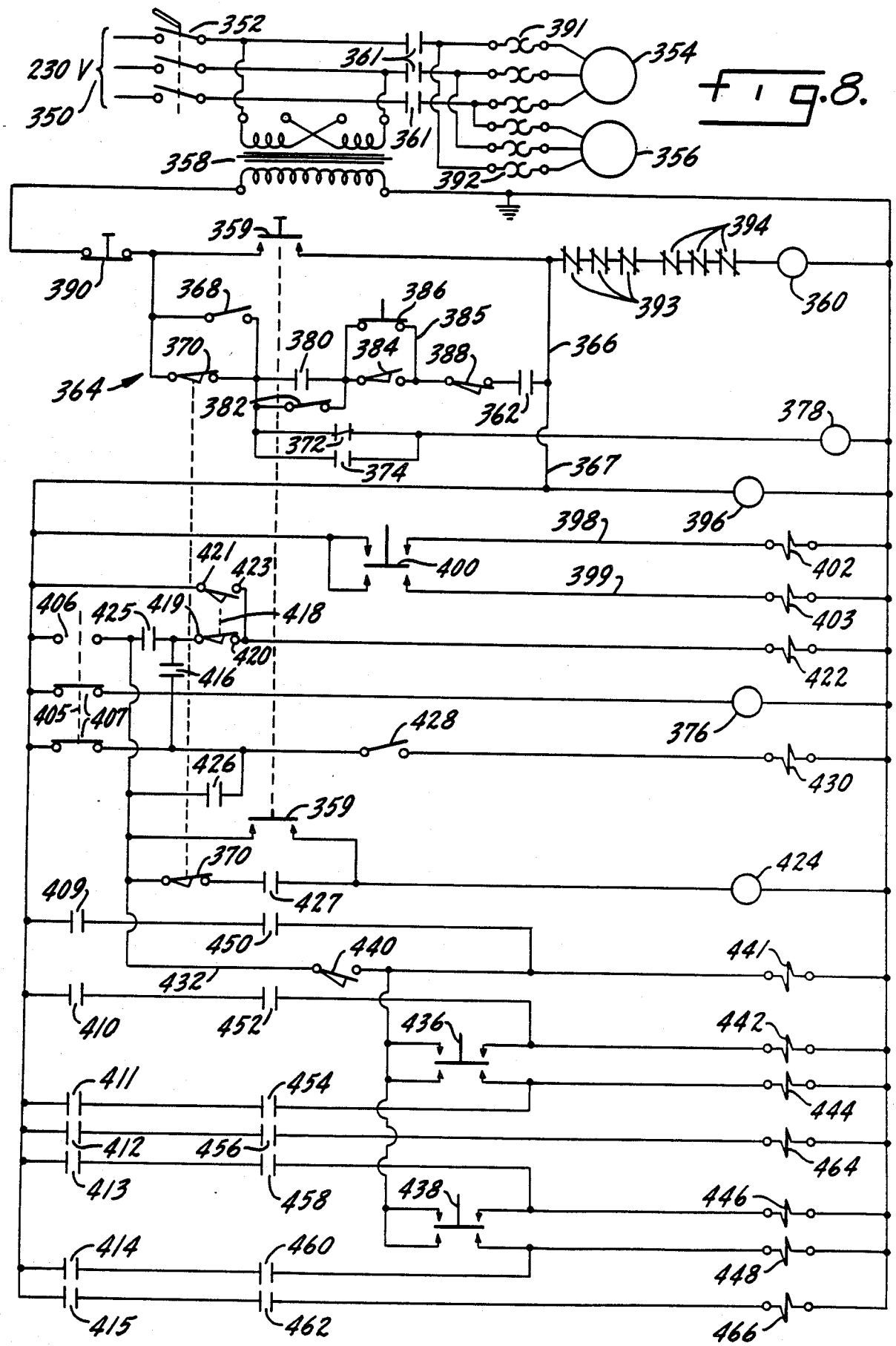
FIG. 8 is an electrical diagram of the automatic saw machine, showing relays and switching employed in controlling the mechanical elements of the machine.

Turning now to the electrical operation of the automatic band saw, FIG. 8 shows a simplified electrical diagram with such elements as fuses omitted. In this embodiment, electrical power is supplied from 3-phase 60 Hz or 50 Hz source 350 at 230 V or other standard voltage, i.e. 460, 230, 575 or 220, 380, 415 volts, through main disconnect switch 352. Main hydraulic motor 354 supplies hydraulic fluid through lines to run the band saw and actuate vises, shuttle, etc. Coolant motor 356 supplies liquid coolant to blade 34 for increased cutting efficiency. A single phase of the 230 V power is transformed down at 358 to e.g. 115 volts for supply to the rest of the electrical system.

Upon pressing start button 359, starter motor 360 is energized. Starter motor 360 closes contacts 361 to energize main motor 354 coolant motor (356) and also closes contact 362 in holding circuit 364. However, as soon as button 359 is not pressed, power will not continue to be delivered to the machine through line 366 or 367 unless the following elements are closed to energize circuit 364: (1) stop forward/auto return carriage selector switch 368 or blade forward limit switch 370 and (2) auto cycle relay contact 372 or holding circuit solid state relay 374. Switch 368 will be open when the operator selects for the carriage to stop at the forward position at the end of its feed, and switch 368 will be closed when a carriage automatic return to the home position is selected. Blade forward switch 370 is closed when saw column 14 is not all of the way forward. Auto cycle relay contact 372 opens upon actuation of auto cycle relay 376; solid state hold circuit relay 374 closes in response to a command from programmable controller 46 (see FIG. 10).

Energization of hold circuit 364 causes actuation of holding circuit relay 378, which in turn closes contact 380. Contact 380, and thus holding circuit relay 378, may be circumvented by closing auto stop switch 382 to "off" as shown.

For power to be delivered to the machine, out-of-stock limit switch 384 must be closed or circumvented via circuit 385 and switch 386, and broken blade limit switch 388 must be closed Out-of-stock limit switch 384 opens when there is no more workpiece to index on machine table 12. Broken blade limit switch 388 is held closed by band saw blade 34, and will open if blade 34 snaps.

Additionally, master stop switch 390 must be closed for power delivery to the rest of the machine. Overcurrent thermal relays 391, 392 protect motors 354, 356 by opening contacts 393, 394, disconnecting starter motor 360, which in turn then opens contacts 361, 362.

Power line 367 delivers power to a series of ladder circuits, the first of which energizes fan motor 396 for cooling motors 354, 356.

Next are blade guide circuits 398, 399. Switch 400 can be made to complete circuit 398, which will actuate hydraulic solenoid 402 and cause saw blade guide arm 32 (FIG. 1) to move upward. It may also be made to complete circuit 399, which will actuate hydraulic solenoid 403 and cause blade guide arm 32 to move downward to closely fit the workpiece diameter Switch 405 selects between single-cut operation at position 406 and automatic operation at positions 407. Contact at positions 407 enables auto cycle relay 376, which in turn closes contacts 409, 410, 411, 412, 413, 414 and 415 and opens contact 372. When solid state relay 416 closes upon a command from programmable controller 46, and rapid return return limit switch 418[1] closes across contacts 419, 420, blade feed solenoid 422 is actuated, pressurizing feed cylinder 290 and causing saw carriage 250 to advance.

Rapid return limit switch 418, when it senses that carriage 250 has advanced to its most forward position, opens contacts 419, 420 and closes across contacts 421, 423. This actuates solenoid 422 to pressurize feed cylinder 290 in reverse, causing carriage 250 to quickly return to its home position.

Selecting single-cut operation at 406 and pressing start button 359 will cause actuation of single-cut holding circuit relay 424. Relay 424 in turn closes contacts 425, 426 and 427. Relay 424 will stay energized after start button 359 is released only if blade forward limit switch 370 is closed.

Closure of contact 425 actuates blade feed solenoid 422 when rapid return limit switch 418 has closed contacts 419, 420. Closure of contact 426 allows blade run selector switch 428 to actuate blade run solenoid 430. Blade run solenoid 430 actuates an associated hydraulic valve to deliver hydraulic fluid to the blade drive means (not shown).

Shuttle vise 42, shuttle 17 and tilting means 158 can all be operated either manually or automatically. When single-cut or manual operation is selected at 406, line 432 delivers power to shuttle selector switch 436 and tilt switch 438 when blade back limit switch 440 is closed. Limit switch 440 senses when saw carriage 250 has retracted to home position, at which time it closes.

Shuttle switch 436 may select to actuate shuttle advance solenoid 442 or shuttle retract solenoid 444. Shuttle advance solenoid 442 will cause shuttle cylinder 92 to be pressurized in a manner that causes shuttle 17 to move toward the right (in a saw machine built for left-to-right work flow); shuttle retract solenoid 444 pressurizes cylinder 92 in a manner which causes shuttle 17 to move left.

In machines employing means to tilt blade 34 away from normal, the operator may use tilt switch 438 to manually select to tilt the saw blade to the right via right tilt solenoid 446, or to the left via tilt solenoid 448. Solenoids 446 and 448 respectively pressurize lines 174 and 187 as by a valve to actuate fluid motor 38 to turn either counterclockwise or clockwise, driving pinion gear 170 to tilt column 14 to the right or to the left.

Actuation of contacts 409-415 by relay 424 allows the control of these same saw components by programmable controller 46 through solid state relays 450, 452, 454, 456, 458, 460 and 462. Solid state relays 450, 452, 454, 458 and 460 selectively actuate solenoids 441, 442, 444, 446 and 448, respectively, according to commands received from programmable controller 46. Solid state relay 456 actuates shuttle creep solenoid 464, which in this embodiment lessens the speed of cylinder 92 by restricting the cylinder's hydraulic supply lines by fluid control valves (not shown). Solid state relay 462 actuates tilt creep solenoid 466, which hydraulically restricts lines 174 or line 187 to similarly reduce the speed of the fluid motor 38.

Figure 10:
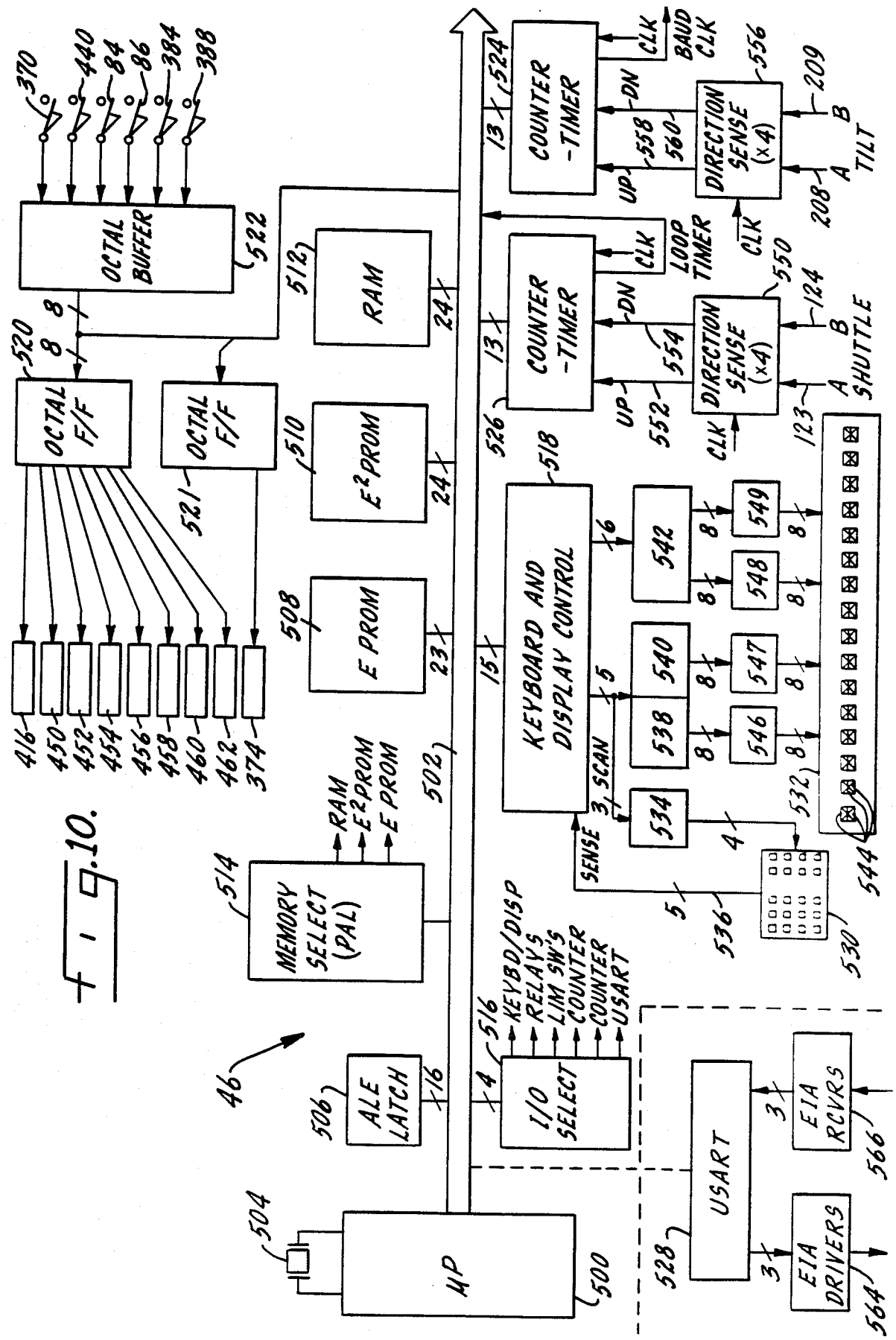
FIG. 10 is a block diagram of the programmable controller employed in the invention, including interfaces to the keyboard/display, relays, limit switches and motion encoders.

FIG. 10 shows the architecture of programmable controller 46. Microprocessor 500 in this embodiment may be an Intel or other 8085 8-bit NMOS device with a multiplexed bus 502 and a 4.9152 MHz crystal clock 504. ALE or address latch unit 506 holds the lower byte of address while data is present on bus 502. Memory devices 508, 510 and 512 are selected by microprocessor 500 through the address section of bus 502 and a programmable array logic (PAL) chip 514. PAL chip 514 is externally programmed with the memory map of controller 46. One-of-eight decoder 516 selects the addresses of input/output devices 518, 520, 521, 522, 524, 526 and 528.

Electrically programmable read only memory (EPROM) element 508 stores the instructions for the saw operating program. In this embodiment, it comprises $8 \times 8K$ devices, which may be replaced by denser devices in the future as these become more economical. Random access memory (RAM) element 512, here comprising a $2K \times 8$ NMOS or CMOS device, is used for storage of temporary data, stack memory and various housekeeping functions of the saw program. Electrically erasable and programmable read only memory ($E^2$PROM) unit 510 is a $2K \times 8$ nonvolatile memory device that is used to hold the parameters of the entered sawing steps and certain set-up parameters which configure the saw at the time of manufacture, such as pivot point correction factor p, blade kerf k, shuttle signal deadband b, etc.

Keyboard and display controller 518, which can be an Intel 8279-5 chip or functionally similar element, serves as an interface to microprocessor 500 for keyboard 530 and display 532. Controller 518 performs keyboard scan, debounce and first in/first out storage data functions. Controller 518 also receives display character codes in ASCII from microprocessor 500 and controls display scan timing and inter-character blanking.

Keyboard/display controller 518 directs one-of-eight scanner 534 to scan keyboard 530 for new input data. Any new data found is transmitted via line 536 back to controller 518. Display scanning is accomplished through addressable latchs 538 and 540. Controller 518 transmits received ASCII code to character generator 542, which converts the code into character segments and directs which of each of the British-flag style vacuum fluorescent (VF) segments 544 will light up. All signals to display 532 are converted to high voltage by high voltage display drivers 546-549. Display 532 can also employ LED, LCD or plasma technology, but VF technology is preferred because of ease of viewing and interface.

Octal flip flop 520 stores the commands to, and the states of, solid-state relays 416, 450, 452, 454, 456, 458, 460 and 462, which in turn control various automatic functions of the saw (See FIG. 8). Octal flip-flop 521 likewise stores the last command to, and the state of, solid state relay 374, and has seven spare ports to service seven additional solid state relays for further automated functions.

Octal buffer 522 interfaces bus 502 with signals from limit switches 370, 440, 84, 86, 384 and 388. In addition to the contacts shown in FIG. 8, the limit switches listed below each have a normally open contact which closes upon the following conditions:

| limit switch | condition |
| --- | --- |
| 370 | saw cut complete (blade forward) |
| 440 | blade retracted |
| 84 | shuttle full retract |
| 86 | shuttle home (forward) |
| 384 | out of stock |
| 388 | broken blade |

Shuttle encoder Channel A 123 and Channel B 124 send quadrature square wave signals to direction sensor element 550. Element 550, which in one embodiment comprises half of a 74LS374 clocked register chip and two 74LS156 programmable array logic (PAL) chips, is able to sense that a pulse on channel 123 arrives slightly ahead of a pulse on channel 124. It translates this time differential into a direction sense, and sends an up-count (incremental amount of movement toward the right) on line 552 or a downcount (incremental amount of movement toward the left) on line 554 to counter-timer 526. Counter-timer 526 sums the up-counts and the down-counts in separate registers. The registers' contents are periodically read by microprocessor 500 and subtracted from each other to obtain a true shuttle displacement.

The outputs on the encoder channels 123 and 124 are two quadrature (90 degree phase relationship) square waves (A and B). When the encoder rotates clockwise (CW), the signal on channel A 123 leads the signal on channel B 124. When the encoder rorates counter-clockwise (CCW), the signal on channel B 124 leads the signal on channel A 123. FIG. 17 illustrates the signals on the channels A, B as the shaft of the encoder is rotated.

The encoder quadrature waveforms of FIG. 17 are synchronized by clocking them into a register. A is the unclocked waveform. $A_{n-1}$ is clocked on the previous clock pulse and $A_n$ is clocked on the current clock pulse. In FIG. 18, the horizontal axis is time. The B signal is clocked similarly.

This technique guarantees a fixed time relationship (regardless of encoder speed) between $A_{n-1}$ and $A_n$. This interval is very fast with respect to encoder motion. If we are rocking up and down on an edge of A, we see all of the ups and downs with no uncertain slivers.

| UP COUNT = | $\underline{A}_n$ | $\overline{B}_n$ | $\overline{A}_{n-1}$ | $B_{n-1}$ | + |
| --- | --- | --- | --- | --- | --- |
| (on the | $A_n$ | $\underline{B}_n$ | $\underline{A}_{n-1}$ | $B_{n-1}$ | + |
| line 552) | $A_n$ | $B_n$ | $\underline{A}_{n-1}$ | $B_{n-1}$ | + |
|  | $A_n$ | $B_n$ | $\underline{A}_{n-1}$ | $B_{n-1}$ |  |
| DOWN COUNT = | $A_n$ | $B_n$ | $\underline{A}_{n-1}$ | $\underline{B}_{n-1}$ | + |
| (on the | $A_n$ | $\underline{B}_n$ | $A_{n-1}$ | $B_{n-1}$ | + |
| line 552) | $A_n$ | $B_n$ | $\underline{A}_{n-1}$ | $B_{n-1}$ | + |
|  | $A_n$ | $B_n$ | $A_{n-1}$ | $B_{n-1}$ |  |

Direction sensor 550 is also able to sense the up-slope and down-slope of each quadrature square wave. Since two such waves are sent for each increment travelled, four separate events are counted, increasing detection accuracy by four.

In a similar manner, tilt encoder 64 sends quadrature wave signals through Channel A(208) and Channel B(209) to direction sensor element 556, which senses each quadrature wave up-slope and down-slope as separate events and generates up-counts and down-counts in a manner similar to direction sensor 550. An up-count on line 558 represents an angular incremental movement of column 14 to the right; a down-count represents an imcremental angle to the left. Up-counts and down-counts are summed in separate registers, whose contents are periodically retrieved by microprocessor 500 and subtracted from each other to obtain a true tilt angle.

Optionally, microprocessor 500 may be programmed with an operating program, and directed, by an external main-frame computer. For this purpose a universal synchronous or asynchronous receiver/transmitter (USART) 528 is provided. RS-232C serial communication driver and receiver chips 564, 566 are coupled to the USART 528.

As a reference for the discussion of operation below, FIG. 11 shows keyboard 530 and display 532 in more detail. Numeric keypad 568 has numeric keys 570, decimal key 571 and sign key (+/−) 572. Function key pad 574 has a start/stop key 576, END key 578, ENTER key 580, RUN/PRG key 582, CLEAR key 584, TILT ZERO key 586 and "#" key 588.

Figure 12:
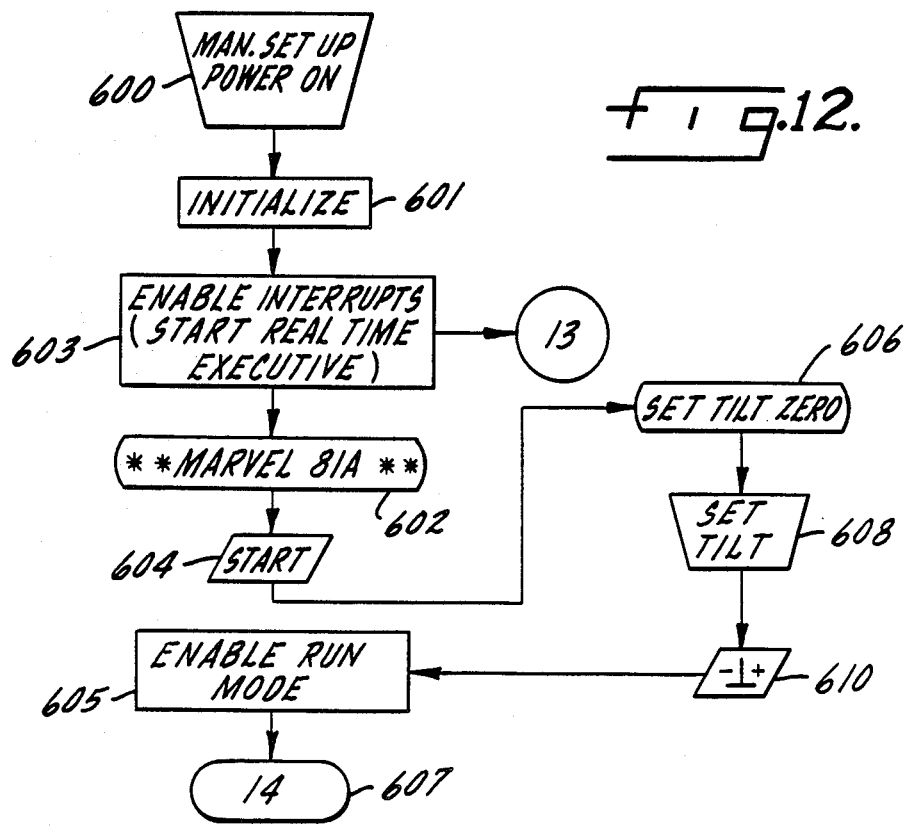
FIG. 12 is a user/controller flowchart diagramming the main program and startup procedure.

A preferred method of operating the illustrated band saw will now be described. Referring to FIG. 12, an exemplary user/controller controller flow-chart for a main program module is shown. This module begins execution of the real time executive module, program mode task module and the run mode task module. The operator begins operation by turning on the power and performing certain manual steps at step 600, which are performed at manual console 48 (FIG. 1). Among the settings to be made are the adjustment of blade guide arm 32 upward or downward to be close to workpiece W by operation of blade guide selector switch 400 (FIG. 8). Single/auto selector switch 405 should be in "auto" position across contacts 407. Stop forward/auto return carriage selector switch 368 should be in "auto", or closed, position. Blade run selector switch 428 should be in "run" (Closed) position.

After the power is turned on, the main program initializes all saw control hardware at step 601. This includes initialization of the encoder electronics, keyboard/display, real time clock, solid state relays and program RAM. System variables are initialized and the RUN mode module (see FIG. 15) stack area is defined.

At 603, the main program starts the system real time clock and enables interrupts for the clock. In so doing, the main program begins execution of the real time executive program module (see FIG. 13) at the first real time clock interrupt. At 602, a beginning message is displayed.

The operator presses the START key at 604 to get a SET TILT ZERO message on the display at 606. This last message is a reminder to manually adjust column 14 at 608 so that it is in a perpendicular, or 0°, position. After this adjustment the operator presses the $\pm$ key 586 at 610. Thereafter, the main program enables execution of the RUN mode module (FIG. 15) at 605 and irreversibly transfers control to the program mode task module at 607.

Turning now to FIG. 13, the real time executive program module controls overall execution of the saw control unit program from the time the main program starts the real time clock and enables interrupts at 603 (FIG. 12). In this embodiment the real time clock interrupts once each 20 milliseconds. At each interrupt, execution is suspended for whichever module was running (main program, program mode task or run mode task) and control is passed to the executive module at 609. The real time executive module first restarts the watchdog timer at 611.

At 613, the state of broken blade limit switch 388 is retrieved. If the saw blade is broken, the executive module turns off all solid state relays at 615 (374, 416, 450, 452, 454, 456, 458, 460, 462; FIG. 10), halting any saw motion. If a blade break condition does not exist, the executive module will then determine at 617 whether shuttle 17 is moving by reading the counts stored in counter-timer 526 (FIG. 10) and comparing them to the last read values.

If shuttle 17 is found to be moving, shuttle motion control is performed at 619 (FIG. 13). Microprocessor 500 samples the contents of the up-count and down-count registers in counter-timer 526 (FIG. 10) and decrements a calculated pull length value $l_d$ at 625. As decremented, $l_d$ is compared against a shuttle creep length c, a shuttle stop-look-ahead length h and a shuttle signal deadband length b. If $l_d \leq c$, microprocessor 500 commands solid state relay 456 to restrict the flow in an appropriate hydraulic line servicing cylinder 92 (FIG. 3), thereby slowing shuttle movement. If $l_d \leq h$, the program will turn off solid state relay 454 and therefore the hydraulic supply to cylinder 92, ceasing cylinder 92's retracting force and allowing shuttle 17 to coast. Also, when $l_d \leq h$ control will no longer be transferred back to the program mode or run mode; $l_d$ is decremented and compared against b in successive loops of the executive module until $l_d \leq b$. If $l_d \leq b$, the program turns on shuttle vise relay 450 (FIGS. 8 and 10), which will begin actuating shuttle vise 42 (FIG. 2). By the time vise 42 grips workpiece W, the shuttle will have moved through distance b; thus, the length subsequently pulled forward will be very close to the calculated pull length.

After performing any shuttle motion control at 619, the executive module next asks at 621 whether column 14 is tilting, looking at the registers in counter-timer 524 to do so. If column 14 is found to be tilting, the executive module performs tilt motion control at 623 in a manner similar to the performance of shuttle motion control. In any one loop, tilt angle $\phi_d$ (as decremented at 625 by the last executive module pass) is compared against tilt creep angle $v$, stop-look-ahead angle L and tilt signal deadband $\beta$. If $\phi_d \leq v$, tilt slow down relay 462 (FIG. 10) is actuated, decreasing the rate of angular displacement by restricting hydraulic low to motor 38 (FIG. 6). If $\phi_d \leq L$, the program actuates solid state relay 458 or 460 (depending on which way column 14 is tilting) to cut off hydraulic flow to motor 38, allowing column 14 to coast. Also, this condition will prevent control being transferred to another module; the executive module will loop successively until it determines that $\phi_d \leq \beta$.

When $\phi_d \leq \beta$, a "halt tilt" command closes hydraulic line 240 (FIG. 6), allowing rear locknut 218 to frictionally grip surface 221 and fix column 14 in its new angular position, which will then be very close to the desired tilt angle $\phi_s$.

After performance of any tilt motion control, the executive module will update shuttle and tilt position at 625 as previously described. At 627, the module performs keyboard and display input/output. This includes the sampling input data from keyboard 530 if any exists and the updating of data displayed on display 532. If the executive mode module has interrupted the execution of the program mode task module (FIG. 14) and the program mode task module has requested a write of (e.g.) saw step data to E$^2$PROM 510, this is done at 629.

At 631, the module determines to which other module (program or run) control will be transferred. The real time executive module determines this by which of these modules was last executing before interrupt 609. If the run module was last being executed, stack and data area pointers are set to allow execution of the program module at 633 upon release of control; if the program module was last being executed, the pointers are set at 635 to allow the execution of the run module upon release of control. In this way, the program and run tasks are allowed to execute in alternating 20 millisecond time slices so that an operator may program one job while running another.

Thereafter the executive module increments a software timer variable at 637 and then transfers control at 639 to either the run mode or the programming mode as previously determined at 631.

Figure 14:
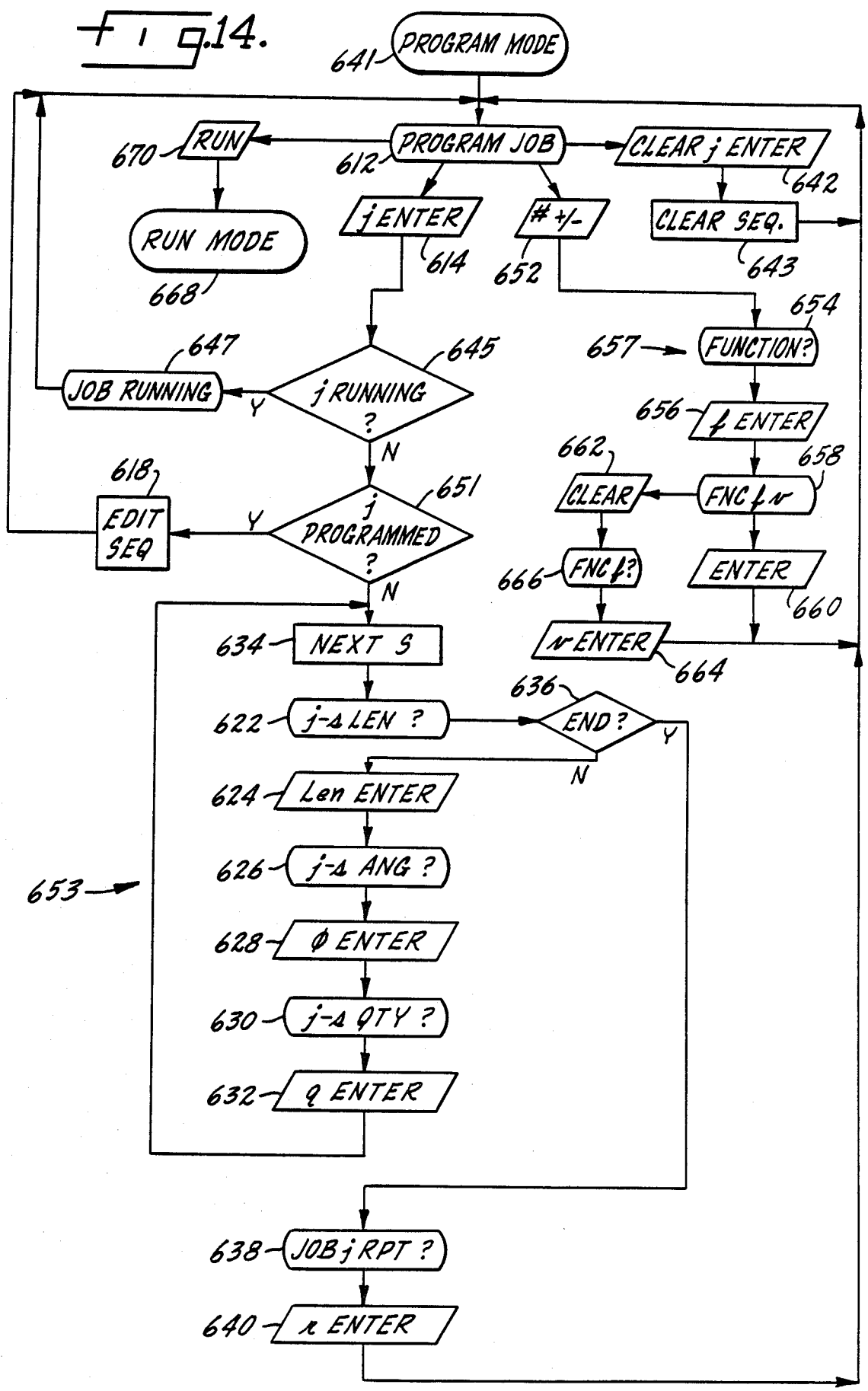
FIG. 14 is a user/controller flowchart diagramming the program mode task and procedure.

Turning to FIG. 14, when the real-time executive module transfers control to the programming module at 641, the programming module first prompts the operator with PROGRAM JOB ? at 612. The operator may make any of several responses to this, including pressing RUN key 582 at 670, keying in the job number j and ENTER at 614, pressing "#" key 588 and "+/−" key 572 at 652 to program a function, or keying in CLEAR j ENTER at 642.

Figure 15:
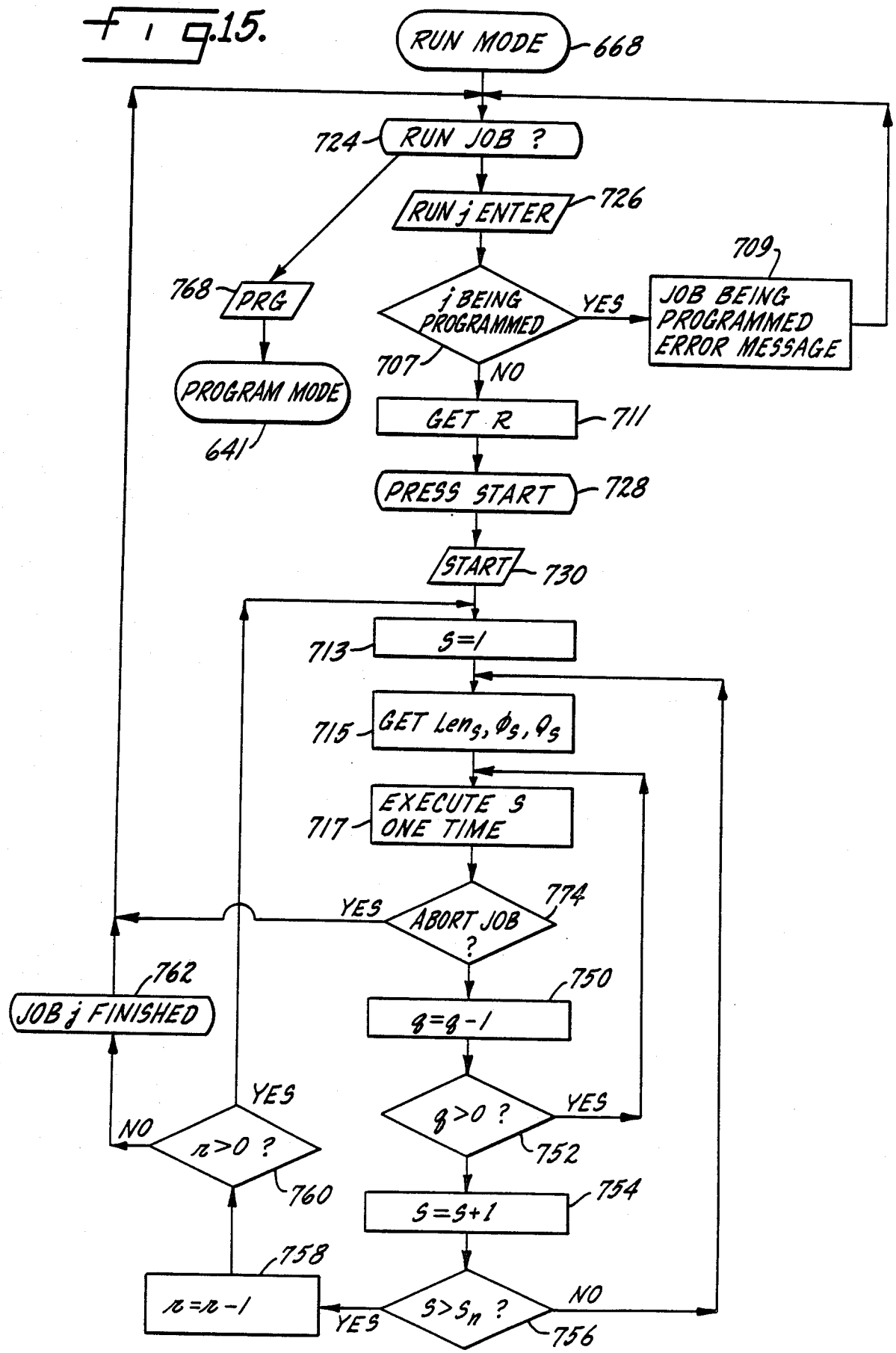
FIG. 15 is a flowchart diagramming the run mode task.

Response 670 will cause control of the keyboard/display to be transferred to the run task module at 668 (FIG. 15). Entry 642 will cause execution of a CLEAR subroutine at 643, where in response to appropriate display prompts an operator may clear the data for any job j from E$^2$PROM 510.

In response to entry 614, the programming module will determine whether job j is running at 645. If it is, a JOB RUNNING error message will be displayed at 647 and the operator is dumped to the beginning of the module. If job j is not running, the module next asks if the indicated job has already been programmed at 651. If job j has not been previously programmed, the module branches to new job entry sequence 653; programmed, the module branches to new job entry sequence 653; otherwise, the module goes to edit sequence 618.

At the beginning of new job entry sequence 653, the module retrieves the next step number (beginning at step number s=1) at 634. The module will then prompt for the workpiece length Len$_s$ desired at 622. After this has been entered, saw angle $\phi_s$ is prompted for and entered at 621, 268, and the number of times the step is to be repeated (quantity q$_s$) at 630, 632. The above data make up one step. The module will then increment s by 1 at 634 and prompt for the length of the next step at 622.

The operator may press END key 578 at this point (636) which will cause the module to prompt for a repeat number r at 638. Upon entry of r at 640, the program prompts for another job at 612.

For the entry of further steps in job j, the operator does not press END at 636 but goes through steps 622-632 again.

Edit sequence 618 comprises a series of prompts and responses similar to entry sequence 653. Through it an operator may add, clear or modify job steps and may change job repeat factor r. As an example in this sequence a "j-s LEN ? Len" prompt, where j, s and Len are actually numbers, asks the operator to change or confirm a workpiece length for a particular step and job. To change the length, the operator would key in CLEAR, Len, ENTER; to confirm the length, the operator would merely press ENTER.

Entry 652 causes FUNCTION? prompt 654 to appear on display 532 at the beginning of function sequence 657. An "f ENTER" entry at 656, where f is a function number, will produce "FNC f v" display 658 showing value v for that function. Value v may be confirmed by pressing ENTER at 660, or may change by clearing at 662 and entering a new value at 664. Functions available to the operator include changing saw kerf k, and setting up the machine to interpret data as either English or Metric units.

Turning to FIG. 15, upon transfer of control to RUN mode at 668, the run module will display RUN JOB? prompt at 724. Pressing PRG key 582 at 768 transfers control of the keyboard/display back to the programming module at 641 (FIG. 14). Keying in RUN j ENTER at 726, where j is a job number, leads to a determination as to whether job j is currently being programmed at 707. If it is, an error message will be displayed at 709. Otherwise, job repeat factor R is retrieved at 711. The module then prompts for START to be pressed at 728; pressing START button 576 at 730 leads the module to initialize step number s to 1 at 713.

For step s, the module retrieves a saw step length $Len_s$, saw angle $\phi_s$ and quantity $q_s$ and loads them into RAM 512 at 715. The module then executes saw step s one time at 717.

FIG. 16 shows the execution of a job step in detail. The pull length $l_s$ is calculated at step 723 from $Len_s$, k, $\phi_{s-1}$, $\phi_s$, and p in the manner previously described. The run module next looks at limit switch 440 (FIG. 10) at 734 to determine whether saw carriage 250 has been fully retracted. If not, the program will loop until it does. When a "blade home" or carriage retracted condition does obtain, the run module commands column 14 to begin tilting at 740. After column 14 begins tilting, the executive module will monitor it, performing tilt motion control (623, FIG. 14) as necessary.

Next, the run module commands solid state relay 452 (FIG. 10) to advance shuttle 17 to its home (in this embodiment, farthest right) position, which is defined as zero after motion encoder 110 stops sensing increments. At 742, the module commands shuttle 17 through solid state relay 454 to begin retracting. After this command is issued, the executive module will perform shuttle motion control (619, FIG. 13) at each of a successive series of program interrupts until the shuttle has travelled the desired pull length $l_s$. The run module then closes shuttle vise 42 via relay 450 (FIG. 10) opens outboard vise 44 and machine vises 20, 21 after a delay, and pulls the workpiece forward by reactivating relay 452.

At 739, the run module opens shuttle vise 42 and after a short delay closes outboard vise 44 and machine vises 20, 21, all through relay 450 (FIG. 10). At 741, the module looks at the state of out-of-stock limit switch 384 (FIG. 10). If switch 384 indicates an out-of-stock condition, the module stops further execution of the job at 770 and displays an error message.

Otherwise, the module will next check to see if column 14 has been fully tilted to its desired position at 743. If not, the program loops; if so, the module next commands the saw to begin feeding into the workpiece through blade feed relay 416 (FIG. 10) at 744. While the blade is cutting the workpiece, the module monitors the condition of broken blade limit switch 388 (FIG. 10) at 745, stopping the machine at 770 and displaying a message if blade 34 breaks. The module also monitors the condition of blade forward limit switch 370 (FIG. 10) at 747, which signals when the cut is complete. The module loops until the cut is completed or a broken blade condition occurs.

Once blade 34 has come all of the way forward, the run module turns off blade feed relay 416 (FIG. 10) at 746, causing spring loaded member 250 to retract to home position. At 748, the module looks at whether the operator has pressed stop key 476 (FIG. 11) at any point during execution of the current job step. If so, the module will display JOB j STOPPED at 770, and will thereafter ask (1) whether the job should continue, and if so (2) whether any of certain job and step parameters as loaded into RAM 512 should be changed.

Returning to FIG. 15, in the event the job is aborted (determined at 774), the execution of the job terminates. Otherwise, step quantity q is decremented at 750 and compared against zero at 752. If q is still greater than zero, the program will again execute job step s at 717. If step s is completed, the run module goes on to increment step s by one at 754 and will check to see if the incremental step number exists for this job at 756. If so, the module will return to execute the next step at 715.

If there are no more steps in job j, the module next decrements job repeat factor r at 758 and tests it against zero at 760. If there are further repetitions to be done, the module returns to execute job j again starting at 713. If not, the module displays JOB j FINISHED at 762 and thereafter prompts for a new job at 724.

While a fully operative embodiment has been described above, the application of the invention is not limited to it. The invention may be employed in other automatic sawing machines either possessing or lacking a saw blade tilting feature. The method of sawing may be by an endless band saw, a toothed wheel, a roll-stroke hack saw or other means. The saw blade feed may proceed via a carriage rolling forward or may pivot into the workpiece around a column pivot. Finally, the saw may be actuated essentially by hydraulic mechanisms as in the present embodiment or by other mechanical, electromechanical or pneumatic means or combinations of the above. In any event, the invention is limited solely by the claims which follow rather than the above exemplary description.

Attached hereto as Exhibit A is an object code listing of a computer program usable in connection with the present invention. The object code of Exhibit A is in "Intel hexadecimal paper tape format" for Intel 8080 and 8085 microprocessors. Ref.: *ISIS-II User's Guide,* Appendix A, 1978, Intel Corporation, Santa Clara, Calif.

EXHIBIT A

```
:03000000C34200F8
:03003C00C3E0090D
:1000400001E031FFE73E00D3C03EFFD320D3210EB5
:10005000DBCD126FCD72012ABD67221EE22100C0E6
:100060002223E221D6E2221AE221C5E2221CE22169
:10007000F6E62200E321D43822FEE62120E2360112
:10008000116BE2012BC0CDFB5FCD1B01FBCD230229
:10009000CDAC01CD9C1A3A01C01FD2A000CDFC000E
:1000A0002120E23600CD9E24FB763E30D3833E00F5
:1000B000D380D3803E70D3833E00D381D38111534C
:1000C000C0E201FB67CDFB5F1157E201BF67CDFB5F68
:1000D0001156E201BF67CDFB5F115FE201BF67CD3E
:1000E000FB5F1163E201BF67CDFB5F2157E236FF83
:1000F0002336FF215BE236FF2336FFC92127E23694
:100100000011000010300CD9E53CD2F5EFE04CAF6
:1001100015011F3CDAA00FBC93E08D3013E75
:1001200A0D3013E2CD3013EC9D301DB01E680FE02
:1001300080C23701C32B013E30D3633E00D360D36E
:10014000603E70D3633E00D361D3612143E236FF4A
:100150002336FF2147E236FF2336FF3A01C01FD284
:10016000603E01CDAA003EB4D3633E00D3623E60D3A6
:100170062C9E50100E0210000397123701FFE53B
:10018000210000039CDFA6EDAAA01210000394E2390
:100190004660693600D3C03E0121000039CDE3
:1001A000D6EEB2B732372D27D01D1C9CD655221C7
:1001B0000E2036003E0023723360011FF7F210147
:1001C000E0CDFA6EDA020211FF002101E0CD876E68
:1001D0003E00CDCB6EB5C2EB010129002A1AE2091F
:1001E00036001140000214D00CD9B522A01E03A003B
:1001F000E0863200E01101002A01E0192201E0D27C
:10020000BB013A00E00FE00CA22021100000014B00CF
:10021000CD9E530E01CDB7532A00E04DCD9D4DC369
:100220001F02C93A00C01FD236002110000010500AA
:10023000CD9E53C33F0211000010400CD9E532107
:10024000038E236003A38E21FDA4E02C34402C92AC5
:100250001AE27ED0620619FF57ED603D6019FC153
:100260004B1210BE0A61FD2C6023E002127E2BE04
:10027000D2C6020104000A1AE2093A28E2772A1AB1
:10028000EE7EFE02C2C1022127E23521114E03601DE
:1002900003A27E2214E0BEDAC1022A14E026000166
:1002A0008000901220E2093A14E03D4F0600E5216B
:1002B0008000901220E209D11A772114E034C29024
:1002C00022A1AE236000C93A00CE01FD2E1021101FB
:1002D0000002123E2CD076FEB2B7232722127E23637
:1002E00001102002123E2CD876E0E01CDBF6EE525
:1002F0002101001BCD866ED1CDCE6EB5C207032182
:10030000BE02BF6C30C032010BE036000C9210CE023
:10031000036000DB01E60F4F3E00B9D29B033E40D3CF
:100320001DB00320AE0E640FE40C23E0311BFFF9F
:100330002123E2CD876EEB2B732372C34C031214054
:100340002123E2CDA86EEB2B7323723A0AE0E67C
:1003500003F320AE0FE0C226B033A20E2E601FE00D1
:10036000C2680321 0CE036FFC398033A0AE0FE1985
:10037000C27B032138E236FFC398033A27E2FE101E
:10038000D298032A27E226000108000901220E20989
:1003900003A0AE0772127E234C312032A1AE27EFEEA
:1003A000A001C2C803A1AE236001110021 23E2CD5B
:1003B000876E3E00CDCB6EB5C2C303210CE036FF85
:1003C0000C3C803210CE036000CDC702CD4F02C93AA5
:1003D00038E22139E2A61FD2E4032A0DE023220DE0
:1003E000E0C3EA0321000022 0DE0012C01110DE021
:1003F000D03F000CDE46EDAFC03210000220DE03A0BE01F91
:1004000000D28A042116E036001100212 3E2CD87B2
:100410006E3E00CDCB6EB5C6FF9FE2139E2A62BA65E
:100420001164002100DE0F5CDFA6E9F2FC148A11FB8
:1004300023804216E036FF01 0A002A1EE2095EC6
:10044000002356E32217E02115E036003E0F2115E0AB
:10045000BEDA8A043A15E0F680D3013A16E01FD2DC
:1004600072242A15E02600EB2A17E0197ED300C398
:1004700083042A15E02600119 0009EB2A1AE21963
:1004800007ED30002115E034C24B04C93A23D2E
:100490002DB402F323EE2213DE2A677C9211AE09D
:1004A0000702B712A19E0233E80A6FE00CAC6043ACA
:1004B0008E0E680FE00CAC6042A19E023234E2382
:1004C00046032B71237 03A07E02F2A19E0773A0888
:1004D0004E0AE0377C93E00D383DB8032075F
:1004E000E0DB803208E00157E2CD9D043E40D3833B
:1004F0000DB813207E0DB81320 8E00 15BE2CD9D0465
:100500001153E20157E2CDFB5F0153E2C51109E04F
:100510015BE2CDFF66215EE23A5AE2BEC22A05E5
:10052000215AE23600215EE23600C93E00D363DB89
:10053000 6023207E0DB603208E00143E2CD9D043E1B
:10054000040D363DB613207E0DB61320 8E00 147E26 0
:10055000CD9D04113FE0143E2CDFB5F013FE2C5C7
:1005600021109E00147E2CDFF66214AE23A46E2BEC8
:10057000C27D052146E23600214AE23600C92110 C2F
:100580000E0702B712A1BE0113BE2CDA96EEB2B73BF
:1005900023727B2FD3207A2FD321C9211EE0702B09
:1005A0007121DE0CD936E113BE2CD886EEB2B736B
:1005B0002 3727B2FD3207A2FD321C901F700CD9B43
:1005C000D3E0 CD1 0126F2 11FE036013E19211FE0EC
:1005D000BEDAED05CD106FE640FE40CAE105C3D49A
:1005E00050E10CD126F211FE034C2CB050108406B
:1005F000CD9B0511FFC12123E2CD876EEB2B732329
:1006000072210080CD9D6E110040CD9D6E2223E2AF
:1006100003A20E2E61F3C220C92120E036001180B4
:100620002123E2CD876E3E00CDCB6EB5C28106A0
:100630003A3DE2E608D600C6FF9FF53E40113BE298
:10064000CD836E3E00CDCB6EB5C6FF9FC148A1F5F0
:100650003E20113BE2CD836E3E00CDCB6EB5D60180
:1006600060009FC148A11FD27E062120E036FF 11 8000E5
:100670002123E2CDA86EEB2B732372CDBB05C3867D
:1006800062120E036FF3A20E0C92121E0360011A2
:100690000012123E2CD876E3E00CDCB6EB5C2C4F2
:1006A00063A3DE2E604FE00CAC10 6212 1E036FF1B
:1006B000110 02123E2CDA86EEB2B732372CDBB79
:1006C0005C3C9062121E036FF3A21E0C90163E2F
:1006D000C51109E00145C0CD1B673A09E0E6C0FE3F
:1006E000CAF806010040CD7E05110002212 3E278
:1006F000CDA86EEB2B732372C90163E2C51109E02B
:1007000014BC0CD1B673A09E0E6C0FE00CA1507E1
:100710002110E036FFC90163E2C51109E00151C0B3
:10072000CD1B673A09E0E6C0FE00CA4A0701060091
:10073000CD9B052110E0360011 0402123E2CDA819
:1007400006E11FFF1CD7C6E2223E2C9110008212336
:10075000E2CD876E3E00CDCB6EB5CA76071163E25F
:100760000153E2CDFB5F0153E2C51109E0015FE2E5
:10077000CDFF66C38C071163E2015FE2CDFB5F0131
:1007800063E2C51109E00153E2CDFF66C9014FE202
:10079000C51109E0011DC0CD1B673A09E0E6C0FEA6
:1007A000CAB07010800CD7E05110102123E220
:1007B000CDA86EEB2B732372C9014FE2C51109E07E
:1007C000124C0CD1B673A09E0E6C0FE00CAD50788
:1007D00020FE036FFC9014FE2C51109E0016BE2CC
:1007E000CD1B673A09E0E6C0FE00CA130 8011000FD
:1007F000CD9B052 10FE036001 10 802123E2CDA81A
:100800006E11FFCFCD7C6E2223E21167E2013FE241
:100810000CDFB5FC9114FE2014BE2CDFB5F014E21F
:100820005CD1109E0013FE2CDFF66C93A20E2E6804A
:10083000FE00CA47 0811 00 2 02123E2CDA86E11FF57
:100840007FCD7C6E2223E23A20E2E640FE00CAE3BE
:10085000081100 82123E2CDA86E11FFBFCD7C6EE8
:100860006E02223E23A20E2E60FE00CA7F08110004BB
:10087000 02123E2CDA86E11FFBFCD7C6E2223E3A88
:1008800020E2E61F3220E2C9112E0343E0ABED245
:100890009A08CD8B042112E036 00C9CD2B06210F18
:1008A000E036002336002336FF2336003A10E021DD
:1008B000FE0B62111E0B6F5CD6A062FC148A1F5AB
:1008C000CD19062FC148A11FD27A093E00D3C0CD51
:1008D00000 6 7801000CD7E05CD2B05CDD804 110 080
:1008E000 0 202 123E2CD876E3E00CDCB6EB5CA1B0919
:1008F00000 014083A0FE01FD20009CDD607C31B095B
:10090000110 02123E2CD876E3E00CDCB6EB5CA1B
:100910001809CDB907C31B09C8D07110008212384
:10092000E2CD876E3E00CDCB6EB5C6FF9F1100 4B1
:100930002123E2F5CD876E3E00CDCB6EB5C6FF9F7D
:10094000002FC0CD4B073A10E01FD257F0
:100950009CD1607C3720911002212 3E2CD876E6B
:100960003E00CDCB6EB5CA6F09CDF906C37209CD75
:10097000CD062111E03600C3AC080E10CD126FC9B0
:10098000002A1AE27EFE01C2E7092A1AE2235E2356F2
:100990000EB22202E002210AE209E5A22E2E000133
:1009A0001A773EB4D3630E10CD126F3E00D3623E71
:1009B00030D362CD106FE640FE40CAC009C3B30910
:1009C0003EB4D3633E00D3623E60D3620E10CD12BC
:1009D00006F2A1AE23600 11FF07122E0CD076FEBE4
:1009E00023723721A277C9E5D5C5F50100CD076E DB
:1009F000E053E00D3C0CD8B04CD19063213E0CD69
:100A00008A061FDA150A010004CD7E05CD9B080478
```

```
:100A1000004CD9B05CD2B05CDD804CD0D03CDCF46
:100A200003CD800911002021232ECD876E3E00CD67
:100A3000CB6EB5C2530A110200212ECDA86EEBA2
:100A40002B7323722113C3221AE22102E3221CE218
:100A5000C36D0A11FDFF2123E2CD876EEB2B7323BB
:100A60007221D6E2221AE221C5E2221CE22A25E204
:100A700023222SE2010002CD9B051102002123E281
:100A8000CD876E444DCD8E0AF1C1D1E1FBC9D12194
:100A90000000003979B0C2A10A2200E32AC3E2F9D5E5
:100AA000C922C3E22A00E3F9D5C9FFFFFF7F000096
:100AB0000802BE02DE02DE02FE005C00CC013C01E
:100AC0001AC021C028C02FC036C03DC043C049C095
:100AD0004FC056C05DC064C06BC072C008C00FC0BC
:100AE00016C01DC024C02BC032C039C03FC045C095
:100AF0004BC051C059C060C067C06EC075C000017
:100B000000000000000101010100000007071
:100B1000E00603030283E021E2BFE2C1E29BE09D25
:100B2000E02000280029203D20003F003F003A3C03
:100B3000E01FD2260C2162E036003E022162E0BEB8
:100B4000DA670B2A62E026000102000E9B2A29E09D
:100B500019E52A62E026000142E0095EC1CD365D5A
:100B60002162E034C23A0B0105002A29E009E52A96
:100B700045E07D5FC1CD365D0106002A29E009E52B
:100B80002A29E0093EF0A6F51E020145E0CDD85E17
:100B9000C148B15FC1CD365D0107002A29E009E5F2
:100BA0002A29E0093E7FA62149E0B65FC1CD365D26
:100BB0000162E0C50105002A29E009444D1E02CD6D
:100BC000CD685D0E5F0E00CD2F5F0162E051E000147B9
:100BD000E0CDD85E5F0E01CD2F5F0106002A29E02F
:100BE00009444D2A62E0EBCD365D0162E051E018D
:100BF0000147E0CDD85E5F0E00CD2F5F0162E0C5FA
:100C00001E020147E0CDD85E5F0E01CD2F5F0107C8
:100C10000002A27E009E52A29E0093E80A62162E0B0
:100C2000B65FC1CD365DC92163E036003E022163E7
:100C3000E0BEDA570C2A63E026000102000E9B2A25
:100C400029E019E52A63E026000142E009D11A777C
:100C50002163E034C22C0C11B60A0100700CD9E536B
:100C600001290A0E2097EFE0AD2730C01210B27
:100C7000CD13502129002A1AE2097E323BE03A39AB
:100C8000E01FD2F20C0142E0C50E00C52A41E04D42
:100C90001E00CDA84ECD2F5E3238E03A38E0FE037C
:100CA000CAEA0C3A38E0F01C2D60C213CE036FF1D
:100CB0002A3BE04DCD0655010000C501BF67C501C7
:100CC000CB67C50E00C52A41E0E5116E00142E0B2
:100CD000CD6C5BC3E70C3A38E0FE02CAE70CCD2FBF
:100CE0005E3238E03D60CC3EF0C2140E036FFC3C0
:100CF00029DCD5E5EFE0E00D213CE036FF01C5
:100D000000000C501BF67C501CB67C50E00C52A41FC
:100D1000E0E51164E00142E0CD6C5BC3290D214A08
:100D2000E036FFCD2F5E3238E0C92165E036003E67
:100D300022165E0BEDA5B0D0145E0C50105002A30
:100D4000290E009444D2A65E0EBCDD85E2A65E05FD5
:100D50004DCD2F5F2165E034C22F0D0107002A29F8
:100D6000E0093E00A63249E011B60A010800CD9E96
:100D7000530129002A1AE2097E323BE03A39E01F8A
:100D8000D2F0D0145E0C50E01C52A49E0BE0E009A
:100D9000CDA84ECD2F5E3238E03A38E0FE01C2CB0E
:100DA000D213CE036FF2A3BE04DCD065501000009
:100DB000C501D367C501CF67C50E01C50E00C511BA
:100DC00049E00145E0CD6C5BC3DC0D3A38E0FE0242
:100DD000CADC0DCD2F5E3238E03C80DC2300E2126
:100DE0003CE036FF2100002245E07D3249E0010071
:100DF000C501D367C501CF67C50E01C50E00C58B
:100E00001149E00145E0CD6C5BC92166E036003E4A
:100E10002166E0BEDA3D0E0147E0C50105002A69
:100E20002SE0093A66E0C6035F444DCDD85E2A66E4
:100E3000E05F4DCD2F5F2166E034C20F0E11FF033E
:100E40002147E0CD876EEB2B7323711B60A01099F
:100E5000CD9E5301290A21AE2097E323BE03A76
:100E6000E00093E01FD2B00E2A474E0444DCDB74FCD2F09
:100E70005E3238E03A38E0FE01C29C0E213CE0369A
:100E8000FFA3BE04DCD065501000000C5010100C51C
:100E90001147E001E703CDDF57C3AD0E3A38E0FE5E
:100EA0002CAAD0ECD2F5E3238E0C39C0EC3CC0E0D
:100EB000213CE036FF2100002247E0010C5018E
:100EC000100C51147E001E703CDDF57C9213CE030
:100ED00036000104002A27E0095E2356EB2235E0A4
:100EE00011B40A010A00CD9E530129002A1AE20911
:100EF0007E323BE03A39E01FD24A0F0104002A2734
:100F0000E0923E02346CDB74FCD2F5E3238E03A3B858
:100F1000E0FE01C2360F213CE036FF2A3BE04DCD1A
:100F200006550100000C5010100C51135E001E703C8
```
```
:100F3000CDDF57C3470F3A38E0FE02CA470FCD2F27
:100F40005E3238E0C3360FC3660F213CE036FF2126
:100F500000010022235E0010000C5010100C51135E0A6
:100F6000001E703CDDF573A3CE01FD27D0F010400BB
:100F70002A27E009444D2A35E0EBCD685DC9110010
:100F800000010B00CD9E53CD2F5EFE01CA920FC310
:100F90000870FC93A02C0FE00CAEC0F3A02C0FE0138
:100FA000CAEC0F2167E036003A67E01FDAEC0F3A2F
:100FB00041E0FE0C2C00F110000010C00CD9E53A5
:100FC00003A41E0FE01C2D10F110000010D00CD9E9B
:100FD00053CD2F5EFE01C2E40F3A41E0EE013241F3
:100FE000E0C3E90F2167E036FFC3A80FC921000065
:100FF000222FE07D3239E03240E03A40E02FF53AEE
:1010000003AE02FC148A1F53E63112FE0CDEC6E9F71
:101010001148A11FD28D102A2FE023222FE0213CAE
:10102000E03600CD270C3A40E01FDA8A100E00CDE2
:10103000745C2229E03E001129E0CDEC6EB5CA8532
:10104000103A01C01FD24E10CD2A0DC358102100F6
:101050002245E07D3249E03A40E01FDA6210CDDF
:10106000A0ECD2E0B2A31E0444D2A29E0EBCD6843
:1010700005D2A29E0444D11FFFFCD685D2A29E02259
:1010800031E0C38A10213AE036FFC3FA0F3A3AE06E
:101090001FDA9A1CDCD0EC39D10CD7E0FC9213A17
:1010A000E00C745C2227E023444DB8F
:1010B000CDEC6EB5CA1A110104002A27E009444D8F
:1010C000110100CD685D2A27E02323444D11FFFF65
:1010D000CD685D2A27E0110080E52A2DE019EBC1DB
:1010E00000CD0C745C2229E03E001129E040
:1010F000CDEC6EB5CA07A27E023232231E02167
:1011000003AE03600C317112A27E0444D110000CD04
:10111000685D213AE036FFC31F11213AE036FF3AFD
:101120002C0E6013241E03A3AE01FDA4111CD93C4
:1011300002F01060002A27E009444D2A41E0EBCD3695
:101140005DCDED0FC92A27E023232229E02168E0A5
:1011500036002137E036003A68E02FA29E011FFF7
:10116000FF5CDFA6EB5C6FF9FC148A11FD29911F8
:101170002137E0342A29E02231E05E2356EB223386
:1011800062229E03A37E0112FE0CDEC6EB5C296AF
:10119000112168E036FFC357113A68E0C911B60A59
:1011A00010E00CD9E53CD2F5EFE01CAB111C3A6E24
:1011B00011C92169E0360011B60A010F00CD9E5316
:1011C000CD2F5EFE02C20912A29E0223E00E00074
:1011D000CD745C2229E03E001129E0CDEC6EB5CA49
:1011E0006122A31E0444D2A29E0EBCD685D2A2918
:1011F000E0444D11FFFFCD685D2169E036FF2139E4
:10120000E03600C30912CD7E0F3A69E0C9216AE0D9
:10121000360021 3EE03A00A6AE02FF53A3EE02FF4
:10122000C148A1F53A40E02FC148A11FD2DC1221EC
:1012300039E036FF11B40A011000CD9E53CD5E5E39
:101240003238E03A38E0FE01C25012 13EE036FF6B
:101250003A38E0FE03C25D12214E036FF3A3EE03C
:1012600022FF53A40E02FC148A1F53A38E0309F3B
:10127000FC148A1F53E392138E0969F2FC148A1E2
:101280001FD2D3122100002222FE010000C5010 16E
:1012900000C5112FE0016300CDDF57CD45112 6A43
:1012A00023A6AE02FF53E0012FE0CDF76E9FC1B6
:1012B00048A11FD2D0123A37E03C112FE0CDEC6E9E
:1012C000B5C2CD12CDB211326AE0C3D012CD9D119C
:1012D000C3D912CD2F5E3238E0C31712C9210000E6
:1012E000222FE0110000011100CD9E53010000C526
:1012F000010100C5112FE0016300CDDF57CD45117D
:1013000001FD2361311B60A011200CD9E53CD2F5EA7
:101310002FE01C23613CD2F5EFE02C236132A29E02B
:101320005E23562A31E0444DCD685D2A29E0444DC4
:10133000110000CD685DC90106002A27E0097E3250
:101340004E01CD930F0106002A27E009444D2A41D0
:10135000E0EBCD365D2140E036003A40E01FDAB4E4
:1013600013213AE03600CD0D123A3EE01FD273133E
:10137000CDDD123A3EE02FF53A40E02FC148A1F50D
:1013800003A3AE02FC148A11FD2B113213CE0360008
:10139000CD270C3A40E01FDAB1133A01C01FD2A4A6
:1013A00013CD2A0D3A40E01FDAAE13CD0A0ECD2E32
:1013B0000BC35A13CDCD0EC9216FE0732B712BD106
:1013C000C1702B71D53A6EE0FE00C23314A6FE063
:1013D000D601D6019FF53A6FE00D6D603D6019FC148EA
:1013E0003B11FD2201411E76700E00CD33612A6CE0E3
:1013F000EB0E01CD3361CD18620108002A1CE20911
:10140000001100E52A1CE209EBC1CD7E6601C004B
:101410002A1CE209444D2A6CE0EBCDFB5FC330147B
:10142000110002A1CE209E2BA6CE0444DCD6166F4
:1014300035014111E3670E00CD33612A6CE0EB0E4C
:101440000001CD3361CD1862 2A6CE0EB0E00CDCE6089
```

```
:10145000C93A38E0FE02CA6214CD2F5E3238E0C3CA
:101460005114C92172E0732B702B712A70E02B018B
:10147000FE0A97E3273E0110F0B011300CD9E535B
:101480000129002A1AE2097E323BE03A02C0E60155
:10149000FE01C29D142141E03601C3A2142141E0A6
:1014A00036002A70E02B01DC0A29094E234611740C
:1014B000E0CD84672A70E02B01BA0A29094E234641
:1014C000C52A73E0E53A74E0E6802A41E05F4DCD3D
:1014D000A84ECD2F5E3238E03A72E01FD2F0143AB7
:1014E00038E0FE01CAF014CD2F5E3238E0C3DF14BD
:1014F0003A3E0FE01C2C7152A3BE04DCD06550142
:101500000000C501AE0AC501AA0AC52A73E0E52A92
:1015100041E0E51174E00176E0CD6C5B2175E036C9
:101520002A73E02600011300B097E3D2175E0BE01
:10153000DA5B152A70E02B01BA0A29093A75E0CD6C
:101540006D6EE52A75E026000176E0095EC1CD36B4
:1015500005D2175E034C221150176E0C50179E0C551
:101560002A73E02600011108094E1E00CD1F4E010B
:1015700079E0C52A73E04D2A41E0EBCDB8133A7407
:101580005E680FE80C291151174E00179E0CDC9DA
:10159000662175E036003E032175E0BEDAC4152AE7
:1015A0007E02B01DC0A29093A75E0CD6D6EE52A61
:1015B00075E026000179E0095EC1CD365D2175E058
:1015C00034C29615C3CA15CD5114C9217DE0713AB4
:1015D0007DE01FD2DE15217EE036000C3E315217EBB
:1015E000E036FF3A7EE0C93A3AE21FD2FA15110001E
:1015F000000115000CD9E53C3031C1100001140015
:10160000CD9E532A3AE24DCDCB15323AE2CD2F5E34
:10161000327FE0C92A79C04D0DCB155F0179C0CDAD
:1016200036503A79C01FD2351E1100000E1040028D
:10163000009E53C33E1E11000015900CD9E53CDA04
:101640005ECD2F5E3280E0C52E8E270E2B71CD65C6
:1016500052CD8E5D1FDA95160290024E209364D
:101660000002A81E0444DCDF24D0129002A1AE209F9
:1016700036093A3DE24DCD9D4D0129002A1AE2D985
:1016800036C2A3BE27D4FCD9D402A3BE270FCDF
:1016900009D4DC3511C9CD6552CD8E5D1FDA881E6A
:1016A0000129002A1AE2093E000013FE2CDF54D0170
:1016B00000053EECDF24DC39916C91100001140389
:1016C00009E53CD2F5EF2E2AC2231710000071720A2
:1016D000CD9E53CDF5EF2E0C223170CD6552218W5
:1016E000C0228B3E01FFC7218BE0CDFA6EDA2371
:1016F0000C903171120000A83E0192B83E00CD2E416FD
:101700000C323172A83E0444D1100000CD6B5D0185F1
:101710002A1AE20936000111508011800CD9B536D0
:10172000C3F316C91117B011900CD9E53CD2F5EBF
:10173000 5E01CA3817C32D17C93A01C01FD24C177B
:101740001100000118000CD9E53C3551710000016D
:10175000001A000CD9E53CD2F5E3238E02A01C04DCDMA
:10176000CB155F0101C0CD365DC93A00C01FD27DE7
:1017700000171100000150CD9E53C035617112000F5
:101780000011D000CD9E53CD2F5E3238E00000024DA2
:10179000CDCB155F0100C0CD365D3A00C01FDAA80
:1017A0000171E000101C0CD365DC911190B015300BB
:1017B000CD9E53CDA85ECD2F5E3238E0111B0B01BC
:1017C0000C9E53C00CD9E53CDA85ECD2F5E3238E00C93EB1
:1017D0000632155C0BEDE0171E630155C0CD365DF2
:1017E000213CE036002A55C026002285E010000089
:1017F00014E00CD9E530129002A1AE2097E323B98
:1018000002A85E0444DCDB74FCD2F5E3238E203A27
:1018100038E0FE01C237182213CE036FF2A3BE04D9C
:10182000CD0655010000C5010000C5185E0016329
:101830000000CDDF57C348183A38E0FE02CA481BCD39
:1018400000C0D0921B7E07228B732B702B712A84E0446C
:101850085E0B0155C0CD365DC93E032102C0BE17
:10186000D26B181E00010C0CD365D2187E0360024
:1018700003A87E01FDAF3183A02C0FE00C288181156
:101880000000001150000CD9E533A02C0FE0C299180D
:10189000001100001F00CD9E533A02C0FE02C2AAF1
:1018A00018110000012000CD9E533A02C0FE03C271
:1018B000BB181100001210000CD9E53CDF5F010B
:1018C000C2EB181100001212000CD9E53C3013C02BC
:1018D0000C2E0101C0015B0013C01D470CDF572A3BE0E5B6
:1018E0002BE0102C0CD365DC3F0182E187E03EFF37
:1018F000C370180C3A03C0FE01DA04291E00029E1
:10190000C0CD36ED218E036003A8AE01FDA619DE
:1019100010000000CD9E53C3005E5F010025A60
:10192000191000000C0CD9E5301000C5210105
:10193000000C51B8E00101COCDDF572A3BE03EBB6
:10194000103C0CD365D2A03C026001D67290909
:101950005E2356EB2211EE2C35F19218AE036FFC3E5
:10196000091909C93A04C0FEFFC27719110000013EEF
:10197000CD9E53C360191100000013D00CD9E53AD
:10198000CD2F5E3238E0EA04C04DCDCB155F01D467
```

```
:101ED000E0CDFF660104002A1CE209EB01DB67CDBF
:101EE000FB5FCD18622A1CE2EB014AE0CDFB5F2AC2
:101EF0001CE2011000E52A1CE209EBC1CD6D662A47
:101F00001CE2E5010C002A1CE209011000E52A1C74
:101F1000E209EBC1CDE366010400 2A1CE209EB01F2
:101F2000DF67CDFB5FCD186221C4E036013E04219E
:101F3000C4E0BEDA511F0108002A1CE209011000AA
:101F4000E52A1CE209EBC1CD7E6621C4E034C22D36
:101F5000 01F010C002A1CE209A4D115AE0CDFB5F21
:101F60003A79C01FDA831F0110002A1CE209EB0135
:101F70005AE0CDC966011000 2A1CE209EB015EE0BF
:101F8000CDC966C9CD131E114AE001B3E2CDFB5F96
:101F9000014AE0C5011000CDD51D11BBE2015E00CDD51D2B
:101FA000FF663A01C01FD2AC1FCD361E114AE001B8
:101FB0005500CDD51D3A01C01FD2CE1F115EE001E4
:101FC0005600CDD51D115AE015F00CDD51D11B3CE
:101FD000E2015700CDD51D3A01C01FD2F01F11B745
:101FE0002015800CDD51D11BBE2015E00CDD51D2B
:101FF000C921C5E071CD6552CD8E5D1FDA992001F2
:10200000029002A1AE2093600013FE2C511C6E00E96
:10201000CDA81B01C6E0C52A02C0EB0E00CD69A9
:1020200003AC5E0FE00C23A200129002A1AE2090E
:102030003E08964FCDB753C33F200E01CDB7530195
:10204000053E2C511C6E00E01CDA81B01C6E0C52AAA
:1020500002C0EB0E01CD69503AC5E0FE00C2782007
:10206000 0129002A1AE2093E0E964FCDB7532A3DA8
:102070002BE24DCD9D4DC396200129002A1AE2093E6A
:10208000 0C964FCDB7532A3BE27C4FCD9D4D2A3B5A
:10209000 0 E27D4FCD9D4DC3F81FC921CDE0732B715B
:1020A0002BD1C1702B71D5CD6552CD8E5D1FDA0756
:1020B0002010129002A1AE20936002ACAE0E52ACCC1
:1020C000E04D11CEE0CDA81B01CEE0C52ACCE00B3F
:1020D000A5F4DCD69500129002A1AE2093E08968F
:1020E0004FCDB7532A3DE24DCD9D4D0129002A1A0F
:1020F000E2093E0C3A3BE27C4FCD9D4DA3B27D3B
:102100004FCD9D4DC3AA20C9CD655201AC67CD13FB
:102110005 2CD2F5E3238E0C9110000014C00CD9E37
:1021200053CDA85ECD2F5EFE02C24421 :1000001F6
:102130001700CD9E53CDA85ECD2F5EFE02C24441 76
:10214000F3C3412 1C93E15112BE0CDEC6EB5C257-A
:1021500021013FE2CD48163E16112BE0CDEC6E2EC3
:10216000C26921015 3E2CD48163E17112EE2CDEC98
:1021700006EB5C27821CD96163E18112BE0CDEC6CF
:10218000B5D6019FF53E2D1BCDEC6EB5CD6FC196
:1021900048B11FD2992 1CDE71535291 1 2BE0CDEC96
:1021A0006EB5C2B2 21013FE2C52A02C0EB0E00CDDE
:1021B0009A203E2A112BE0CDEC6EB5C2C321015303
:1021C000E2C52A02CD0F76E79F1CD9A203E2 112BE076
:1021D000CDEC6EB5C2DC210E00CDF11F3E2C 12BD3
:1021E000E0CDEC6EB5C2ED210E01CDF11F3E2221106
:1021F0002BE0CDEC6EB5C2FC21CDAA173E2311 2BEE
:10220000E0CDEC6EB5C20B2CD3B1D3E2E1123E076
:102210002BE0CDEC6EB5C20B2CD3B1D3E2 E1123E076
:102210000CDEC6EB5C2A22C04E1C3E2 * 112BE0CDC3B
:10222000EC6EB5C22922CD34183E28112BE0CDEC3B
:102230006EB5C2382CD8213E3211 2BE0CDEC6EB6
:10224000B5C24722CD1821C91100001 2300CD9E3F
:10225000053C01600CD0051 :00C51128E002200CD48
:102260000DF573E11212BE0CDDF76EDA88 23A2 1 2BCA
:10227000FE00C282 22A2BE0444D 1 E00CD6314C20F
:102280008522CD2417C34C233E191128E0CDEC6E03
:10229000069F2FEBF53E212BE0CDEC9F148A1F547
:1022A0003E301BCDEC6EB5D6019FC148B1 1FD249 5F
:1022B0002 33A21E2FE00C24233E1A1128E0CDEC63
:1022C0006EB5C2C822CD63193E1B112BE0CDEC6EEA
:1022D000B5C0722CD6A173E1C 112BE0CDEC6EB5E
:1022E0002E622CD39173E1D 112BE0CDEC6EB5C2F2
:1022F000F522CD5A183E1E112BE0CDEC6EB5C2046E
:1023000023CDB9163E1F112BE0CDEC6EB5C21323C1
:10231000CDCF173E2011 2BE0CDEC6EB5C222 23CDE0
:102320008 411 2BE0CDEC6EB5C2D214BC
:102330000163E301128E0CDEC6EB5C240 23CD9C1A79
:10234000C34623CD2417C34C23CD4521CDA85EC958
:10235000110000012400CD9E5321 000022 2DE00138
:10236000000C500C5010000C5112DE0016300CDDF575D
:102370003E0012DE0CDF76EDZ1D242A 2DE04DCD5B
:102380007 45C2229E03E0011 29E0CDEC6EB5CA094B
:102390002411B40A012500CD9E53CD2F5EFE01C24B
:1023A0000624CD2F5EFE02C20624 3A21E211 2DE0AE
:1023B000CDEC6EB5CA03242A29E0444D1100000CDAE
:1023C00068 5D2A29E02 3232229E02A29E011FFFF62
:1023D000CDFA6EB5CAF5232A29E05E2356EB2233E7
:1023E000E2A29E0444D110000CD685D2A33E02247
:1023F00029E0C3CA232A29E0444D110000CD685DBD
:102400000C30624CD2417C31D2411B40A012600CD10
```

```
:102410009E53CD2F5EFE01CA1D24C31224C921D2B2
:1024200 E036FF3AD2E01FD29D2421D2E0360011DF
:10243000000001 2700CD9E53CD5E5E3238E03A3871
:10244000E0FE01C24E24 213EE036FFC35324 213E6C
:10245000E036003A38E0FE23C2632421D3E036FFA1
:10246000C3682421D3E036003A3EE01FD27D242108
:10247000D2E036FFCD2F5E3238E0CD50233AD3E0A4
:1024800001FD29A2421D2E036FFCD2F5E3238E0CD24
:1024900002F5EFE2D029A24CD4822C32324C921D2B7
:1024A000E23600CD1E243A38E0D6309F2FF53E3973
:1024B0002138E0969F2FC148A1 1FD20B25010000B3
:1024C000C5010100C5112DE0016300CDDF573A21A0
:1024D000E2112DE0CDEC6EB5CA05252A2DE0EB21E9
:1024E0002E2732A2DE04DCD745C2227E03E0011DC
:1024F00027E0CDEC6EB5CAFF24CD3713C30225CD3E
:10250000 9E10C30825CD2417C31125CD2F5E323868
:10251000E0C39E24C94 2E344E342E344E3 42E3 48C
:102520002E3DFE0E1E00 1E11 :00002 :23E20CD876E6C
:102530003E00CDCB6EB5CA41 2E21FBE036FFC34638
:102540002521FBE036003AFBE0C9118000 2 123E29F
:10255000CD876E3E00CDCB6EB5CA64 2521FCE0363A
:10256000FFC36925 21FCE036003AFC0C9C02123B7
:10257000F5CD4A25C148B121DDE2B623B6C9016 4D5
:10258000E3 116 2E3CDDF6222DFE0 0 168E31 166E371
:10259000CDDF6E22E1E03E0A 114 2E3CDEC6E3FF505
:1025A0003E0A 1144E3CDEC6E3FC14 8B1F5 32E64 1 83
:1025B000DFE0CDEC6E3FC148B1F 53E641 1E 1F0CDA6
:1025C000EC6E3FC148B1 1FD2D6 25 1 1 1D2501 3 20E7
:1025D000CD9E53C3DF25 11D2501 3200CD9E53C969
:1025E00021FEE0702B71F3 2 10000 0 22552FB0125 82
:1025F000DBD5EEB21FDE0CDFA6ED20126CC3E49
:102600002 5C92100E1702B71CD6D2 51FDA1 7 26A0F
:10261000FFE0444DCDE02 5C92102E1702B71CD6D65
:10262000252F213AE2A61FD24426112525013 30089
:10263000CD9E53C3DF2 5 11D2501 33 20CD9E5 3C9CD
:102640002 8CD7E25C92104E1702B71F3C0E0 251FA8
:10265000DA69262A03E1113 BE2CDA96EE2B732 34 5
:10266000727B2FD3207A2FD321FBC92106E1702B57
:1026700071F3CD6D251FDA92262A05E1CD9 36E1F7
:1026800003BE2CD886EEB2B732 3727B2FD3207A2F0 6
:10269000D321FBC9014000CD6B2601 6400CD022689
:1026A000C9014000CD4526016400CD02260 10400 89
:1026B000CD1826C9014000A 1CE209EB014AE3CD3A
:1026C000CDFB5FF32A1CE2EB015 22CDFB5FF 3A 1 2C
:1026D000EE501040 02A1CE209011000E 52A1CE3 2F
:1026E00009EBC1CDFF6601 1000 2A1CE209 3E80A6 5D
:1026F000FE00C20327 21D7E0364021020022 07E175
:10270000C31E2721D7E03620E10400220727E 12A1C1 E
:102710002E20110 00E52A1CE209EBC1CDC966010403
:102720002 A1CE209EB013FC0CDFB5F2A1CE2 E559
:1027300001040 02A1CE209 011000E 52A1CE209EB5 1
:102740 00C1CD1B67011000 2A1CE209 3E 80A6 FE 00D5
:10275000C29027 115FE2014AE3CDFB5FCD6D251FDB
:10276000DA9027F33AD7E02 120E2B672 2A07E1444E
:102770 0004DCD4526FB3AD7E02 120E2A6D600C6FF84
:102780 00 09FF5CD6D252FC148A11FD29027C3 75 2776
:1027900 0C93A3DE2E640D600D6019FF5CD6D252C9B4
:1027A000C148A1F53E1113BE2CD836E3E01CDCB88
:1027B 0006EB5D6019FC148A11FD2BF27C39127C9BB
:1027C 00CD6D252F2101C0A6F53A6CE32FC148A19C
:1027D 000F5 3A3DE2E640D6019FC148A11FD25E
:1027E000EA27CDB426216CE336FFC93A01C01FD2D7
:1027F000B28CD9127CDC027110040 02 123E2CD8782
:102800 00 0E3E00CDCB6EB5D6019FF5CD6D252FC1A7
:1028100 048A11FD21928C3F827011900CD022601AB
:1028200 00 040CD6B26010500CD1826C92138E236BF
:1028300 00011 00 00013400CD9E53CDA85E2109E1B6
:1028400036 003A09E11FDA7928CD8E5D1FD265285E
:10285000CD2F5EFE01C262282109E136FF2138E2 58
:102860006003AFC376283A38E21FD276282109E136AE
:10287000FF2138E23600C34228C93A04C0D6FFC659
:10288000FF9FF53E01113BE2CD836E3E01CDCB6E45
:10289000B5D6019FC148A11FD2A428CD91270101F
:1028A000CD6B2606C9F3110CE1013FE2CDFB5FFCC
:1028B00010500CD0226F31110E1013FE2CDFB5FDF
:1028C000FB010CE1C550590110E11BCDFF66011061
:1028D000002A1CE2093E80A6FE80C2E628110BE118
:1028E000010 00C1CDC966010E1C550590132C01B94
:1028F000CDC1B673A0BE1E6C0FE00C20529210AE1C3
:1029000036FFC30A2 910AE136003A0AE1C9CDA5FA
:1029100028F5CD6D252FC148A11FD22329CDC02771
:10292000C30E29C9F3013FE2C51115E101FB67CDD3
:10293000 01B67FB3A 1EE1E680FE80C24529E114E110
:1029400036FFC34A292114E136003A14E1C9F31D4
```

```
:102950000018E1013FE2CDFB5FFB0118E1CE505021D1
:10296000FB67 1BCDE366011EC0C51 17E1201185135
:10297000CD1B673A17E1E680 FE80C2852921116E16A
:1029800036FFC38A292116E136003A1EE1C9F33E83
:1029900030D3633E00D360D3603 70D3633E000338
:1029A00061D361 13FE201BF67CDFB5F1143E201D8
:1029B000BF67CDFB5F1147E201BF67CDFB5F2143DE
:1029C000E236FF2336FF2147E236FF2336FFFBC9FD
:1029D000CD24292FF5CD6D252FC148A11FD2E32984
:1029E000CD3D029CD6D251FDA222ACD0E2901190089
:1029F000CD0226CD8E2901 2000CD6B260103000D0E
:102A00001826C92A1AE236040E01AE27EF20CA14DF
:102A10002AC3082A016400CDE025CDA85EC02F5E33
:102A2000FE02CA82AC3102A1 10000015100CD00E7
:102A300053CDA85ECD2F5EFE01CA592ACD2C283A6F
:102A400038E21FDA4C2ACD7E25C0351 2A2 16DE336A8
:102A5000FF2138E23600C35E2A216DE336FFC9014B
:102A60000800CD6B26010500CD02260123000CD45D3
:102A7000260132000CD02260108000CD4526013 20094
:102A8000CD02260123000CD6B260119000CD0226010CE
:102A90000800CD6B260119000CD0326C92 1DEE036E3
:102AA0000CDEB271 12000014F00CD9E53CD032A2E
:102AB0003A6DE3 32DDE0CD6D251FDAC02ACD3F2A04
:102AC000C9CDEB271 1200000 15000CD9E53CD032A44
:102AD0003A6DE332DDE0C901 1000CD4526CD4E3927
:102AE0002FF5CD6D252FC148A11FD2F32ACDC027C8
:102AF000CD3DD2ACD0E2901 1000CD6B260C9D6D251
:102B000001FDA062CF32A1CE2EB013FE2CDFB5FFB50
:102B10002A1CE2010400E52A1CE209EBC1CDFB5F9F
:102B20002A1CE2E50110002A1CE209EB0167E2CD54
:102B3000FF662A1CE2011000E52A1CE209EB01 6B8A
:102B4000E2CDFF660110002A1CE2093E80A632 1C7D
:102B5000E1FE80C2662B2A1CE2011000E52A1CE27D
:102B600009EBC1CDC9662A1CE2E50112000A1CE2E6E
:102B70009EB01FF67CDFB5F0110002A1CE2093E2B
:102B8000 8 0A6FE 80C2B92B3A1CE1FE80C2A4 2B0134
:102B90006BE2C50110002A1CE209EB01FF67CDFFC3
:102BA00066C3BE2B016BE2C50110002A1CE209EBDB
:102BB0001FF67CDE366C3DA2B0104000A1CE2099A
:102BC000444D116BE2CDFB5F016BE2C50110002AA1
:102BD0001CE209EB0167E2CDFF66011 0002A1CE24E
:102BE00009EB016BE2CD84670110002A1CE2093E6B
:102BF00080A6FE80C2002C116BE201BF67CDFB5F97
:102C0000C901 10200CD1826C92A1CE209EB011C89
:102C1000E209EB015EE3CDE366211DE136FF01042D
:102C20002A1CE209EB01E5E0CDFB5F0104002A6C
:102C30001CE209E5011000 2A1CE209EB0167C0CD86
:102C40002A0E3662A1CE2E5010400 2A1CE209011000E7
:102C5000E52A1CE209EBC1CD1B670110002A1CE22A
:102C600093E80A6FE00C2BC2C0104002A1CE2091 9
:102C7000EB01E5E0CDFB5F0104002A1CE209E50160
:102C8000 2A1CE209EB0160 E366010400DC
:102C90002A1CE209E52A1CE2011000E52A1CE209CF
:102CA000EBC1CD1B670110002A1CE2093E80A6FE85
:102CB00080C2B92C211DE13600C3C12C211DE13693
:102CC00003A1DE1C90152E3C50110002A1CE209C6
:102CD000EB0159C0CD1B6701 10002A1CE2093E80A7
:102CE000A6FE80C2EE2C21D6E036FFC3F32C21D6FF
:102CF000E036001 14BE20152E3CDFB5F0152E3C528
:102D000001 1000 2A1CE209EB011DC0CD1B6701 1058
:102D10000 2A1CE2093E80A6FE80C2292D0108007F
:102D2000CD4526010500CD0226F33A20E2F6803299
:102D300020E2011000CD4526F33A20E2E680D600D5
:102D4000C6FF9FF5CD6D252FC148A11FD2522DC3BF
:102D5000392D11000012CD876E3E000CD2A1CE209
:102D600055D6019FF5CD6D252FC148A11FD2762D77
:102D7000CDC027C3522D0119000CD0226F32A1CE233
:102D8000EB013FE2CDFB5FF32A1CE2010400E52AD6
:102D90001CE209EBC1CDFB5F2A1CE209E3CDFF66011 27D
:102DA000 11000 2A1CE209EB0152E3CDFF660012 7D
:102DB0000 2A1CE2093E80A6FE80C2D12D0104003B
:102DC0002A1CE209011000E52A1CE209EBC1CDC969
:102DD000660104002A1CE209E5011000 2A1CE20930
:102DE000EB016EC0CD1B6701 10002A1CE2093E507A
:102DF000A6D60 0D6019FF53AD4E02FC148A1F53AF6
:102E000 0D6E02FC148A11FD20F2EE1DEE036FFC928
:102E10003A55C03C321EE121 1FE136003A1FE12F36
:102E20002FC5CD6D251EE1BED271 2ECDFD2AC37B00
:102E30006D251FDA9B2E3AD4E02FE21D5E0A623F5BD
:102E400007E2FC148A11FD2932E2ABF2232B2FBFEC8
:102E5000CD072C1FDA882E211EE135AC1E232 3250
:102E6000CDC1E23E00E111EE1BED2712ECDFD2ACC20
:102E70003E3A55C03C321EE1CDC12ACD6D251FDA58
:102E80000852ECD5F2AC3902E211FE136FFCDFD2A6E
```

```
:102E9000C39B2E211FE136FFCDFD2A3ADEE01FD273
:102EA000A52ECD9C2ACDC027C31C2E3C92A1CE2E1F
:102EB000116C0CDFB5F2A1CE2E50110002A1CE2CE
:102EC0009EB01FB67CDFF662A1CE2E50112000 2A31
:102ED0001CE209EB014EE3CD1B670110002A1CE246
:102EE00093E80A6FE80C2492F2A1CE2EB014EE378
:102EF000CDFB5F2A1CE2E50110002A1CE209EB0170
:102F000016C0CDFF662A1CE2E501 1 0002A1CE2096A
:102F1000EB010FCOCD1B670110002A1CE2093E80A7
:102F2000A6FE00C22C2FCDD72AC34E2F115E30193
:102F30004EE3CDFB5F0110002A1CE209EB0152E3D6
:102F4000CD6D66CD102EC35A2F1 15E32014E3CD45
:102F5000FB5F21D5E036FFCD102EC9F32A1CE2EB32
:102F600013FE2CDFB5FFB014E3C52A1CE20110ED
:102F700000E52A1CE209EBC1CDFF66015EE3C52A2C
:102F80001CE2011000E52A1CE209EBC1CDE366C091
:102F90002125E1722B732B702B712BD1C1702B71FA
:102FA000D52A1CE2E2A20E1444DCDFB5F2A1CE2E3
:102FB000011000E52A1CE209EBC1CD846701100075
:102FC0002A1CE2093E80A62A24E1772A24E17EFE1B
:102FD00080C2E42F2A1CE2011000E52A1CE209EB62
:102FE000C1CDC9662A1CE2E52A22E1C10A772A1C62
:102FF000E2223E52A22E123C10A77C9212E1722BC4
:10300000732B702B712A26E1444D2A28E1EBCDAEBB
:103010006 52A1CE2011000E52A1CE209EBC1CD6D16
:1030200066C92AF5E0444D117068CDFB2F2A1CE2D9
:10303000444D11EDE0CDFB5F2AF7E0444D1170687F
:10304000CDFB2F2A1CE2444D11F1E0CDFB5F01 0403
:103050002A1CE209EB01EDE0CDFB5F2A1CE2E55E
:103060000 104002A1CE20901 1000 2A1CE209EB18
:10307000C1CDE366010400 2A1CE209EB0108C0CDC2
:10308000FB5FCD186201 08002A1CE2090110 00E56F
:103090002A1CE209EBC1CD7E660108002A1CE20968
:1030A000011000E52A1CE209EBC1CD7E6601EDE0CE
:1030B000C50110002A1CE209EB01FE0CDFF660119
:1030C000C002A1CE209444D11F1E0CDFB5F2A1CE3
:1030D000E2EB0175C0CDFB5F0104002A1CE209EBA5
:1030E00001EDE0CDFB5FCD18620108002A1CE2096A
:1030F000011000E52A1CE209EBC1CD7E6601080043
:1031000002A1CE2090110002A1CE209EBC1CD7E70
:103110006601 08002A1CE20901 1000 2A1CE209E8
:10312000EBC1CD7E6601F1E0C5010C002A1CE2096D
:10313000011000E52A1CE209EBC1CDE366C9015686
:1031400 0E3C511F9E0001F5E0CD902F014AE3C51187
:10315000FAE001F7E0CD902F2AF7E0444D11 236803
:10316000CDFB2F3AFAEE0E680FE80C27D3 12A1CE2D8
:1031700 001 1000E52A1CE209EBC1CDC9662A1CE256
:10318000D11E9EOCDFB5F2AF5E0444D11236801
:10319000CDFB2F3AF9EOE680CF80CD2AFD313A1CE279
:1031A00001 1000E52A1CE209EBC1CDC9662A1CE26
:1031B000E50110002A1CE209EB01E9E0CDFF660100
:1031C000004002A1CE209B0139C0CDFB5FCD186277
:1031D000011000 2A1CE20901 1000E52A1CE209E3B
:1031E0000C1CD7E660108002A1CE20901 1000E52A1 3
:1031F00001CE209EBC1CD7E6601 08002A1CE209 0130
:10320000011000E52A1CE209EBC1CD7E6601 0C002AA04
:103210002A1CE209444D11E9E0CDFB5FCDE2300119E0C
:103220000E0C50110002A1CE209EB01F1E0CDE366E4
:103230000001E9E0C5011000 2A1CE209EB0146E3CDDB
:10324000E36611E5E001E9E0CDFB5F114EE301E942
:1032500020E0CDFB5F014E3C501 10002A1CE209EB43
:1032600015AE3CDE366C9CD6D251FDAA432CDEB5E
:103270002701800CD4526210B6E036003AD8E02F3E
:10328000F5CD6D252FC148A11FD29E323A3DEE611
:1032900080FE80C29B3221D8E036FFC37C320190A1
:1032A000CD6B26093AD4E01FDAB23CD3E3102CD
:1032B000BB3211 4EE3014E3CDFB5F115EE301BF 7D
:1032C00067CDFB5F11 56E3014AE3CDFB5F216CE381
:1032D0003600CDC0C0027011 0002A1CE209EB014E2E3AD
:1032E000CD846701 10002A1CE2093E40A6FE40C2AB
:1032F0004F330110002A1CE209EB014E3CD84670 35
:1033000001 1000 2A1CE2093EC0A6FE00C24F332174
:10331000D5E036003ADSE02FEFF5CD6D252FC148A177
:103320000011FD24F33CD C2ECDA1 26CDED251FDA494E
:1033300033CD5B2FCD91270 8 000CD6B26012000F6
:10334000CD4526CDC027CDD02 9CD9423C014 33CD6D
:103350006732C901 2000CD4526F321 00022225E275
:10336000602A1CE2011 3FE2CDFB5FFB2 12ACD2E30
:103370003A2AE12FF5012 2 5ECDBD5EB3E32CDD5F7
:103380006E9FC148A11FD2F233F30104002A1CE50
:103390009EB013FE2CDFB5FFB0104002A1CE209BF
:1033A0002A1CE2E2011000 2A1CE209EBC1CDFF71
:1033B0006601 0400 2A1CE20901 1000E52A1CE294A
:1033C000EBC1CDC966010400 2A1CE209E5011 00029
```

```
:1033D0002A1CE209EB01FB67CD1B670110002A1CC8
:1033E000E2093E80A6FE00C2EF33212AE136FFC388
:1033F00070333A2AE11FD2FF33011900CD02263A79
:103400002AE1C9011000CD4526F321000022255E262
:103410002A1CE2EB013FE2CDFB5FFB012BE13600F2
:103420003A2BE12FF50125E2CDBD5EEB3E32CDD545
:103430006E9FC148A11FD28E34F30104002A1CE202
:103440009EB013FE2CDFB5FFB0104002A1CE2090E
:10345000E2A1CE2011000E52A1CE209EBC1CDFFC0
:103460006010004002A1CE209E5011002A1CE20909
:1034700EB01FB67CD1B670110002A1CE2093E80AF
:10348000A6FE00C28B34212BE136FFC320343A2B39
:10349000E11FD29B34011900CD02263A2BE1C9016C
:1034A000003A0CD6B26011900CD0226C911000001A4
:1034B0005200CD9E53212CE136003A2CE12FF5CD60
:1034C0006D252FC148A11FD2F234CD9F34CD0334D6
:1034D0001FD2E634CD9F34CD53331FD2E334212C99
:1034E000E136FFC3EF34CD9F34CD5333322DE1C3EA
:1034F000BA34CD0E2901190CD0226CDBE29012026
:103500000000CD6B26010500CD0226C9115AE30160EA
:103510000CDFB5F015AE3C50110002A1CE209EB94
:103520000167C0CDE3660110002A1CE209EB015AD5
:1035300003CD6D66216CE336FF3E632142EC0F7B8
:103540006EDA4D3511192503600CD9E5301F60076
:10355000CD6B26011900CD02260IFEFFCD6B2601A1
:10356000500CD02263E01113BE2CD836E3E01CD2A
:10357000CB6EB5C0A8235010100CD4526016400CD70
:103580000226CD94263AD4E02F213DE3A61FD2A9EE
:1035900035012000CD4526013200CD0226CDD0229AF
:1035A00010500CD0226C3AC35CDAC34CD9127C981
:1035B0002A1AE36042A1AE27EFE00CAC135C3B5D1
:1035C000353AD4E01FDACE35010400CD0E025CDAB30
:1035D0005E212EE136003A2EE11FDA1C36CD2F5E39
:1035E000FE02CAE835C3DD35CD8725lFD2143BF3D8
:1035F00011FFFE2123E2CD876EEB28732372FB015B
:10360000500CD0226CD9FDA113621EE13601
:10361000FFC31936212EE136FFC3D6353AD4E01F59
:10362000DA2C36115250135D0CD9E53C9CDB035A4
:103630003AD4E01FDAA136CDA85ECD2F5EFE01CAD6
:103640008F3B11725013700CD4526010400CD86E2FA3
:10365000050EFE01C272362A44E32230E1CD7838019E
:10366000044E3I130E1CDDF6EB5CA72362100022BD
:1036700064E3CD2B3EB212FE173CD8539CDD23AE6
:10368000CD743ACD2C283A38E2326DE3C39436211A
:1036900006DE336FF3A6DE31FDAA136ECDB35C3A6D8
:1036A00036216DE336FFC9F3117FFF2123E2CD8779
:1036B0006EEB287323F811000001360CD9E537B
:1036C000CD2D36C911000001390CD9E53CD2D36C8
:1036D0006DC6EB5C6FF9F0162E3116AE3F5CDDFA01
:1036E0006EB5C6FF9F0162E31164E3F5CDDFE29F07
:1036F000C14B12A66E32B1168E3F5CDEF6E9FC197
:1037000048B11FD21237111525013A00CD9E53CD75
:10371000D3C9CD27251FD22037CDC436C3C3C71F
:10372000CD4A251FD2D37CDA736C33C3D373AD4E03A
:103730002F13BE2A61FD23C37CDD136C911152E2D
:1037400013B00CD9E53CD2F5EFE02CA5137C346CA
:10375000937C9CD0B353A6DE32F0166E3118E3F5E08
:10376000CDDF6E9FC148A11FD2253821D9E0360098
:1037700003A6DE32FF53AD9E02FC148A11FD209389D
:103780003A3DE31FD2A537CD8539210002264E3FD
:103790003ADCE01FDAA5371156E3014AE3CDFB5FBF
:1037A0003E0336FF3AD6E20F02:6E331:164E3F5EB
:1037B00CDDFE9FC148A11FD2DD37213CD336FF2B
:1037C00CD7E52139E236FFCDA5322139E2360002
:1037D00CD13372A64E3232264E3C3A5372A40E3E9
:1037E0001FFFFCDFA6EB5C0A01382A44E32322244D3
:1037F000E32A40E35E2356EB232E12240E3C30694
:103800003821D9E036FFC37037F3A68E323226DE30
:103810002101002244E32A3EE323235E2356EB22C8
:1038200040E3C35537CD7A28C92134E136003A341
:103830000E11FDAC53B210E4036001100002E36066
:10384000CD9E53010000C501010005C1142E301F777
:10385000FFCDDF573A22E21142E3CDEC6EB5CAAE9E
:10386000383E632142E3CDF76ED2773821D4E0367B
:10387000FFCDC84CC3AB382A42E1364400CD745C2223
:103880003EE33E00113E3CDEC6EB5CA9738CD1055
:1038900003C3234E1C3AB3B111525012F00CD9E53C6
:1038A000CD2F5EFE01CAAB38C3A038C3C2381115494
:1038B00025013000CD9E53CD2F5EFE01CAC238C314
:1038C000B738C32E380104002A3E3095E2356EBC5
:1038D0002266E3C92121E2360021DEE036002B36000D7
:1038E000E336002139E2360021DEE036002B3600D7
:1038F000CD29382A42E3EB2121E273210000226422
:10390000E32268E33A3DE31FDA3B39CDC53BCD8581
```

```
:1039100039CDD23A1156E3014AE3CDFB5F21DCE019
:10392000036FF3E001164E3CDEC6EB5CA35392A642A
:103930000E3232264E3CD743AC35239210100224407
:10394000E32A3EE323235E2356EB2240E321DCE01F
:103950003600CD2C283A38E21FDA7939F3117FFF8F
:103960002123E2CD876EEB2B732372FBCD52373AC6
:103970006DE31FDA7939CD3D37C3D438C942E3440A
:10398000E342E344E32A40E32323E50146E3C51E83
:103990000000E06CD1F4E0106002A3EE3097EFE0101
:1039A000C2C5391146E30E00CD336111E7670E0140
:1039B00CD3361CD1862010C002A1CE209444D117F
:1039C00046E3CDFB5F0110002A1CE209EB0146E350
:1039D000CD6166010500 2A40E309E52A1CE2E51EE7
:1039E00000E11E3670E01CD3361CD18DC
:1039F00062114AE30E00CDCE600107002A40E309C0
:103A0003E80A6FE00C21D3A114AE30E00CD336105E
:103A100E00CDC961114AE30E00CDCE60016E3:14
:103A2000C50105002A40E309444D1E03CDD85E5F61
:103A30000E00C50105002A40E309444D1E03CD85E5F61
:103A4000444D1E04CDD85E5F0E01CD2F5F0163E3B:
:103A50000C50105002A40E309444D1E05CDD85E5F2F
:103A60000E02CD2F5F11FF03216E3CD876EEB2B9A
:103A700073237C9117D39012800CD9E5301:20909D
:103A80002A1AE2097E3235E10168E31166E3CDDFEF
:103A90006E444DCDB74FCD2F5EFE01C2D13A2A35CF
:103AA000E14DCD0655010000C50101005C1166E3D9
:103AB0001E703CDDF572A64E32311625E3CDF6E04
:103AC000B5C2CB3A66E3232266E3321000022258CE
:103AD000E3C9118139012900CD9E53012900CA1A19
:103AE000E2097E3236E10164E3116E3CDDF6E442B
:103AF0004DCDB74FCD2F5EFE01C21A3B2A36E14DAB
:103B00000CD0655010000C50101005C1:E36E7CD9
:103B10003CDDF5721000022664E32A64E32B2264F3
:103B2000E3C92A3EE323232240E3E137E136002381
:103B3000360003A37E12F2A40E311FFFFFSCDFA6E48
:103B40004E3CD8SC6FF9FC148A11FD2743B2138E1342A7A
:103B500040E3226AE35E2356EB239E12240E33A56
:103B600038E11144E3CDEC6EB5C2713E137E1364B
:103B7000FFC33223B3A37E1C9213BE136003A3BE132
:103B80001FDAC43B110002A1280CD9E53010000042
:103B9000C501010005C1144E3016300CDDF57C0220B
:103BA00003B1FD2AD3BE213BE136FFC3C13B11813905
:103BB00012B000CD9E53CD2F5EFE01CAC13BC3B683
:103BC0003BC37D3BC92101002244E32A3EE323237A
:103BD00003B000SE2356EB2341FFFFFCDFA6EB5CA0F0C
:103BE0005C117D39012C00CD9E53CD2F5E323CE13E
:103BF0003A3CE1FE01C2FE3BCD783BC30F3C3A3C70
:103C00000E1FE02CA0F3CCD2F5E323CE1C3FE3BC950
:103C1000C0021002A3EE232311FFFFFCDFA6EB5CA273CE21CC
:103C20000DE136FFC3403C213E136001I7D39C15
:103C30002D00CD9E53CD2F5EFE01CA403CC3353CC6
:103C40003A3DE1C942E344E342E344E340E160E159
:103C50000500000100080100080000040008000062FS
:103C60000040010008000300040008000F67FS
:103C7000A9E1A5E1A9E1A5E1A9E1BF67BF671F68C7
:103C80001B68BF671B68AFE13A3EE11FDAF63C3ABA
:103C90003BE21FD2F63C2A1AE2364A1AE27EFEE5
:103CA000CAA73CC39B3C21272E23600110000015B
:103CB00047000CD9E532148E136003A48E11FDAF132
:103CC00003CCD8SE5D1FD2EE3CCD2F5E3249E13A49AC
:103CD000E1FE02C2DB3C2148E136FF3A49E1FE0148
:103CE000CE000C2EE3C2148E136FF21FF00223EE1C3BA8B
:103CF0003C2138E236002A3EE17DC9114C3C014AA4
:103D000000CD9E53CDA85ECD2F5EFE01CA123DC3ED
:103D100073DC901FEFFCD6B263E01113BE2CD837D
:103D200006E301CDCB6EB5CA363D010100CD4526B4
:103D300016400CD0226C901FEFFCD6B263A04C006
:103D4000D6FFC6FF9FF53E01113BE2CD836E3E01DB
:103D5000CDCB6EB5D6019FC148A11FD26A3D0119D6
:103D6000CD022601100CD6B26C9214AE1712157
:103D7000CD70004CE136003A4CE11FDA483CD8SE5D1FD251
:103D8000B63DCD2F5E324E13A4DE1FE01C2A63D7A
:103D9000214BE136002336FFA4AE126002240E18A
:103DA00021FF00223EE13A4DE1FE02C2863D214B29
:103DB0003BE136FF2336FF3A3BE21FD2453E012900DA3
:103DC0002A1AE2097E324FE1214EE136003E0F21F0
:103DD0004EE1BEDAF83D2A4EE126001900009EBEA
:103DE0002A1AE219E52A4EE126001500E109D::40A
:103DF00077214EE134C2CD3DCD88C0324BE13A4B86
:103E00000E11FD20A3E21:A3EFF21E2900EA1:A9EC5
:103E100093A4FE:77214E3136002E0F:214E1:9ED7
:103E2000DA453EA4EE126001500E109E5A4EC13D
:103E3000260011190009EB2A1AE219D1:A77214E3E
:103E4000E134C21A3EC3743D3A4BE1C9E161E170CD
```

```
:103E50002B7101E9031142E3CDE46EB5C26B3E1153
:103E60004E3C014500CD9E53C3743E114E3C01466D
:103E700000CD9E53C92168E1732B702B7128D1C1EA
:103E80000702B712BC1702B71D5F32A62E1444D1157
:103E90006AE1CDFB5FFB2100002225E22169E136CA
:103EA000FF0125E2CDBD5E1166E1CDEF6E9F2F21B2
:103EB00069E1A61FD21C3FF32A62E1444D1.6EE175
:103EC000CDFB5FFB016E1C501100002A1CE209E58E
:103ED00016AE1CDFF660110002A1CE2093E80A6BE
:103EE000FE80C2F33E01100002A1CE209EB01.6EE1E4
:103EF000CDC9662A64E1E5011000 2A1CE209EB0144
:103F00006EE1CD1B670110002A1CE2093EC0A6F22F
:103F100000CA193F2169E13600C3A13E3A69E11F99
:103F2000D2313F21FF00223EE12A68E12600 2240F3
:103F3000E1C92179E1732B702B712BD1C171 2BC198
:103F40007 02B712BC1702B71D5210002225E221D
:103F50007AE136FF0125E2CDBD5E1177E1CDEF6E4E
:103F60009F2F217AE1A61FD2BF3FF32A72E1444D71
:103F7000117BE1CDFB5FFB3A76E1FE00C2963F018B
:103F8007BE1C501100002A1CE209EB2A74E1444D7
:103F9000CD1B67C3A83F2A74E1E5011000 2A1CE28B
:103FA0009EB017BE1CD1B670110002A1CE2093EF1
:103FB00080A6FE00C2BC3F217AE13600C3543F3ADE
:103FC0007AE11FD2D43F21FF00223EE12A79E12687
:103FD00000 2240E1C92182E1722B732B702B7121E9
:103FE0000000002225E20125E2CDBD5E3E00CDCB6E74
:103FF000B5C2F73FC3E53FF32A25E22283E12A7FDA
:10400000E1444D1185E1CDFB5FFB0125E2CDBD5EB5
:10401000E52A83E101320009D1CDCE68D22240C320
:104020000A40F32A7FE1444D2A81E1EBCDFB5FFB9F
:104030002A81E1E50110002A1CE209EB0185E1CDAE
:10404000FF66C9218AE1702B712A89E12242E121B0
:10405000 00002244E12246E1222 5E2C9D209EB86
:10406000BD5E228BE10144E1118BE1CDFF6EDAA070
:1040700040113 20002A44E1192244E10129002A1AA0
:10408000E209360E2A1AE20B0936200146E11.42F6
:10409000E1CDDF6E44A0DB74F2A46E1232246E104
:1040A000C9CD6D251FDABA4 0110000016200CD9E16
:1040B00053CDA85ECD2F5E328DE1C9CD883C1FDA8D
:1040C0002041010B00CD4C3E011E00CD4340012597
:1040D000E2CDBD5EEB21DC05CDCE6ED2240C3258F
:1040E00040C3CE40F311AFE20153E2CDFB5FFB01D1
:1040F000AFE2C52A1CE2011000E52A1CE209EBC16F
:10410000CDFF66114AE301BF67CDFB5F11000001DF
:104110006000CD9E53216CE33600CDC027CDEB2748
:104120009CD883C1FDA6B401A00CD4C3E114AD3
:10413000E3011768CDFB5F216CE33600CDC027CDCE
:10414000EB27F32A1CE2EB0153E2CDFB5FFB2A1CB9
:10415000E2444D11ABE2CDFB5F01ABE2C5011000C3
:104160002A1CE2011768CDFF66C9CD883C1F08
:10417000DAB4 41010900CD4C3E011E00CD4340019F
:1041800025E2CDBD5EEB21DC05CDCE6ED2954 1CDD5
:104190005C40C37F41F311A7E20153E2CDFB5FFB1B
:1041A00017AE2C52A1CE2011000E52A1CE209EB86
:1041B000C1CDFF66C9CD883C1FDAFF41010800CDA3
:1041C0004C3E114AE3011368CDFB5F216CE33600DE
:1041D000CDC027CDEB27F32A1CE2EB0153E2CDFB48
:1041E000CDFB5FB2A1CE2444D11A3E2CDFB5F01A3E279
:1041F000C50110002A1CE209EB0113 68CDFF6 6C956
:104200003A3EE11FDA464 2010700CD4C3E0153E23F
:104210000C5010768C51E1E01DC05CD753E119FE274
:104220000 153E2CDD53F010040CD9E53216CE33600CD9EB0196AA
:10423000E2CDC9660102 00CDGB26011900CD022630
:1042400000010040CD6B26C9CD883C1FDA8A4 2012 6A9
:10425000000CD4C3E010200CD4526 0153E2C5010FC1
:10426 0068C50E80C51E1D017017CD323F1:9BE23F
:1042700000 153E2CDD53F010040CD45260110002A73
:1042 80001CE209EB019BE2CDC966C9CD883C1FDA6F
:10429000D142010500CD4C3E011E00CD434 0012519
:1042A000E2CDBD5EEB21DC05CDCE6ED2B4 42CD5C5D
:1042B000040C39E42F31197E20153E2CDFB5FFB0145
:1042C00097E2C50110002A1CE209EB0193E2CDFF41
:1042D00066C9CD883C1FDAFE4 20104 00CD4C3E1178
:1042E0004AE301BF67CDFB5F216CE33600CDC027F9
:1042F000CDEB27F3 1193E20153E2CDFB5F01 93A0B
:104300003EE11FDA3743010300CD4C3E 0153E2C5C5
:1043100010768C51E1C01DC05CD753E118FE2 0149
:10432 00053E2CDD53F010400CD6B2601190 0CD022BB
:1043 30 002601 00CD6B26C9CD883C1FDAB74 3 019A
:104340 00200CD4C3E114AE301BF67CDFB5F216CFB
:1043500E33600CDC027CDEB2701320 0CD022 60188
:10436 00000400CD4526015 3E2C5010B68C50E00C50A
:10437 0001E1B017017CD323F118BE 0153E2CDD5E8
:1043 80003F010 040CD4 526C9CD883C1FDA4 0 4 4 019D
:10439 00000100CD4C3EF32A1CE2EB0153E2CDFB5F62
:1043A000FB010400CD452611000 00 014 3 0 0CD9E53C2
:1043B000E17CD6B3D32 8EE1010400CD6B263A8E97
:1043C000E11FD24044F30104002A1CE209EB01532F
:1043D000E2CDFB5FFB0104002A1CE209E52A1CE296
:1043E00011000E52A1CE209EBC1CD1B670 1100 09A
:1043F0002A1CE2093EC0A6FE00CA2344 01100 02A7E
:1044 000001CE2093E40A6FE00CA1444 2119 00 0 2240C5
:1044 1000E1C31A44 211A0 02 240E121FF 002 23E1B8
:1044 2 000C34044 01 0200CD4 52 611 00 00 014 4 00CDE7
:1044 3 0 009E5 3 0E18CD6B3D32 8EE1 01 0 2 00CD6B26 E3
:1044 4 0 00C92 1 00 00 2240E122 3EE1CD2C2 83A3 8E2 89
:1044 5 0 0 01FDA314 5 1100 00 0 1 4 2 00CD9E5 3CD 1 3 3DBE
:1044 6 0 0 02 1 00 00 22 25E23A3DE2E64 0D6 00D6 019F3 7
:1044 7 000F5 01 2 5E2CDBD5EEB2 1DC 05CDCE6E9FC 1 01
:1044 8 0 00 04 8A11FD2 8944C36 6 4 4 0 11 900CD0 2 26 3ACF
:1044 9 0 0 03DE2E64 0FE 00CA8 4 4 2 11 15 0 002 2 40E 1 2191
:1044A 000FF00 223EE1C3E4 5 114AE3 0 1BF6 7CDFB6 9
:1044B0005FCDB4 2 62 1 00 00 2 22 5E21 1 0 04 02 12 3E2 3 5
:1044C000CD876E3E00CDCB6EB5D6019FF501 25E2BE
:1044D000CDBD5EEB217017CDCE6E9FC148A11FD21E
:1044E000E544C3BA44110 0 402123E2CD876E3E006B
:1044F000CDCB6EB5C22245211 6 00 2240E121FF003E
:10450 00002 23EE1F 3 11FFF2123E2CD876EEB2B7305
:10451 0002 3 722 10 04 0CD9D6E2 2 23E2FB 0 10 600CDD7
:104520 00B26 0 11 9 0 0CD 0 2 26 01 0 0 4 0CD 6B26 C3 3 7 5E
:10453 0 0 04 52 1FF 0 0 2 23EE 1C9CD4 14 4CD8 8 4 3CD3 81D
:10454 00043CDFF4 2CDD24 2CD8B4 2CD4 7 4 2CD00 4 2 3A
:10455 0 00CDB5 4 1CD6C4 1CD2 1 41CDBB4 0CD3 7 3D3EA8
:104 56 0 0 0 0 0 1140E1CDEC6EB5CA 714 5CDFB3CC3 74 8 2
:104 57 0 00 04 5CDA14 0C9CD8 8 3C1FDACF4 5 0 1 0 8 00CD0B
:104 5 80 0 0 04C3E2 1 0 0 00 2 2 2 5E2CD 2 4 2 9 2FF 5 0 1 2 5E2 1 1
:104 59 0 00CDBD5EEB2 1DC 05CDCE6E 9FC 1 4 8A 1 1FD 20 3
:104 5A 0 00A545C 3 8 8 4 5CD24 29 1FD 2C 3 4 5CD 0E29F3 87
:104 5B 0 0 01 18 7E2 0 13FE2CDFB5FFB 0 12 00 0CD 6B 2 6BE
:104 5C 0 0 0C3CF452 1FF 00 223EE 12 1 0F 0 0 2 24 0E 1C9 7 7
:104 5D 0 0 0CD 8 83C 1FDA2E4 6 0 1 07 0 0CD4C 3E 0 12 00 0 5D
:104 5E 0 00CD4 5 26218FE 1 36 0 1 3E 0 5 2 18FE 1 96 9F 2F 9 3
:104 5F 0 0 0 2A 3EE 1F 5CD 9 36EF 1CD7 9 6E7D1FD 2 17 4 63F
:104 6 0 0 0013FE 2C 5 0 1F7 67C 5 1E 0E 0 1F 4 0 1CD7 5 3EFD
:104 6 1 0 0 0218FE134CD384 5 118 3E20 13FE 2CDD 5 3F 6C
:104 6 2 0 0 0 0 1 10 0 0 2A 1CE 2 0 9EB 0 18 3E 2CDC 9 66C 9CD6 5
:104 6 3 0 0 08 8 3C 1FDA 9 5 4 6 0 10 6 0 0CD4C 3E 0 10 8 0 0CDAE
:104 6 4 0 006B26 2 1 00 00 222 5E 2CD4 E 2 9 2FF 5 0 125E 2 1F
:104 6 5 0 00CDBD 5EEB 2 1DC 0 5CDCE 6E 9FC 1 4 8A 1 1FD 2 4 2
:104 6 6 0 006 5 4 6C 3 4 8 4 6CD 4 E 29 1FD 2 8 9 4 6CD 0E 2 9F 3 5 3
:104 6 7 0 0 0 1 17FE 2 0 13FE 2CDFB5FFB 0 1 00 0CD 6B 2 6 1 5
:104 6 8 0 0 0 1 1 9 00CD 0 2 26C 3 9 5 4 6 2 1FF 0 0 22 3EE 1 2 1F 2
:104 6 9 0 0 0 0D 00 2 2 4 0E1C9CD 8 8 3C 1FDADF 4 6 0 1 0 5 0 0 4C
:104 6A 0 0 0CD4C 3E 2 1 1 0 0 0CD 4 5 2 6 0 1 3FE 2C5 0 1F7 6 7 2 4
:104 6B0 0 0C5 1E 0C 0 1F 4 0 1CD7 5 3E 3A3EE 1 1FDADF 4 6 1E
:104 6C 00 0 00 10 0CD4 5 2 6 0 1 3FE 2C5 01F7 67C5 1E 0B 7 5
:104 6D 0 0 0 0 1DC 0 5CD 7 5 3E 1 17BE 2 0 13FF 2CDD 5 3FC 9 3E
:104 6E 0 00CD 0 0 0CD 0 0CD 8 8 3C 1FDAB 4 7 0 1 0 4 0 0CD4C 3E 0 1 1E 0 5 3
:104 6F 0 0 0CD4 3 4 0 0 1 2 5E 2CDBD 5EEB 2 1DC 0 5CDCE 6E 8 4
:10 4 7 0 00 0D 2 0 9 4 7CD 5C 4 0C 3F 3 4 6F 3 0 1 7 7E 2C 5 0 1 10FF
:10 4 7 1 0 00 0 2A 1CE 2 0 9EB 0 1 3FE 2CDFF 6 6FB 0 1 1 0 0 01D
:10 4 7 2 0 0 02A 1CE 2 0 9EB 0 1 3FE 2CDC 9 6 6C 0 1 0 8 00CDB6
:10 4 7 3 0 0 0 2 6C 9CD 8 8 3C 1FDADC 4 7 0 1 0 3 0 0CD 4C 3E 2 1 6 1
:10 4 7 4 0 0 0 00 0 02 2 25E 2 1 1 0 0 8 0 2 1 2 3E2CD 8 7 6E 3E 0 0 8 9
:10 4 7 5 0 0 0CDCB 6EB 5D 6 0 19FF 5 0 1 2 5E 2CDBD 5EEB 2 1 3 7
:10 4 7 6 0 0 0DC 0 5CDCE 6E 9FC1 4 8A 1 1FD 2 7 0 4 7C 3 4 5 4 7 1F
:10 4 7 7 0 0 0 1 1 00 8 0 2 1 2 3E 2CD 8 7 6E3E 0 0CDCB 6E 3 5CAFD
:10 4 7 8 0 0 0B 1 4 7 0 1 1 9 00CD 0 2 2 6F 3 1 1 7 3E 2 0 1 3FE 2CDDA
:10 4 7 9 0 0 0FB 5FFB 1 1 7 7E 2 0 1 7 3E 2CDFB 5F 0 1 7 3E 2C 5 2
:10 4 7A 0 0 0 1 1 00 0 02A 1CE 2 0 9EB 0 1 0 3 6 8CDFF 6 6C 3 DC 9F
:10 4 7B 0 0 0 4 7F 3 1 1FFCF 2 1 8 3E 2CD 8 7 6EEB 2B7 3 8 3 7 2DA
:10 4 7C 0 0 0 2 10 0 8 0CD 9D 6E 2 2 2 3E 2FB 0 1 1 0 0 0CD 6B 2 6 DF
:10 4 7D 0 0 0 2 1FF 0 0 2 23EE 1 2 1 0A0 02 2 4 0E 1C 9CD 8 8 3C B 0
:10 4 7E 00 0 1FDA 5 6 4 8 0 1 0 2 0 0CD4C 3EDD 0 2 9 0 1 1 9 0 0F 8
:10 4 7F 0 0 0CD 0 2 26 6A 1 1 4BE 2 0 1 0 3 6 8CDFB 5FF 3 3A 2 0E 2C 4
:1 0 4 8 0 0 0 0F 6 8 0 3 2 2 0CE 2 0 1 1 9 0 0CD 4 5 2 6FB 3A 2 0E 2 6 9 8
:1 0 4 8 1 0 0 0 8 0FE 0 0CA 1 9 4 8C 3 0C 0 4 8 2 1 9 0E 1 3 6 0 1 3E 0 5CD
:1 0 4 8 2 0 0 0 2 1 9 0E 1 9 6 9F 2F 2A 3EE 1F 5CD 9 3 6EF 1CD7 9 4F
:1 0 4 8 3 0 0 0 0 6E7D 1FD 2 C 8 4 8 0 1F7 6 7C 5 1E 2 0 9D 5
:1 0 4 8 4 0 0 0 0 1F 4 0 1CD 7 5 3E 2 1 9 0E 1 3 4 C 3 1E 4 8 1 1 6FE 2A
:1 0 4 8 5 0 0 0 1 3FE 2CDD 5 3FC 9CD 8 83C1FDAEE 4 8 0 1 0 1CA
:1 0 4 8 6 0 0 0 0 0 0CD 4 C 3ECDD 0 2 9 0 1 1 0 0 0CD 4 5 26 1 1 0 0 0 0D 1
:1 0 4 8 7 0 0 0 1 4 0 0 0CD 6B 2 6C 9CD 8 8 3D 32 9 1E 1 0 1 1 0FE
:1 0 4 8 8 0 0 0 0 0 0CD 6B 2 6 3A9 1E 1 1FD 2EE 4 8 0 1 1 9 0 0CD 0 2 0E
:1 0 4 8 9 0 0 0 2 6F 3 0 1 1 0 0 0 2A 1CE 2 0 9EB 0 1 3FE 2 CD 8 4 67F 8
:1 0 4 8A 0 0 0FB 0 1 1 0 0 0 2A 1CE 2 0 93EC 0A6FE 0 0 C 2 CA 4 8 5 5
:1 0 4 8B 0 0 0 0 1 2 0 0 0CD 4 5 2 6 1 1 00 0 0 0 14 1 00 CD 9E 5 3 0E 8 0
:1 0 4 8C 0 0 0 0 4CD 6B 3D 3 2 9 1E 1C 3EE 4 8 0 1 10 0 0 2A 1 CE 2 9 9
```

```
:1048D000093E40A6FE00CAE248210500224CE1C38D
:1048E000E848210600224CE121FF00223EE1C921E3
:1048F0000000224CE1223EE1216CE336FFCD2C286E
:104900003A38E21FDAC949110000013F00CD9E5339
:10491000CD133DCD942621000002225E23A3DE2E66A
:104920004CD600D6019FF5C125E2CDBD5EEB21DC2E
:104930005CDCE6E9FC148A11FD23F49C31C49017E
:104940001900CD02263A3DE2E640FE00CABA49010E
:104950002000CD452601320CD022621000022256F
:104960002CDA528F50125E2CBD5EEB21DC05CD2C
:104970000CE6E9FC148A1F5CD883C2FC148A11FD262
:1049B0000B549C361490125E2CBD5EEB21DC05CD42
:104990000CE6E9F2FF5CD883CC148B11FD2AE4921C4
:1049A000FF00223EE12102000224CE1C3B749011984
:1049B0000000CD0226CD8E29C3C64921FF00223EE14B
:1049C000210100224CE1C3CF4921FF00223EE1C97D
:1049D0000CDEF48CD5748CDDD47CD3247CDE046CD70
:1049E0009009646CD2F46CDD045CD7545CD373D3E00C1
:1049F0001140E1CDEC6EB5CA004ACDFB3CC3034A81
:104A0000CDA140C9F3117FFE2123E2CD876EEB2BB0
:104A10000732372FB01FFFFFCD6B262192E1343A0133
:104A2000C01FD2464A3E082192E1BED2334A2192AB
:104A3000BE136002A92E12600001503C29094E23A826
:104A40000CD4526C3644A3E052192E1BED2544A2197
:104A500092E136002A92E1260001623C29094E23A8
:104A60004 6CD4526C9C2C283A38E21FDA6D4B21B8
:104A70003E136002A92E1293E1BEDA914A2A93E199
:104A8000026000195E1093A93E1772193E134C2745C
:104A90004A2194E136023A38E21FDA674B2193E16A
:104AA00036003E0F2193E1BEDAF74A2A93E1260051
:104AB0000195E1097EFE80CACB4A2A93E1260001B6
:104AC00095E1097E3CE63F77C3D64A2A93E1400032
:104AD000195E109362F2A93E126000195E1097E2F
:104AE000FE2EC2F04A2A93E126000195E1093680A4
:104AF0002193E134C2A24A2193E136003E0F2193073
:104B0000BEDA274E2A93E126000:95E:09E52A67
:104B100093E1260001190009EB2A1AE219D11A774C
:104B20002193E134C2F4A3A94E1FE2E2C23A4BCDF1
:104B3000044A2194E13600C33E4B21943134013212
:104B40000CD0226CD8E5D1FD2644BCDA85ECD3EEA
:104B50005D2FF53A38E22FC148A11FD2614E23195
:104B6000BCDA85EC3964A01FFFFCD6B26C9CD6D24
:104B7000251FDA9C4B3A01C01FD2994B110000014E
:104B80006000CD9E53114AE301BF67CDFB5F216CEE
:104B90006000E33600CDEB27CDA14OC3A4B21200DBC
:104BA00040E1CDFB3CCD1337C9CD2C283A38E21F6C
:104BB000DAC74C11A5E101F767CDFB5F0110002AR0
:104BC0001CE209EB01A5E1CD6D6611A9E101A5E1AA
:104BD000CDFB5F0110002A1CE209EB01A9E1CD6DBC
:104BE0006601A9E1C501100002A1CE209EB01A5E15B
:104BF000CDE3661156E301F67CDFB5FCD0B353AC0
:104C000001C01FD20F4C2106002ADE1C3154C217B
:104C1000200023ADE1213AFE101ADE111AFCD
:104C2000E1CDDF6E9FF5CD6D252FC148A11FD2C0408
:104C30004C2AAFE1016E3C29094E23461146E3CDD3
:104C4000FB5F2AAFE1017A3C29094E23461144E378
:104C5000CDFB5F3A79C01FDA684C01100022A1CE2D4
:104C60009EB01A4E3CD C9662AAFE1232AFE1:186
:104C70008 63C015A00CD9E53CDA532CD6D251FDA5D
:104C8000C14C3E0211AFE1CDEC6EB5C2974C11B3F1
:104C9000E2015EE3CDFB5F3E0411AFE1CDEC6EB50A
:104CA0000 C2AC4C11B7E2015EE3CDFB5F2E0611AF33
:104CB000E1CDEC6EB5C2C14C11BBE2015EE3CDFBB0
:104CC00005FC31B4CCDD6E4BC901E903:142E3CDE438
:104CD0006EB5C2B4CCDD049C3494D01D10711425D
:104CE0000E2003936006E4EB5D6019F2101C0A61FD2F64CDC
:104CF000CD3845C3494D01B90B1142E3CDE46B542
:104D0000C2094DCDA94BC3494D3E4011 23E2CD838D
:104D10006E3E40CDCB6EB5D6019F01F92E1142E318
:104D2000F5CDE46EB5D6019FC148A11FD2354CDC5A
:104D3000654C3494AC3494D01C2F00CD9E53CD2FF0
:104D4000EFE01CA494DC33E4DC9060203 01 03A0E0
:104D50008601001027000E803000640000000A3C
:104D6000000000001000001027E803640000A01B1
:034D700000006D337
:104D74000302040301C2211B1E1713AB1E1FE0AD256
:104D840000914D3AB1E1C63032B2E1C3994D3AB1E145
:104D9400C63732B2E13AB2E1C921B3E1713AB3E1C3
:104DA400C6F81F1F1FEE0F4FCD7A4D0129002A79
:104DB4001AE2094E060021190009EB2A1AE21977B2
:104DC40001129002A1AE209343AB3E1E60F4FCD7AF9
:104DD4004D0129002A1AE2094E060021190009EBA7
:104DE4002A1AE21977 0129002A1AE20934C921B6DC
:104DF400E1702B7121B7E136013E0421B7E1BEDA3F
```

```
:104E04001E4E21B7E13E04964F06002AB5E1094E35
:104E14000CD9D4D21B7E134C2FD4DC93BE5E52105EA
:104E2400003953D53341C5335E2356234E2346C53B
:104E34000234E73234672C50E00CD16652107003933
:104E4400EB0E00CDCE60210600393600210400397E
:104E54007E3D2323BEDA964E11C7670E01CD3361E2
:104E6400CD18622105003 97E210600398621000013
:104E7400394E23465FCDD85E210700397721 0700DC
:104E840039EB0E01CD336:CD97612106003934C26F
:104E94000504E21020039 5E23560E00CDCE60210F04
:104EA400039F9C921BCE1732B712BD1C:712BC11C
:104EB400070BE71D53ABBE1D601D6019FF53ABAE120
:104EC400D600D6019FC148A11FD294E3A4E4D32C9
:104ED400BEE1C3E64E2ABAE126000 14C4D097E32FA
:104EE400BEE13ABCE1FE80C20B4F0129002A1AE25E
:104EF40094E060021190009EB2A1AE21 9362D0180
:104F04002900 2A1AE20934E1BFE1360023 36002A97
:104F1400BAE12600014A4D097E3D21C0E1BEDAB660
:104F24004F2ABBE1444D2ACOE1EBCDD85E32BE0151
:104F340 03ABDE1D600C6FF9F2ABAE126000:4A4DD8
:104F440009F57E3D21C0E196D6019FC148B1F53AED
:104F5400BEE196D6019FC148B11FD2664F21BFE181
:104F640036FF3ABFE11FD2AF4F3ABDE1C6300:2947
:104F7400002A1AE2094E060021190009EB2A1AE25E
:104F84001977E1BEE13ACOE1BEC2A74F0 129002A28
:104F94001AE2094E060021190009EB2A1AE22193E09
:104FA400B6770129002A1AE209342C0E134C20B
:104FB40 0134FCD93BE5E5CC52 05003936002E36000 2
:104FC4003E0421040039BEDA64502106003936205B
:104FD4002B2E4E060021674D09094E2346210 20 0 2E2
:104FE40039712370210 0 0 039EB21020039CDE16EC3
:104FF400DA105021060039342100003 9EB2102007
:1050040039CDE16EEB2B732372C3E84F210600390F
:1050140 07ED60 0 C6FF9F2B2BF57ED604D6019FC:FA
:105024 0 048B11FD230502105003936FF2105 0 0 391F
:10503400 07E1FD25C5503E3 0 2106 0 0039860129002AA9
:105044001AE2094E060021190009EB2A1AE219771F
:1050540001290 0 2A1AE20 93421040 0 3934C2C44F58
:1050640033D1D1DC921C4E1732B712BD:C17 02BA0
:1050740071D52AC1E1444D11CCE1CDFB5F01100093
:105084002A1CE2 09 EB2A1E1444DCD846701100 0DA
:105094 002A1CE2 093E80A6FE0 0CACB500110002A59
:1050A4001CE209EB01CCE1CDC9660129 0 02A1AE210
:1050B4000094E060 0 21190 009EB2A1AE219362D01BE
:1050C4000094E 06000221 3 9343AC4E1D601D6019FF52F
:1050D4003AC3E1D60 0D6019FC148A11FD2EC503A91
:1050E40 04E4D32C8E1C3F9502AC3E12600 014C4DAC
:1050F40 097E32C8E1 21C9E1 36 0 03AC3E1FE 0 0C2AB
:105104 000F51214F4D22C5E1 C3:551215B4D22C5DD
:1051140 0E121CBE13600 2AC3E126 0 0 014A4D097E94
:105124 003D21CBE1BEDA125221C7E13600 21CAE1AA
:1051340036 0 03ACAE11FDA81512AC5E1E50 1100 0BF
:1051440 02A1CE209EB01CCE1CD1B670110002A:CEB
:10515400 2C8E2093EC0A6FE0 0CA795121C7E13401CC60
:1051640 0E1C5011000 2A1CE2 09 EB2AC5E1444DCD3A
:10517400FF66C37E5121CAE136FFC33651110400D4
:10518400 2AC5E11922C5E13AC7E1D600 C6FF9F2A24
:105194 0 0C3E12600 01 4AD 09F57E3D21 C BE196D6B7
:1051A400019FC148B1F53AC8E196D6019FC148B103
:1051B40 01FD2BD5121C9E136FF3AC9E11FD20B52BA
:1051C40 021C8E13ACBE1BEC2EA513AC7E1C6B00117
:1051D40 0290 0 2A1AE20 6000 21190 009EB2A1AAD
:1051E400E21977C303523AC7E1C6300129002A1AEB
:1051F400E2094E060021190009EB2A1AE219770187
:105204 0029002A1AE209 3421CBE134C21A51C93BDC
:1052140 0C5210200393600210200394E0600EB1B7D
:105224 0 02 900 21AE2093 4210 2003 934E 0600EB1B7D
:10523400 0 0 0 EB1B1BCD646E012900 E52A1AE2094E1E
:10524400060 021190 0 09EB2A1AE219C10A77 01297B
:10525400 0 2A1AE2 0 93421 02 003934C31B5233D123
:10526400CD93B21000 03 93600 0 3 0E0F2: 0 0 0 039EDA67
:10527400 0 9052210 0 0 0 0394E060 021190 0 9EB2A:228
:10528400E2193620210 0 0 3934C2 0C530 :290 0 2A57
:105294 0 01AE2 0936 0033C93BE5E5E5D5C5210 0 0 2E
:1052A400 0394E23460B6 06929EB2A1AE219 4E23A4CB
:1052B4 0 0210 0 0 039712370210 9000 393600 0233600 95
:1052C40 0210A00 394E060 021040039EBCD6BE7E0
:1052D400FE 0 0CA9653210A 0 0 394E 060 02104003903
:1052E400BCD646E7EEB23232377FE3C22553216B
:1052F400900 039639630021040 003 5D1CD70 6EEC
:10530400 4E2346EB23232 37:237 0210 60 03 94E2 3B9
:1053140 0466 0694E23 4CDB74F21090 03 934C0 3B8 0 8
:1053240 053210A00 397EFE24 0 26B532 : 09 0 0 39 6ED3
:105334 0 02600 29E521040 039D1CD70 6E4E2346E2B9
```

```
:10534400232323712370210600394E2346030A4F79
:10535400CD9D4D210600394E23460A4FCD9D4D214A
:10536400090003934C38E530129002A1AE2094E0672
:10537400002119000 9EB2A1AE219E5210A00397EF5
:10538400E1770129002A1AE20934210A003934C3D9
:1053940004 5EB210B0039F9EBC9D5C5CD65522 1B7
:1053A400000 0394E2346210200395E2356CD9B521C
:1053B400E1E1C93B41C5330129002A1AE2097E21F2
:1053C400010039770129002A1AE209E5210200398E
:1053D4007E1030039864FD11AB9D2015401290024
:1053E4002A1AE2094E060021190009EB2A1AE2:9C9
:1053F400036200129002A1AE20934C3C853D1C93B13
:10540400041C53321010039 36FF2B7EFE2DC23554B0
:10541400E2097E1FD22C544116002A13
:10542400 01AE2093600C3325421010039360 0C38F11
:10543400054210000397EFE2EC267540117002A1A37
:10544400E2097E1FD25E540117002A1AE209 3600CF
:105454 002A1AE20B093600C364542:010039 3600CC
:10546400C38F542100 00397ED6309 E2FF53E3996E4
:10547400 09F2FC148A11FD2895401160 02A1AE2099C
:10548400036 00C38F542101003936002010039 7ED2
:1054940 01FD2045521 0000397EFE2EC2CBE5 4029BC
:1054A40 0002A1AE2097E3D4F06002119000 9EB2A61
:1054B4001AE2193E80B677C3E154012900 2A1AE2A0
:1054C40 0094E060021190009EB2A1AE219E52102 06
:1054D4000 0397EE1770129002A1AE20934011500 16
:1054E4002A1AE2094E06002105000 9EB2A1AE219DC
:1054F400E5210200397EE177 0115002A1AE2093418
:10550400 D1C93B41C5333E00021000039BED22A5 5E2
:10551 40 02100003 97E3D4F060021190009EB2A1AA B
:10552400E2E215AE17FA677210 0 00397E2101 00397 F8
:1055340 03E0F21010039BEDA585521010039 4E06CB
:10554400 0021190009EB2A1AE21936202101003939
:10555400034C234550129002A1AE209E5210 20 0392E
:1055640 07EE177D1C941C53301150 02A1AE2093613
:10557400 0000397E1FD2915501160 02A1AE23B
:10558400 00936002A1AE203093600C3A:550116 00A0
:105594002A1AE20936FF2A1AE2030936FF33C93B 05
:1055A400E553D53341C5330129002A1AE2 093E10D7
:1055B400 0962102003977210 00394ECD69552:0326
:1055C40003 93600210300397E1FDA2456CD2F5EC0
:1055D40002104 00039772104 00397EFE01CA115621C5
:1055E4000400039 7EFE02CA085601150 02A1AE2098F
:1055F4007E21020039BED20556210400394ECD0366
:1056040 0054C30E562103003936FFC321562101 002D
:10561400394ECD6955210000394ECD0655C3C855C4
:105624 00033E1E1C921EFFF39F953D533C5210 300 33
:1056340039600210200397E3D23BEDA636562 10348
:105644000 0394E06002119000 9EB2A1AE219E52156
:10565400 06003909C10A772103 003934C23756CD0F
:105664006 5521000039 4E2346CD1352CD2F5EFEE4
:1056740 0 01CA7B56C37056CD655221030039 3600EA
:105684000210200397E3D23BEDAB056210300 394E93
:10569400 060021020 03909E5211900 09EB2A1AE260
:1056A40019C10A772103 003934C28456012900 2A1A
:1056B4001AE209E5210400397EE177E212:14 0039 6F
:1056C4 00F9EBC9E5E5E5E00CD166521030 03 9E3F
:1056D4 00360001180 02A1AE2093602 0200393680
:1056E4 00 00115 0 02A1AE209E5210400397EE1963 9
:1056F4 009F0118002A1AE209F57E2FC:148A11FD2E
:1057040 09257210200394E06002105000 9EB2A1A9E
:10571400E2197EFE2DC225572103 00393680C38A43
:1057240 05711C7670E01CD3361CD186221040039CA
:1057340 0EB0E 00CDCE 600E 00CD1665CDFF6:2104C9
:1057440 039EB0E 00CD3361 0110 002A1CE2093E42
:10575400 040A6FE40CA6757011800 02A1AE2093 6FF1C
:10576400C38A570E01CD1665210 0 0394E06002169
:10577400 0 05000 9EB2A1AE2197ED6300104 0 0 2A1C1E
:10578400 E20977CD976121020039 34C3E5562A1C1A
:10579400E223237ED600 C6FF9F0103002A1CE209F0
:1057A400F57ED600 C6FF9FC148B11FD2BB57011872
:1057B4 002A1AE20936FF210300397EFE80 C2CA9C
:1057C4 005 70E00CD09612A1CE2EB21000039732376
:1057D40 072EB5E2356EBD1D1D1C9E521020 039 58
:1057E400 D5C55E2356234E2346C5234E7323467 2E6
:1057F400C53E 002100 0039CDF76EB5CA0C58210212
:1058040 000394E2346C0D1352012 9 002A1AE2097E9B
:105814 002108003977233600210900397E1FDA8EEA
:1058240 0 05810800394E1EFFCDA355CDC756E521 9A
:105834 00 0 0 000394E234606 9C17123700118002A9B
:105844001AE20952104000395ECD2856C38B08
:10585400039CDE10E2 9FE1B6EBF5E521080039+BC1E5
:10586400BCDDF6E9FC148B11FD285580:7600 2A47
:10587400:1EE2094E2346210800395ECD2856C38B0B
```

```
:10588400 05821090 03936FFC3:C58EB210E0039F9A1
:10589400EBC921D5E1732B702B712BD1C1702B7:06
:1058A4002BC171D52ADDE1260001714D097E32D772
:1058B400E121D6E136003AD7E13D21D6E1B2DA0A4C
:1058C4 00591150 02A1AE2093AD7E1964F3AD6E16E
:1058D400B9D2E0582:D8E13600C3F4582AD6E126DB
:1058E40000010500 09EB2A1AE2197ED6302D8E10C
:1058F4002AD1E1E52AD6E14D2AD8E1EBCD2F5F216B
:10590400D6E134C2BA582AD3E13AD5E177C921DACB
:10591400E1732B7E21DEE136FF23360021DBE13612
:105924000101150 02A1AE2097E21DBE1BEDA75596C
:1059340 03ADBE13D4F060021050 009EB2A1AE2198 2
:10594400 7E32E0E1FE2DCA6E593AE0E1FE2EC25EDF
:1059540 0593ADFE13ADE1C36E592ADFE1260 00164
:1059 6400E1E1090B0A77 606 92B3421DBE134C225BC
:10597400593E0021DFE1BED2755A3ADEE1FEFFC294
:10598400 0C593ADFE132DEE13ADAE1D601D6019F01
:10599 400F53AD9E1D600D6019FC148A11FD2AC592E
:1059A40021DDE13602C3B2593AD9E132DDE121DE2B
:1059B400E13ADFE1962B4E060021774D09F57EC1D1
:1059C40048919F2F2ADDE1260 001744D09F57E21BF
:1059D400DEE1969F2FC148A11FD2695A21DBE1362F
:1059E4003E0F21DBE1BEDA055A2ADBE126 00 0185
:1059F4000 50 0 0 9EB2A1AE2193630 21DBE134C2E54D
:105A0400 05921DBE136003ADFE13D21DBE1BEDA4832
:105A14005A2ADDE126 0001744D097E21DEE196213A
:105A2400DBE18623772B4E060021E1E1094F6 00D6
:105A3400E521050 009EB2A1AE219C10A7721DBE105
:105A440034C20A5A2ADDE126 0001744D09E52ADD33
:105A5400E126 0001774D097EE18 60115002A1AE24C
:105A6400097C3725A0115 002A1AE2093600C37E67
:105A74005A0115 002A1AE2093600C921F4E1732BF0
:105A8400 0712BD1C1702B71D50105002A1AE2097E50
:105A9400FE2DC2A15A21F6E13680C3A65A21F6E1B1
:105AA4 003 6 002AF3E14D2AF4E1EBCD125901:500 39
:105AB4002A1AE2 093E 0BED2CA5A0118002A1AE23E
:105AC4 0 0 093600C3D35A0118002A1AE2 0936FF0E18
:105AD40000 0CD166521F5E1360 0 0115 002A1AE2 09 0 8
:105AE400A03AF5E1969F0118002A1AE209F57E2FC1C2
:105AF40048A11FD25E5B11C7670E01CD3361CD187B
:105B0400 06211F7E10E 00CDCE60 0E00CD1665CDFF1B
:105B140 06111F7E10E 00CD3361 0110 002A1CE20986
:105B2400 03E40A6FE40CA385B0118002A1AE2093634
:105B34 0 0FFC3575B0E01CD166 52AF5E1260001056A
:105B44 00 00 09EB2A1AE2197ED6302A1CE20B0977E7
:105B5400CD976121F5E134C3DD5A3AF6E1FE80C206
:105B64006B5B0E00CDC961C92106E272B732B70E9
:105B74002B712BD1C1702B712BC1702B7:28C:16
:105B84 00702B712BC170 2B71D53E 0011FBE1CDEC54
:105B940 06EB5CAA15B2AFBE1444DCD13520129 0025
:105BA4 002A1AE2097E3208E22109E236003AQ9E2C1
:105BB400 01FDA5F5C2A0B6E24D1E 00CDA3552A0BE2DA
:105BC400E52A01E24D2A02E2EBCD7F5A0110002AB8
:105BD4 001CE2093E80A63207E2 0118002A1AE2 09F3
:105BE4 007E1FDA375C2AFDE1EB0E 01CD3361CDFF78
:105BF4 00A06610110 002A1CE2093E80A6FE80CA2E5CC8
:105C04002AFFE1EB0E 01CD3361CD7560CDFF610 15B
:105C140010 002A1CE2 093E80A6FE 80C2B5C 011BFB
:105C24000002A1AE20936FFC33750118002A1AE277
:105C34 0 09 36FF0118002A1AE2097E1FD2575C01B7
:105C440 076 002A1EE2 094E23462A0BE2EBCD2856A6
:105C5400C35C5C2109E236FFC3B15B2A01E2E52A99
:105C6400 03E2E52A05E2444D2A07E2EBCD9658C942
:105C74 003BE541C5332101003936 00 0180C0237161
:105C84002370210100397E2FEB01FFC713F5CDE40A
:105C94 006E9FC148A11FD2185D210000397EFE00 0D
:105CA400CAE65C210200394E234606911080CDAA
:105CB400876E110 080CDCE6EB5C2E35C2102 0 0393F
:105CC4 00 04E234660691 1FF7FCD876EE521020039F
:105CD4007ED1CDD56EB5C2E35C2101003936FFC358
:105CE400FE5C2102 00394E234650593E00CDEC6E35
:105CF400B5C2FE5C2101003936FF210100397E1F47
:105D0400DA155D3E 0 012 0 0 39CD6D6EEB2B73 423 4D
:105D140072C3865C210 200397E1FDAB5D3E0021AF
:105D240 02 0 039772336 0021020 0395E2356EBD175
:105D3400D1C9210CE2732B702B712A1AE2239E32AB4
:105D44 00 0AE2EBE1732372 0103 0 02A1AE2093A0C16
:105D5400E2772A1AE236012A1AE27EFE01C2675D60
:105D6400C35B5DC92110E2722B732B702B712A0F58
:105D7400E27D2A0DE25F444DCD365D2A0DE223E536
:105D8400DA002A0FE27C5FC1CD365DC93BE21123E29E
:105D9400CD836E0E01CDBF6E3E011BE5CD836ED16A
:105DA40 0CDCE6EB5D6019FF53E 002127E2969FC168
:105DB40048A11FD2C35D2100 00 03936FFC3C95D214C
```

39

```
:105DC400000039360021000039763302905CAA1AC281
:105DD4007EFE00CADD5DC3D15D2101003936FF2B93
:105DE4003600210000397ED6149F23F57ED6FFD6D7
:105DF400019FC148A11FD2285E0104002A1AE209AA
:105E0400E5210200394E060021BD6809C10ABEC25F
:105E1400205E210000397E2101003977210000397C
:105E240034C365D2101003977EE1C93B210000391C
:105E340036FF210000397EFEFFC2505E2A1AE23688
:105E440002CDD05D210000397703365E21000039D0
:105E54004E060021D168097E3393B210000393642
:105E6400FF210000397EFEFFC29A5E2A1AE2360341
:105E7400CDD05D210000397721000397EFEFFC2BC
:105E8400975E2A1AE236022A1AE27EFE00CA975E5A
:105E9400C38B5EC3655E210000394E060021D168C4
:105EA400097E3393BCD8E5D1FD2BB5ECD2F5E21F3
:105EB4000000397703A955E33C9E5C5F3210003971
:105EC4004E2346E560694E2346E12371237F8604F
:105ED400069D1D1C9E553D533C52102000397EB71F35
:105EE4000232773E012B2BA6FE00C20A5F2104006B
:105EF400394E060021000039EBCD646E23E0FA6EB4F
:105F0400232377C3265F210400394E060021000085
:105F140039EBCD646E7EE6F81F1F1F1FE60FEB23DF
:105F24002377210300397E33E1E1C93B21010039A4
:105F340053D53341C5335E23562347323467C5EE
:105F4400210200397EB71F232377E3012B2BA6FEA7
:105F540000C2735F210400394E060021000039EBB2
:105F6400CD646E3EF0A6EB2323B6B77C3905F219E
:105F740000300397E87878787234E060021000397E
:105F8400EBF5CD646E3E0FA6C148B17733D1D1D1C4
:105F9400C93BC5210200393600B3E0321020039BE47
:105FA400DACE5F210300394E0600EB1B1BCD646E76
:105FB400EB234E060021080039EBE5E2A1CE219C177
:105FC4000A77210200393C4C29D5F2102003936046B
:105FD4003E0721020039BEDA7B5F2102003940E067D
:105FE40021000031080020039E21936002102020039BD
:105FF40034C2D45F33D1C9D5C5E204E5210200399A
:106004004E2346210400395E2356E12CC317600A4F
:1060140012B13DC21360E1E1C9E5D541C5332153
:106024000000397EFE00C23B60E2A1CE2EB21030023
:1060340039732372C34A600031040002A1CE200969
:106044000003009732372E10300394E2346E2B2B273
:10605400C54E2346E17E2370E21030039A4E2346C3C4
:106064000032B71237060693E007723360033D1D14E
:106074003E0721000039360B03E0321020039BEDAAB
:10608400CC602100003940600002A1CE2097E210161
:106094000039772B4E06000E1040009EB2A1CE21973
:1060A400E52A1CE209C10A7721000394E060021C5
:1060B400040009EB2A1CE219E5210300397EE1778B
:1060C4002100003934C27C60D1C93BD541C5332190
:1060D4002003003936003E0321030039BEDA3061E2163
:1060E4000000397EFE00C20C6210300394E060017
:1060F4002A1CE209E5210500394E0600EB1B1BCDE5
:1061040006646EC10A77C32861210300394E060021159
:10611400040009EB2A1CE219E521030039EBCD6E4
:106124006EC10A7721030003934C2D9600D1C93B89
:10613400D541C5332103003936003E032103003910
:106144006EDA946121000039E7EFE00C0DE61210334
:10615400003394E060EB1B1BCD646EEB234E06008C
:106164002A1CE2091A77C38C6121030039E2406008
:106174000EB1B1BCD646EEB234E060021040009EBE0
:1061840E0E52A1CE219C10A77210300393C2E3E6B1
:106194007D1C92A1CE2E5010400039EB2A1CE2103C
:1061A400000E52A1CE209EBC1CDE366C92A1CE2E53D
:1061B40000104002A1CE209011000E52A1CE209EB93
:1061C400C1CDFF66C941C533210039E7EFE00C23E
:1061D4000E9612A1CE2011000E52A1CE209EBC1CDA9
:1061E400C966C3FD610104002A1CE209011000E52F
:1061F4002A1CE209EBC1CDC96633C92A1CE2E501B8
:10620400004002A1CE209011000E52A1CE209EBC182
:1062140CD1B67C93BE52100039360003E0721004C
:106224000039EBDA44621000039E06002108001C
:106234009EB2A1CE219360021000039394C22061D
:106244002A1CE2E521030039EBC1CD846701040077
:106254002A1CE209E521040039EBC1CD84673E80A4
:10626400210100394A6773E8023A6772B7EFE00CA43
:1062740086622A1CE2011000E52A1CE209EBC1CD6A
:106284000C96621020039766EFE00CAA462104002AU4
:106294001CE209011000E52A1CE209EBC1CDC96624
:1062A4000216921000393E00029360112000CDD5AE
:1062B4006EDA346301080002A1CE200901100005E2AA1
:1062C4001CE209EBC1CD7E600104002A1CE20912F
:1062D4001000E52A1CE209EBC1CD616600110022A19
:1062E4002093E01A6FE01C22C630108002A1C1F
:1062F4000E209E52A1CE2011000E52A1CE209EBC1CF
```

40

```
:106304CDE3660110002A1CE2093E01A6FE01C28B
:1063142C63010C002A1CE209E501100002A1CE28E
:1063240009EB01C367CDE366210003934C2AA62D8
:10633400210100397E2102039BECA5563010900DB
:1063440002A1CE209011000E52A1CE209EBC1CD1B7
:106354006621000003936003E0321000039BEDAA26E
:10636400632100003940E60021080009EB2A1CE2D3
:1063740019E52A1CE209C10A772100003940E0600FA
:10638400210C0009EB2A1CE219E521040009EB2A7F
:1063940001CE219C10A772100003934C25B6333D18E
:1063A400C93BE52A1CE2E521030039EBC1CD846732
:1063B4000108002A1CE209E521040039EBC1CD7F64
:1063C40073E80210039A6773E8023A6772B7E85
:1063D400FE00C296632A1CE2011000E52A1CE20956
:1063E400EBC1CDC96621020039FEFE00CA07640F3
:1062F40008002A1CE209011000E52A1CE209EBC18D
:10640400CDC16621000393601210000397E1120FA
:10641400000CDD56EDA95640108002A1CE20901104A
:10642400E00E52A1CE209EBC1CD7E6601040002A1CAA
:10643400E2090110000E52A1CE209EBC1CD61662ADC
:106444001CE2E5010C002A1CE209011000E52A1CE2B
:106454002A1CE209EBC1CD586701000002A1CE2093EC0D5
:10646400A6FE00CAB0D640104002A1CE2093E01B69E
:106474007701C002A1CE209E52A1CE201100005E60
:106484002A1CE209EBC1CDFF66210000393A4C20D9C
:106494006421000039360003E0321000039BEDA22EF
:1064A40064210000394E06002104000009EB2A1C295
:1064B40019E52A1CE209C10A7721000394E0600B9
:1064C400210C0009EB2A1CE219E521040009EB2A3E
:1064D4001CE219C10A77210003934C29B6421011EE
:1064E40001CE209397E210200039BECA13650104002A1C4A
:1064F400E2090110000E52A1CE209EBC1CDC966AB4
:106504001CE2011000E52A1CE209EBC1CDC966338
:106514001CE1C93B41C5332100003977EFE00C24C6510
:10652400210100039360003E0321010039BEDA49657F4
:1065340021000394E060002A1CE2093600210101F
:10654400394C22A65C37665210100393600E03319
:106554002101003996DA76655210100394E06002199
:1065640004009EB2A1CE2193600021010003934C267
:10657400052D1C941C5332100003977EFE00C2985D
:106584006052A1CE2011000E52A1CE209EBC1CD8456
:1065940067C3AC6501040002A1CE209011000E52A66
:1065A4001CE209EBC1CD846733C92114E2722B7359
:1065B4002B7027127E2A13E24E21FFFFCDB56ECD93C4
:1065C4006E22152E22A13E24E2111E2CDBB6E221790
:1065D400E22929221E22A17E201050009EB2A130E
:1065E400E219EB0E00CD33612A17E201010009EB39
:1065F4002A13E219EB0E01CD3361CDB061A15E205
:10660400111E2CD886EEB0E01CD1E60CD186221L12
:1066140019E236012A13E27E2119E2BEDA3E66014E
:106624008002A1CE209011000E52A1CE209EBC15A
:10663400CD84662119E234C218662A17E2010100EA
:1066440009EB2A13E219EB0E00CD3361010800002A8D
:106654001CE209EB0E01CD3361CD9761C92E04CD47
:1066640008A66C92E04CDA466C9CD67661A4FE64072
:10667400C83E80B1127EF68077C92E08CD8A66C9DD
:106684002E08CDA466C9D55950450E40B71A171225
:10669400F5B7CA9B660E00F11305C29166C39767EE
:1066A400D55D260009E50E40B72B7E1F77F5B7CAE6
:1066B400B8660E00F11DC2AD66D1C39767D55950B7
:1066C400006080C3CE66D55950060640E40371A2FCE9D
:1066D40012CADB660E001305C2D166C39767E1D8
:1066E400E3D5EB6960006040E40B71A8E12CAF66664B
:1066F4000E00231305C2EE66C39767E1E3D5EB6989
:106704006060040E40B71A9E12CA12670E02313C5
:10671400065C20A67C39767E1E3D51030019E29C82
:106724001ABECA3A67F5AEF23567F1DA4F67C3535A
:1067340067F13FC32F6706032B1B1ABEDA5367C2E8
:106744004F6705C23C673E40C35567AFC35567EBC
:10675400080E177C9E1E3D5110400019EB090604BA4
:106764001B1ABEDA7A67C2766705C263673E40C3D6A
:106774007C67AFC37C673E80E177C92E08C38667:B
:106784002E04D55950E0E401A7BCA92670E00132D25
:1067940C28B67E13E0009F67F01B14F1B1AB767
:1067A400079F2AA67F68077C92E2A20313027F3334A
:1067B4002F31393835202A2A00996D0000000000154
:1067C400000000000000003F420F00C2010000003E2A
:1067D400FEFFFF9A7982506A66E606096AD03C415D0A57
:1067E400000002693C964020000015AE47519AC8
:1067F400999919D00700090FA00000001402003035
:106804000750000640000000AC0D000054F2FFFFA00E
:106814000F000060F0FFFF94110000600E2EFFFF0812
:106824000000000000001C88DC0275FFBB055E61A10846
:106834C0C3C18F0B7D5A8A0E129A94114A34B21432
```

```
:106844007935E7173719381BC3E5A91E704D422265
:1068540021D807266B17022AFFE8392E63CCB932F8
:1068640014538E3759B5C63CC69A7542080000000C9
:10687400401D5E10406CA24140D44B9440533109FA
:10688400416287A141D5E75E42A55C4342A6E512C
:1068940004477358C45F573F74686B197481B637288
:1068A004A511C8E4CA4CFF24E2A22AA51FAD9BFC7
:1068B400547471425862DE435C0C010911020A12DD
:1068C400030B131B1A21231922241C140430313204
:1068D40033343563738390102030405062632A2DAB
:1068E4002E4C414E47554147453F2000454E474CAD
:1068F4004953483F0053455420644944C542054A569
:10690400524F3F002A2A204D415256454C203135E2
:106914001202A2A002A2A204D415256454C20382B
:1069240031412024A002A2A53554F502050454EE0
:106934004494E472A2A00232D23204C454E3F002C
:10694400232D2320414E473F0002320D2320515443
:10695400593F20004A4F422023220525054F3F00E8
:106964004D454D4F4F452592046554C4C00494E4348D5
:10697400205454E4954533F004D4554549432055E8
:106984004E4954533F004E4F2053455500202320D1D
:1069940023004144442053554552020232D233F00D9
:1069A4004A4F422023220535445503F200004340C4536
:1069B40041522053545503F2000434C454152220FE
:1069C400232D233F00464E4320233F200044454520CD
:1069D40055472050415553345204F4E00444542559C
:1069E400472050415534520446460005524215398
:1069F4004520454550524F4F3F0041524520594F87
:106A04005520535352453F00454550524F4D202483
:106A1400004A4F4220232052554E4E494E70054BF
:106A24004E4C54204D4F44454C004E4F2054544933
:106A34004C54204D4F44454C0004F44454C20315F
:106A440035411004D4F44454C20383141100494E43B7
:106A54004820F4E4C59004D45545249432044E07
:106A64004C5900424F54482028494E434382900427B
:106A74004F544820D4554542494329320050454906
:106A8400545320404F4F4453F200046554E4354549EE
:106A94004F4E3F2000434C454152220454E423F2035
:106AA400000434C454152204A4F4423F004E4F61
:106AB400204A4F4422023020050524F4752204D04812
:106AC4004F423F200053544415254205344545503FA9
:106AD400200005354415254015402320D313F006F
:106AE4004E4F205354455553320430423230052C6
:106AF400556E4204A4F423F2000464F4420422004D
:106B04002300455254522204A4F42202352050554
:106B14004700232D2320320525054202300232DCB
:106B24002320232052502202300504155534520233S
:106B34000050524553553205544152404C454
:106B44005494E55452004A4F42203F0053544157
:106B54005254204154023202300434F4ED420531C
:106B64005445520233F004F55555204462053344442
:106B74004F434B00424C4144452042453544514B0057
:106B84004A4F4242202053544A4F5054053544A
:106B94004220232046494E4534544543F002A2A6F
:106BA4002A20455252420F52020202A2A05055D
:106BB400532041C57415953204F4E00050554D08E
:106BC40053204F4E2F4F464600534B55554C57E
```

We claim:

1. In a method of automatic sawing, the steps of:
   a. retaining the location of a first position of a workpiece shuttle movable between the first position and a plurality of second positions;
   b. calculating a specific second position from a desired sawed workpiece length stored in memory means;
   c. actuating the shuttle to move from the first position toward the specific second position;
   d. using shuttle motion sensing means to encode a plurality of signals for each distance increment travelled by the shuttle;
   e. processing the signals to periodically determine the position of the shuttle;
   f. stopping the shuttle when the specific second position and the last determined shuttle position are substantially equivalent;
   g. clamping the workpiece to the shuttle;
   h. actuating the shuttle to move back to the located first position;
   i. clamping the workpiece into a position to be sawed;
   j. unclamping the workpiece from the shuttle;
   k. sawing the workpiece; and
   l. repeating steps (b)-(l) for a plurality of sawing steps, the steps producing workpieces of possibly different lengths.

2. In a method of automatic sawing using saw blade tilting means, a workpiece shuttle, saw station clamping means, shuttle clamping means, and programmable calculator means in operative communication with the tilting means, clamping means and shuttle, the steps of:
   a. programming the calculator means with a saw blade kerf value and a pivot point correction factor equal to the perpendicular distance between a saw blade tilt axis of tilt and a top surface of a saw station,
   b. using the calculator means to store data for a plurality of sawing steps, the data for each step comprising
   a sawing tilt angle and
   a sawed workpiece length;

c. sensing and storing a first shuttle position in the calculator means;
d. commanding the saw blade tilting means to commence tilting a saw blade;
e. sensing a plurality of angular movement increments of the saw blade;
f. for each angular increment, transmitting a plurality of signals to the calculator means including a first signal and a second signal;
g. decoding the pulses by the order of receipt of the first and second signals by the calculator means to determine whether a positive or negative angular increment has been sensed;
h. processing the signals to periodically calculate a current tilt angle;
i. periodically comparing the current tilt angle to an angle calculated from the saw tilt angle and clamping the saw blade in an angularly fixed position when the current angle is substantially equal to said last angle;
j. modifying the sawed workpiece length as a function of the blade kerf value, pivot point correction factor, saw blade tilt angle and shuttle stroke to obtain a displacement between the first shuttle position and the second shuttle position;
k. moving the shuttle toward a second position;
l. sensing a series of shuttle displacement increments;
m. for each increment, sending a plurality of signals including a first signal and second signal to the calculator means;
n. decoding the signals by the order of receipt by the calculator means to determine whether an increment in the first direction or in the second direction has been sensed;
o. processing the shuttle displacement increment signals to find a current shuttle location;
p. comparing the shuttle location to the second shuttle position and actuating the shuttle clamping means to clamp the workpiece to the shuttle when the current shuttle location and the second shuttle position become substantially equivalent;
q. thereafter moving the shuttle to the first position;
r. opening the shuttle clamping means and actuating the saw station clamping means to clamp the workpiece;
s. sawing the workpiece, and retracting the saw blade after the cut is complete;
t. repeating steps (d)-(s) for each remaining stored saw step unless a stop command is issued or an abnormal condition occurs.

3. In a method of automatic sawing using an automatic workpiece shuttle, at least one shuttle clamp, a plurality of stationary clamps, saw blade feed means and programmable calculator means in operable communication with the shuttle, clamps and feed means, the steps of:
a. storing in the programmable calculator means a saw program comprising a number of sawing steps, the data for each step including a sawed workpiece length;
b. moving the shuttle away from a first position;
c. periodically sensing the position of the shuttle;
d. stopping the shuttle when the distance it has travelled from the first position is substantially equivalent to a component of the sawed workpiece length;
e. actuating the shuttle clamp to clamp the workpiece;
f. opening the stationary clamps;
g. moving the shuttle to the first position with the workpiece;
h. thereafter closing the stationary clamps to clamp the workpiece in sawing position;
i. opening the shuttle clamp;
j. then actuating the saw blade feed means to cause the blade to saw the workpiece;
k. sensing when the workpiece is sawed;
l. thereafter returning the saw blade to its beginning position; and
m. repeating steps (b)-(l) for each saw step to the completion of the program, unless an abnormal condition occurs.

4. In a method of automatic sawing using an automatic workpiece shuttle, shuttle clamping means, saw blade tilting means, saw blade feed means, stationary clamping means, and programmable calculator means, in operable communication with the shuttle, clamping means, tilting means and feed means, the steps of:
a. entering in to the calculator means a saw kerf value, a pivot point correction factor and a saw program comprising a number of sawing steps, the data for each sawing step including a sawed workpiece length and a saw angle;
b. recording a first shuttle position;
c. actuating the blade tilting means to tilt the saw blade to the entered saw angle;
d. calculating a displacement to a second shuttle position from the first position from the entered sawed workpiece length as a function of shuttle stroke, saw kerf value, pivot point correction factor and the entered saw angle;
e. actuating shuttle movement means to move the shuttle away from the first position toward the second position;
f. periodically sensing the location of the shuttle;
g. deactivating the shuttle movement means and actuating shuttle clamping means to clamp the workpiece to the shuttle when the shuttle location becomes substantially equivalent to the second position;
h. opening the stationary clamping means;
i. actuating shuttle movement means to move the shuttle to the first position with the workpiece;
j. thereafter closing the stationary clamping means on the workpiece;
k. opening the shuttle clamping means;
l. actuating the saw blade feed means to saw the workpiece;
m. retracting the saw blade after it is sensed that the workpiece has been sawed;
n. repeating steps (b)-(m) for each of the remaining saw steps unless a stop command is received or unless an abnormal condition occurs.

5. The method of claim 4 wherein the component of said saw kerf value parallel to the surface of a saw station table and said pivot point correction factor as multiplied by a quantity derived from the tangents of said entered saw angle and the entered saw angle for the next step are used to calculate said second position.

6. The method of claim 4, including the further steps of:
o. determining whether said entered sawed workpiece length is greater than said shuttle stroke;
p. using the remainder of the entered sawed workpiece length over the greatest integral multiple of the shuttle stroke which is less than the sawed workpiece length to calculate said second position;

q. if the entered sawed workpiece length is greater than or equal to the shuttle stroke, moving the shuttle away from said first position toward a third position, the displacement between the first and third positions being equal to the shuttle stroke;

r. ceasing moving the shuttle and actuating said shuttle clamping means to clamp the workpiece when the shuttle location becomes substantially equivalent to the third position;

s. opening said stationary clamping means;

t. moving the shuttle to the first position with the workpiece;

u. closing the stationary clamping means;

v. opening the shuttle clamping means;

w. repeating steps (q)–(v) a number of times equal to said multiple.

7. The method of claim 4, further comprising the steps of o. programming said calculator means with a shuttle creep length;

p. after actuating said shuttle to move toward said second position, reducing the rate of shuttle displacement when the shuttle is at a location substantially less than or equal to the creep length away from the second position.

8. The method of claim 4, further comprising the steps of o. programming said calculator means with a shuttle stop-look-ahead length;

p. after actuating said shuttle to move toward said second postion, deactuating shuttle movement means when the shuttle becomes substantially equal to or closer than the stop-look-ahead length away from the second position, allowing the shuttle to coast.

9. The method of claim 4, further comprising the steps of o. programming said calculator means with a signal deadband length approximating the distance through which said shuttle moves while a command to clamp the workpiece to the shuttle is being actuated;

p. when the shuttle becomes at least as near to the second position as the deadband length, actuating the shuttle clamping means to clamp the workpiece.

10. The method of claim 4, further comprising the steps of o. programming said calculator means with a tilt creep angle; and p. after actuating said blade tilting means to move the blade toward said entered saw angle, reducing the rate of angular movement of the blade when the blade is an angular displacement away from the entered saw angle substantially equal to or less than the tilt creep angle.

11. The method of claim 4, further comprising the steps of o. programming said calculator means with a stop-look-ahead angle; and p. after actuating said blade tilting means to move the blade toward said entered saw angle, deactivating the blade tilting means when the blade is an angular displacement away from the entered saw angle substantially equal to or less than the stop-look-ahead angle, allowing the blade to angularly coast.

12. The method of claim 4, further including the steps of o. programming into said calculator means a tilt deadband angle substantially equivalent to the angular displacement through which the blade moves while a command to angularly stop the blade is being actuated; and p. after actuating said blade tilting means to move toward said entered saw angle, actuating means to angularly fix the saw blade when the blade is at an angular displacement away from the entered angle substantially less than or equal to the tilt deadband angle.

13. The method of claim 4, further comprising the steps of o. while the calculator means is executing said saw program, commanding said calculator means to stop the saw program when it is desired that program parameters be changed or that the program not continue;

p. the calculator means finishing the execution of the saw step in progress and then ceasing to issue further commands to said workpiece shuttle, shuttle clamping means, stationary clamping means, blade tilting means or blade feed means until a command to continue the program is entered into the calculator means.

14. In a method of automatic sawing using an automatic workpiece shuttle, the steps of a. storing in calculator means a shuttle creep length, a shuttle stop-look-ahead length, a shuttle signal deadband length and a saw kerf value;

b. referencing a first shuttle position;

c. actuating shuttle drive means to move the shuttle from a first position to a second position, the distance between the second position and the first position comprising a component of a desired workpiece length plus the saw kerf value;

d. periodically determining a current shuttle position;

e. reducing the rate of shuttle displacement when the distance between the current shuttle position and the second position is substantially less than or equal to the shuttle creep length;

f. deactivating the shuttle drive means when the distance between the current shuttle position and the second position is substantially less than or equal to the shuttle stop-look-ahead length, allowing the shuttle to coast;

g. commanding the shuttle clamping means to clamp the workpiece to the shuttle when the distance between the current shuttle position and the second position is substantially equivalent to the shuttle signal deadband length;

h. as the shuttle moves through the signal deadband length, completing the actuation of the shuttle clamping means to clamp the workpiece;

i. opening stationary clamping means; and j. moving the shuttle with the workpiece to the first position.

15. In a method of automatic sawing using an automatic workpiece shuttle and saw blade tilting means, the steps of a. storing in memory means a saw blade kerf;

b. storing in memory means a pivot point correction factor substantially equivalent to a perpendicular distance between a blade tilt axis and the plane of a saw station table;

c. storing in memory means data for a number of saw steps, each saw step having a workpiece length and a sawing angle;

d. for each step, calculating a corrected workpiece length, corrected to take into account a horizontal distance derived from the saw kerf and a horizontal distance derived from the pivot point correction factor, both distances being functions of the saw angle;

e. for each step, using the shuttle to displace the workpiece by a corrected workpiece length to place the workpiece in position to be sawed; and f. for each step, sawing the workpiece.

16. In a sawing machine with an automatic workpiece shuttle, the improvement comprising a. means sensing the motion of the shuttle;

b. means controlling the shuttle;

c. means operable to clamp a workpiece to the shuttle;

d. means operable to advance a saw blade into the workpiece;

e. programmable calculator means in operable communication with the aforesaid means, the calculator means capable of being programmed with data for a number of sawing steps, the data for each step including a sawed workpiece length possibly different from the sawed workpiece length for other steps;

for each step, the calculator means determining a shuttle pull length from the stored sawed workpiece length, the calculator means commanding the shuttle to move in a first direction to retrieve the pull length of the workpiece, the shuttle motion sensing means encoding each shuttle movement increment into a signal and transmitting the signal to the calculator means, the calculator means processing the signals for each step to determine current shuttle position, the calculator means for each step commanding the shuttle clamping means to clamp the workpiece to the shuttle when the displacement between an initial and the current shuttle position is substantially equivalent to the shuttle pull length;

the calculator means thereafter for each step commanding the shuttle to move with the workpiece in a second direction by an amount equal to the shuttle pull length to a workpiece saw station;

for each step, the calculator means thereafter commanding the saw blade advancing means to advance the blade into the workpiece, sawing the workpiece;

the calculator means commanding the shuttle clamping means to unclamp the workpiece in order for the shuttle to be free to convey a subsequent workpiece length.

17. An automatic sawing machine, comprising:

(a) a shuttle actuatable to move a workpiece in a first direction to a cutting position, (b) means sensing incremental movement of the shuttle, (c) means actuating at least one workpiece shuttle clamp, (d) means actuating a plurality of stationary clamps to hold the workpiece while the workpiece is being cut, (e) means reducing the rate of shuttle displacement, (f) means actuating the tilting of a saw blade, (g) means sensing incremental tilting motion of the saw blade, (h) means reducing the rate of saw blade angular displacement, (i) programmable calculator means operably connected to the sensing, actuating and rate reducing means;

the calculator means sensing a plurality of signals sent from the shuttle movement sensing means each time the shuttle moves an incremental distance, the pulses including a first signal and a second signal, the first signal at least partially preceding the second signal when the incremental movement is in the first direction and the second signal at least partially preceding the first signal when the incremental movement is in a second direction;

the calculating means determining the direction of the incremental movement by noting which of the first and second signal comes first, the calculator means processing the signals into first and second directional movement counts, the calculator means summing the number of first directional movement counts and summing the number of second directional movement counts, the calculator means periodically subtracting the second directional sum from the first directional sum in the course of periodically arriving at a current position of the shuttle;

the calculator means sensing a plurality of signals sent from the incremental blade tilting motion sensing means upon the sensing of each tilting motion increment, said last signals including a first signal and a second signal, the first signal at least partially preceding the second signal when the direction of movement is positive, the second signal at least partially preceding the first signal when the direction of movement for that increment is negative, the calculating means determining the direction of angular movement by noting which of the first signal and the second signal was first received;

the calculator means processing the signals into positive and negative angular movement counts and summing the positive angular movement counts and summing the negative angular movement counts, the calculator means periodically subtracting the negative counts from the positive counts in the course of periodically determining a current angle of blade tilt;

the calculating means being programmable with a shuttle creep length, a stop-look-ahead length, a shuttle deadband length, a tilt deadband angle, a saw kerf value, a pivot point correction factor, a tilt creep angle and a tilt stop-look-ahead angle;

the calculating means further being programmable with a plurality of sawing steps, each step including data specifying a sawed workpiece length and a sawing angle;

the calculator means, for each step, commanding the blade tilt actuating means to tilt the blade at a normal angular displacement rate until the angle of displacement between the sawing angle and the current angular position does not exceed the tilt creep angle;

the calculator means then for each step actuating the angular displacement rate reduction means to slow the rate of tilting of the blade;

the calculator means for each step disabling the blade tilt actuating means, allowing the blade to coast, when the angular displacement between the sawing angle and the current angular position does not exceed the tilt stop-look-ahead angle;

the calculator means for each step actuating means fixing the blade at the desired sawing angle when the angular displacement between the desired sawing angle and the current angular position does not exceed the tilt deadband angle;

the calculator means for each step calculating a corrected shuttle pull length from the sawed workpiece length and horizontal lengths derived from the saw kerf and the pivot point correction factor as functions of the sawing angle;

the calculator means actuating the shuttle to move in the second direction;

the calculator means actuating the shuttle displacement rate reduction means when the displacement between the current shuttle position and the end of the corrected pull length does not exceed the shuttle creep length;

the calculator means disabling shuttle movement actuating means and allowing the shuttle to coast when the displacement between the current shuttle position and the end of the corrected pull length does not exceed the shuttle stop-look-ahead length;

the calculator means commanding the shuttle clamp actuating means to clamp the workpiece to the shuttle when the displacement between the current shuttle position and the end of the corrected pull length does not exceed the shuttle deadband length;

the calculator means then actuating the stationary clamps to open;

the calculator means thereafter for each step commanding the shuttle to move the workpiece in the first direction by an amount equal to the corrected pull length;

the calculator means thereafter for each stop actuating the stationary clamps to clamp the workpiece, and actuating the shuttle clamp to unclamp the workpiece;

the calculator means thereafter for each step commanding blade feed means to saw the workpiece.

18. An automatic sawing machine, comprising:
a. a workpiece shuttle actuable to convey a workpiece length to a saw station,
b. workpiece shuttle motion sensing means,
c. means actuating at least one workpiece shuttle clamp to selectively clamp the workpiece to the shuttle,
d. means actuating a plurality of workpiece stationary clamps to selectively clamp the workpiece into sawing position,
e. means actuating blade feed to saw the workpiece,
f. means sensing blade position,
g. programmable calculating and controlling means in operable communication with the shuttle actuating means and sensing means,
the calculating and controlling means being programmable with a program comprising instructions for a number of sawing steps, the data for each step including a sawed workpiece length, the calculating and controlling means controlling the shuttle and actuating means and receiving data from the sensing means to determine shuttle and blade position, and execute the program to saw various lengths of the workpiece until the end of the program or until an abnormal operating condition occurs.

19. In an automatic sawing machine with means to automatically control at least one workpiece shuttle to convey a workpiece to a sawing station, at least one shuttle workpiece clamping means selectively actuatable to clamp a workpiece to the shuttle, a plurality of stationary workpiece clamping means selectively actuatable to clamp the workpiece in sawing position, blade feed means selectively actuable to saw the workpiece and blade tilt means selectively actuatable to tilt a saw blade to a sawing angle, the improvement comprising
a. means sensing the motion of the shuttle,
b. means sensing the tilting motion of the saw blade,
c. means reducing the rate of shuttle movement,
d. means reducing the rate of tilt of the blade,
e. at least one programmable calculator means in operable communication with said controlling, sensing and rate-reducing means, and
f. data entry means and memory means in operable communication with the calculator means, the memory means capable of storing a plurality of sawing steps, each step having a sawed workpiece length and a sawing angle;

the calculating means controlling the shuttle and tilt mechanism control means, the force reducing means and receiving data from the sensing means to serially perform each programmed sawing step as long as normal operating conditions obtain;

the memory means also storing a saw blade kerf, a pivot point correction factor equivalent to the distance between a surface of the sawing station and the blade tilt axis measured as a perpendicular to the surface, a shuttle creep length, a shuttle stop-look-ahead length, a shuttle deadband length, a tilt creep angle, a tilt stop-look ahead angle and a tilt deadband angle, for each sawing step, the calculator means deriving a corrected shuttle pull length from the stored sawed workpiece length and from lengths parallel to the sawing station surface derived from the saw blade kerf and pivot point correction factor as functions of the sawing angle;

for each sawing step, the calculator means commanding the shuttle control means to move the shuttle in a first direction;

for each sawing step, the calculator means periodically using the shuttle motion sensing means to determine a current shuttle position relative to the end of the shuttle stroke, the shuttle stroke being equal to the corrected shuttle pull length;

for each sawing step, the calculator means actuating the shuttle movement rate reduction means when the difference between the shuttle stroke end and the current shuttle position does not exceed the shuttle creep length;

for each sawing step, the calculator means disabling shuttle drive means, allowing the shuttle to coast, when the difference between the shuttle stroke end and the current shuttle position does not exceed the shuttle stop-look-ahead length;

for each sawing step, the calculator means commanding the shuttle clamping means to close when the difference between the shuttle stroke end and the current shuttle position does not exceed the shuttle deadband length;

for each sawing step, the calculator means thereafter actuating the stationary clamping means to open and actuating the shuttle to move in a second direction for a distance equal to the corrected pull length, the calculator means then closing the stationary clamping means and opening the shuttle clamping means;

for each sawing step, the calculator means actuating the tilt means to tilt the saw blade, the calculator means periodically using the tilt sensing means to determine a current tilt angle;

for each sawing step, the calculator means reducing the rate of blade tilt when the difference between the sawing angle and the current tilt angle does not exceed the tilt creep angle;

for each sawing step, the calculator means disabling tilt drive means, allowing the blade to angularly coast, when the difference between the sawing angle and the current position does not exceed the tilt stop-look-ahead angle;

for each sawing step, the calculator means commanding angular blade affixing means to fix the blade at the sawing angle when the difference between the sawing angle and the current position does not exceed the tilt deadband angle;

for each sawing step, the calculator means thereafter actuating the blade feed means to saw the workpiece.

20. The apparatus of claim 19, further characterized in that where said stored sawed workpiece length is greater than or equal to a maximum shuttle stroke, the calculator means determines a plurality of partially corrected shuttle pull lengths, only one of the partial corrected pull lengths being derived in part from the saw kerf and the pivot point correction factor;

the calculator means controlling the shuttle and the clamping means to serially displace the workpiece by each partial corrected shuttle pull length before actuating the blade to saw the workpiece.

21. The apparatus of claim 19, further characterized in that sawing steps may be added to, deleted from or modified in a first sawing procedure stored in said memory means comprising a number of sawing steps, while said calculator means is executing a second sawing procedure also comprising a number of sawing steps.

22. The apparatus of claim 19, further comprising at least one data communications link operably connected to said programmable calculator means to place said calculator means in communication with an outside instruction source, whereby the outside instruction source may program and give instructions to the calculator means.

23. The apparatus of claim 19 further characterized in that said programmable calculator means may be programmed with a tilt enable/disable function, the entry by way of said entry means into said memory means of a "tilt disable" command causing the disablement of the saw blade tilting means so that only perpendicular cuts may be made, the "tilt disable" function also changing the derivation of said corrected shuttle pull length so as to no longer be a function of said pivot point correction factor or said sawing angle.

24. In a method of automatically sawing a workpiece using an automatically operated saw blade memory means, an automatic workpiece shuttle, shuttle clamping means, and calculator means operably connected to aforesaid means, the steps of:

a. calculating a shuttle workpiece displacement length using a sawed workpiece length stored in the memory means;
b. actuating the shuttle to move from a home position;
c. monitoring the position of the shuttle using shuttle motion sensing means and comparing the position to the shuttle workpiece displacement length;
d. stopping the shuttle when the shuttle position relative to the home position and the shuttle workpiece displacement length are substantially equivalent;
e. clamping the workpiece to the shuttle;
f. actuating the shuttle to move to the home position;
g. unclamping the workpiece from the shuttle;
h. sawing the workpiece; and
i. repeating steps (a)–(h) for a plurality of sawing steps to produce sawed pieces of possibly different lengths.

* * * * *